US008934177B2

(12) United States Patent
Imaoka et al.

(10) Patent No.: US 8,934,177 B2
(45) Date of Patent: Jan. 13, 2015

(54) ZOOM LENS SYSTEM, INTERCHANGEABLE LENS APPARATUS AND CAMERA SYSTEM

(71) Applicant: Panasonic Corporation, Osaka (JP)

(72) Inventors: Takuya Imaoka, Kanagawa (JP); Kyoichi Miyazaki, Osaka (JP)

(73) Assignee: Panasonic Intellectual Property Managment Co., Ltd, Osaka (JP)

( * ) Notice: Subject to any disclaimer, the term of this patent is extended or adjusted under 35 U.S.C. 154(b) by 0 days.

(21) Appl. No.: 13/749,447

(22) Filed: Jan. 24, 2013

(65) Prior Publication Data
US 2013/0148005 A1    Jun. 13, 2013

Related U.S. Application Data

(63) Continuation of application No. PCT/JP2011/004577, filed on Aug. 12, 2011.

(30) Foreign Application Priority Data

Aug. 24, 2010 (JP) .................................. 2010-187331

(51) Int. Cl.
G02B 15/14 (2006.01)
G02B 27/64 (2006.01)
(Continued)

(52) U.S. Cl.
CPC ............... G02B 15/14 (2013.01); G02B 15/22 (2013.01); G02B 15/173 (2013.01); G02B 27/646 (2013.01)
USPC ............................. 359/684; 359/676; 359/557

(58) Field of Classification Search
CPC .............. G02B 9/00; G02B 9/34; G02B 9/60; G02B 9/62; G02B 9/64; G02B 15/00; G02B 15/14; G02B 27/64
USPC .................. 359/554–557, 676–692, 713–715
See application file for complete search history.

(56) References Cited

U.S. PATENT DOCUMENTS 5,659,426 A * 8/1997 Aoki .............................. 359/683
5,835,282 A * 11/1998 Suenaga et al. ............... 359/692
(Continued)

FOREIGN PATENT DOCUMENTS

JP    04-158325 A    6/1992
JP    08-005913 A    1/1996
(Continued)

OTHER PUBLICATIONS

International Search Report mailed Nov. 22, 2011 issued in corresponding International Application No. PCT/JP2011/004577.

Primary Examiner — Thong Nguyen
(74) Attorney, Agent, or Firm — McDermott Will & Emery LLP

(57) ABSTRACT

A zoom lens system wherein a positive lens unit located closest to an object side is fixed with respect to an image surface in zooming, a negative lens unit, among lens units located on an image side relative to an aperture diaphragm, is a focusing lens unit which moves along an optical axis in focusing, and the conditions: $-1.8 < f_n/f_W < -0.3$ and $0.1 < T_1/f_W < 1.5$ ($f_n$: a composite focal length of the negative lens unit, $T_1$: an axial thickness of the positive lens unit located closest to the object side, $f_W$: a focal length of the entire system at a wide-angle limit) are satisfied.

23 Claims, 37 Drawing Sheets

(51) Int. Cl.
*G02B 15/22* (2006.01)
*G02B 15/173* (2006.01)

(56) References Cited

U.S. PATENT DOCUMENTS

| | | |
|---|---|---|
| 5,847,882 A | 12/1998 | Nakayama |
| 6,025,962 A | 2/2000 | Suzuki |
| 6,101,043 A * | 8/2000 | Kohno et al. ............... 359/687 |
| 6,392,816 B1 * | 5/2002 | Hamano ..................... 359/683 |
| 2004/0263997 A1 | 12/2004 | Noda |
| 2006/0056831 A1 * | 3/2006 | Horio et al. ................. 396/55 |
| 2006/0066953 A1 | 3/2006 | Nishio et al. |
| 2006/0066955 A1 | 3/2006 | Satori et al. |
| 2006/0279850 A1 | 12/2006 | Horiuchi |
| 2007/0070513 A1 | 3/2007 | Yamashita et al. |
| 2007/0229971 A1 | 10/2007 | Souma |
| 2009/0135500 A1 | 5/2009 | Sudoh et al. |
| 2011/0205636 A1 * | 8/2011 | Ito ................................ 359/684 |
| 2012/0092777 A1 * | 4/2012 | Tochigi et al. ............... 359/684 |

FOREIGN PATENT DOCUMENTS

| | | | | |
|---|---|---|---|---|
| JP | 8-146295 | * | 6/1996 | ............ 359/676 |
| JP | 10-111455 A | | 4/1998 | |
| JP | 2001-075008 A | | 3/2001 | |
| JP | 2002-228931 A | | 8/2002 | |
| JP | 2005-037935 A | | 2/2005 | |
| JP | 2006-098686 A | | 4/2006 | |
| JP | 2006-098962 A | | 4/2006 | |
| JP | 2006-337745 A | | 12/2006 | |
| JP | 2007-072291 A | | 3/2007 | |
| JP | 2007-094135 A | | 4/2007 | |
| JP | 2007-279077 A | | 10/2007 | |
| JP | 2009-025380 A | | 2/2009 | |
| JP | 2009-128620 A | | 6/2009 | |

* cited by examiner

ZOOM LENS SYSTEM, INTERCHANGEABLE LENS APPARATUS AND CAMERA SYSTEM

RELATED APPLICATIONS

This application is a Continuation of International Application No. PCT/JP2011/004577, filed on Aug. 12, 2011, which in turn claims the benefit of Japanese Application No. 2010-187331, filed on Aug. 24, 2010, the disclosures of which Applications are incorporated by reference herein.

BACKGROUND

1. Field

The present disclosure relates to zoom lens systems, interchangeable lens apparatuses, and camera systems.

2. Description of the Related Art

In recent years, interchangeable-lens type digital camera systems (also referred to simply as "camera systems", hereinafter) have been spreading rapidly. Such interchangeable-lens type digital camera systems realize: taking of high-sensitive and high-quality images; high-speed focusing and high-speed image processing after image taking; and easy replacement of an interchangeable lens apparatus in accordance with a desired scene. Meanwhile, an interchangeable lens apparatus having a zoom lens system that forms an optical image with variable magnification is popular because it allows free change of focal length without the necessity of lens replacement.

Compact zoom lens systems having a high zooming ratio and excellent optical performance from a wide-angle limit to a telephoto limit have been desired as zoom lens systems to be used in interchangeable lens apparatuses. Various kinds of zoom lens systems having multiple-unit constructions have been proposed. In each of such zoom lens systems, focusing can be performed by moving some of lens units in the lens system in a direction along the optical axis.

Japanese Patent No. 3054185 discloses a zoom lens having a six-unit construction of positive, negative, positive, negative, positive, and positive, wherein variable magnification is performed by moving the fourth lens unit with the second lens unit being fixed with respect to the object side, and focusing is performed by moving the sixth lens unit.

Japanese Laid-Open Patent Publication No. 10-111455 discloses a zoom lens having a five-unit construction of positive, negative, positive, negative, and positive, wherein at least the fifth lens unit is moved to the object side at the time of zooming to change the intervals between the respective lens units, and the whole or part of the second lens unit or an image blur compensating lens unit is moved to perform focusing.

Japanese Laid-Open Patent Publication No. 2007-279077 discloses a variable magnification optical system having at least a four-unit construction of negative, positive, negative, and positive, wherein at least the second lens unit and the fourth lens unit are moved to change the intervals between the respective lens units. When the variable magnification optical system has a five-unit construction or a six-unit construction, the fifth lens unit is moved to perform focusing.

SUMMARY

The present disclosure provides a compact and lightweight zoom lens system in which aberration fluctuation in association with focusing is reduced, and aberrations particularly in a close-object in-focus condition are sufficiently compensated to provide excellent optical performance over the entire focusing condition. Further, the present disclosure provides an interchangeable lens apparatus and a camera system each employing the zoom lens system.

The novel concepts disclosed herein were achieved in order to solve the foregoing problems in the related art, and herein is disclosed:

a zoom lens system having a plurality of lens units, each lens unit being composed of at least one lens element, wherein in zooming from a wide-angle limit to a telephoto limit at the time of image taking, a lens unit located closest to an object side is fixed with respect to an image surface, the lens unit located closest to the object side has positive optical power, among lens units located on an image side relative to an aperture diaphragm, a lens unit having negative optical power is a focusing lens unit which moves along an optical axis in at least one zooming position from a wide-angle limit to a telephoto limit, in focusing from an infinity in-focus condition to a close-object in-focus condition, and the following conditions (1) and (2) are satisfied:

$$-1.8 < f_n/f_W < -0.3 \quad (1)$$

$$0.1 < T_1/f_W < 1.5 \quad (2)$$

where $f_n$ is a composite focal length of the lens unit having negative optical power, which is a focusing lens unit, $T_1$ is an axial thickness of the lens unit located closest to the object side, and $f_W$ is a focal length of the entire system at a wide-angle limit.

The novel concepts disclosed herein were achieved in order to solve the foregoing problems in the related art, and herein is disclosed:

an interchangeable lens apparatus comprising:

a zoom lens system; and a lens mount section which is connectable to a camera body including an image sensor for receiving an optical image formed by the zoom lens system and converting the optical image into an electric image signal, wherein the zoom lens system has a plurality of lens units, each lens unit being composed of at least one lens element, in which in zooming from a wide-angle limit to a telephoto limit at the time of image taking, a lens unit located closest to an object side is fixed with respect to an image surface, the lens unit located closest to the object side has positive optical power, among lens units located on an image side relative to an aperture diaphragm, a lens unit having negative optical power is a focusing lens unit which moves along an optical axis in at least one zooming position from a wide-angle limit to a telephoto limit, in focusing from an infinity in-focus condition to a close-object in-focus condition, and the following conditions (1) and (2) are satisfied:

$$-1.8 < f_n/f_W < -0.3 \quad (1)$$

$$0.1 < T_1/f_W < 1.5 \quad (2)$$

where $f_n$ is a composite focal length of the lens unit having negative optical power, which is a focusing lens unit, $T_1$ is an axial thickness of the lens unit located closest to the object side, and $f_W$ is a focal length of the entire system at a wide-angle limit.

The novel concepts disclosed herein were achieved in order to solve the foregoing problems in the related art, and herein is disclosed:

a camera system comprising:

an interchangeable lens apparatus including a zoom lens system; and a camera body which is detachably connected to the interchangeable lens apparatus via a camera mount section, and includes an image sensor for receiving an optical image formed by the zoom lens system and converting the optical image into an electric image signal, wherein the zoom lens system has a plurality of lens units, each lens unit being composed of at least one lens element, in which in zooming from a wide-angle limit to a telephoto limit at the time of image taking, a lens unit located closest to an object side is fixed with respect to an image surface, the lens unit located closest to the object side has positive optical power, among lens units located on an image side relative to an aperture diaphragm, a lens unit having negative optical power is a focusing lens unit which moves along an optical axis in at least one zooming position from a wide-angle limit to a telephoto limit, in focusing from an infinity in-focus condition to a close-object in-focus condition, and the following conditions (1) and (2) are satisfied:

$$-1.8 < f_n/f_W < -0.3 \quad (1)$$

$$0.1 < T_1/f_W < 1.5 \quad (2)$$

where $f_n$ is a composite focal length of the lens unit having negative optical power, which is a focusing lens unit, $T_1$ is an axial thickness of the lens unit located closest to the object side, and $f_W$ is a focal length of the entire system at a wide-angle limit.

The zoom lens system according to the present disclosure has a relatively high zooming ratio, reduced aberration fluctuation in association with focusing, and excellent optical performance over the entire focusing condition with sufficiently compensated aberrations particularly in a close-object in-focus condition, and moreover, is compact and lightweight.

BRIEF DESCRIPTION OF THE DRAWINGS

This and other objects and features of the present disclosure will become clear from the following description, taken in conjunction with the exemplary embodiments with reference to the accompanied drawings in which.

DETAILED DESCRIPTION

Figure 1:
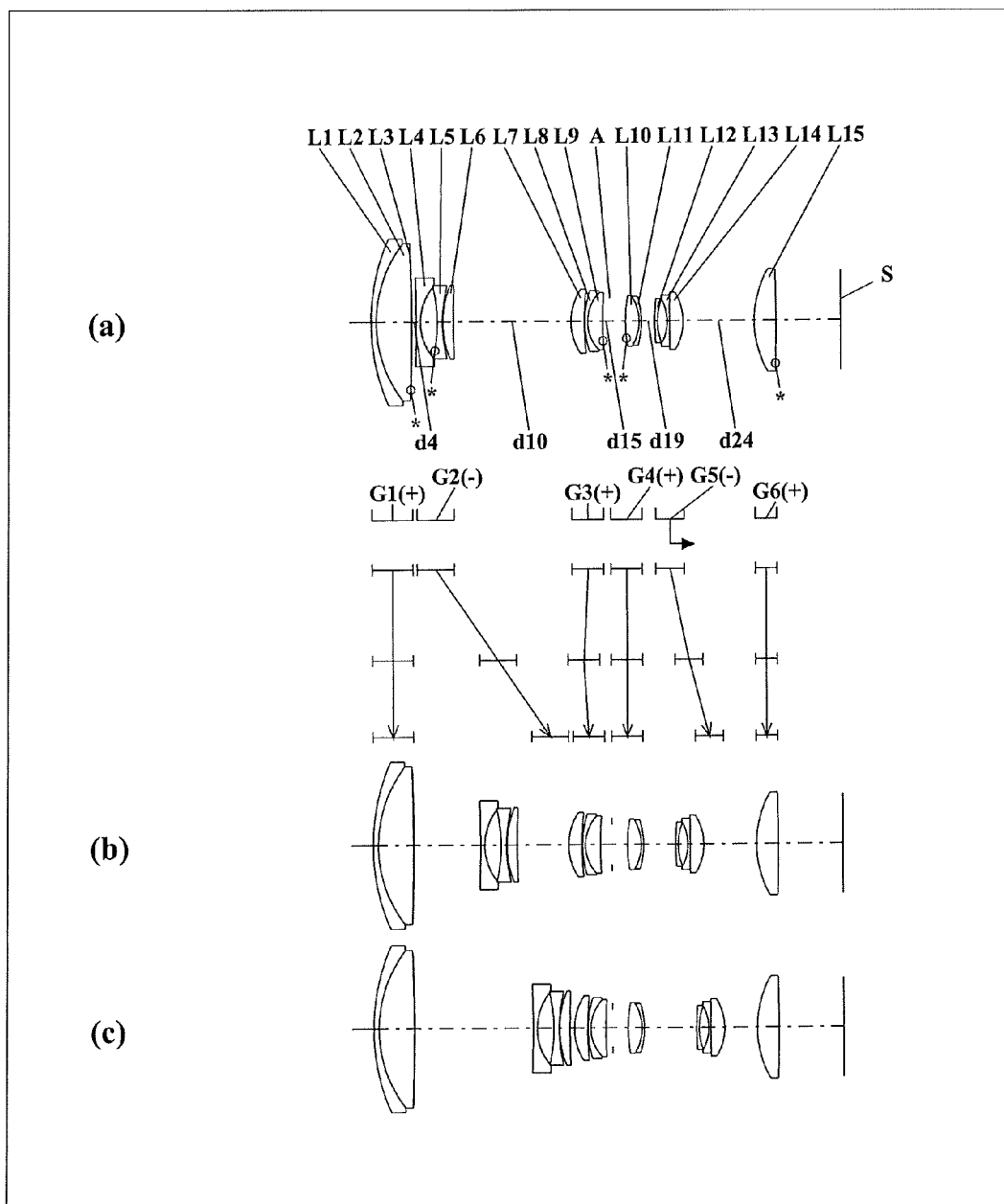
FIG. 1 is a lens arrangement diagram showing an infinity in-focus condition of a zoom lens system according to Embodiment 1 (Numerical Example 1)
Figure 2:
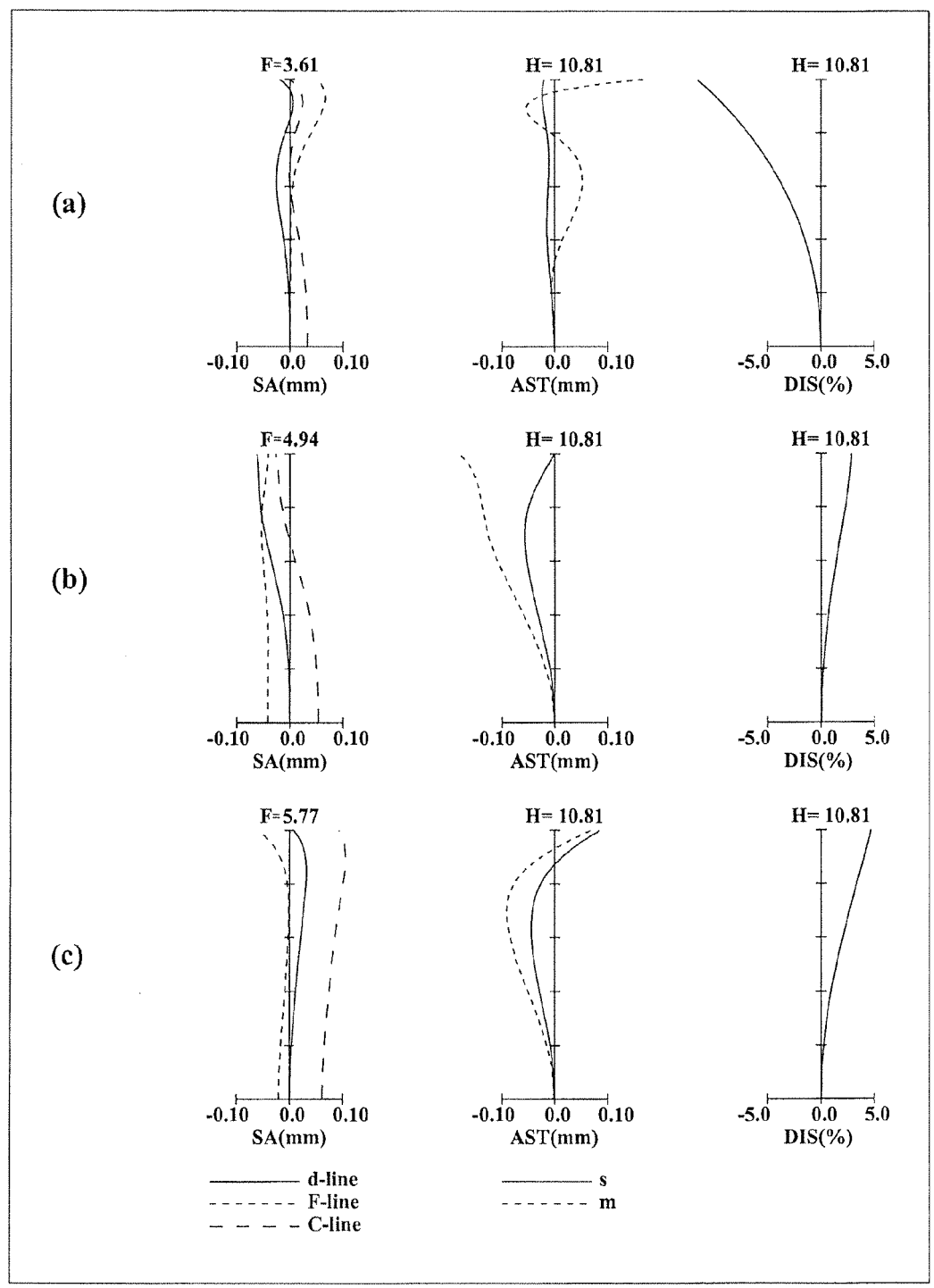
FIG. 2 is a longitudinal aberration diagram of an infinity in-focus condition of a zoom lens system according to Numerical Example 1.
Figure 3:
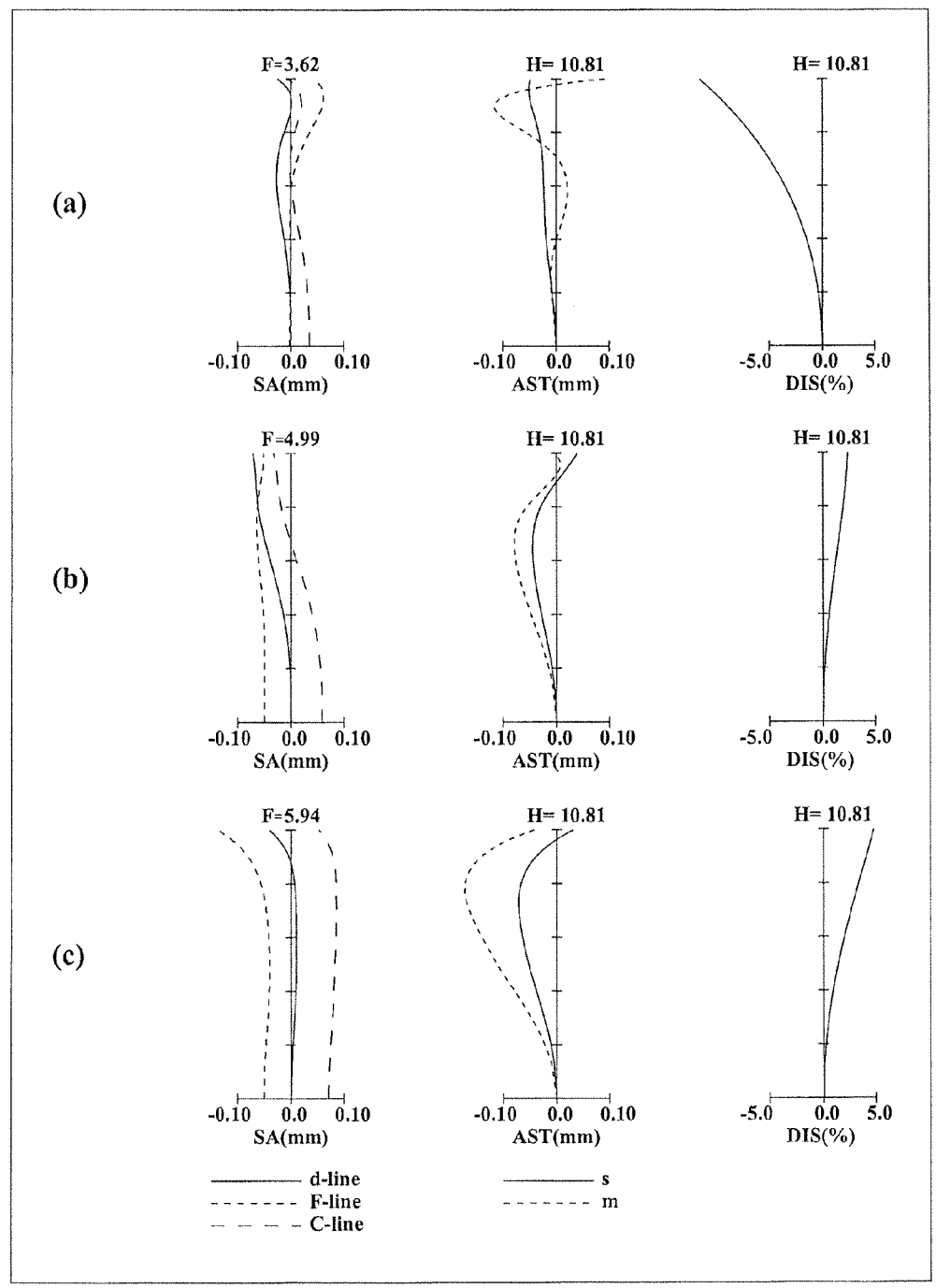
FIG. 3 is a longitudinal aberration diagram of a close-object in-focus condition of a zoom lens system according to Numerical Example 1.
Figure 4:
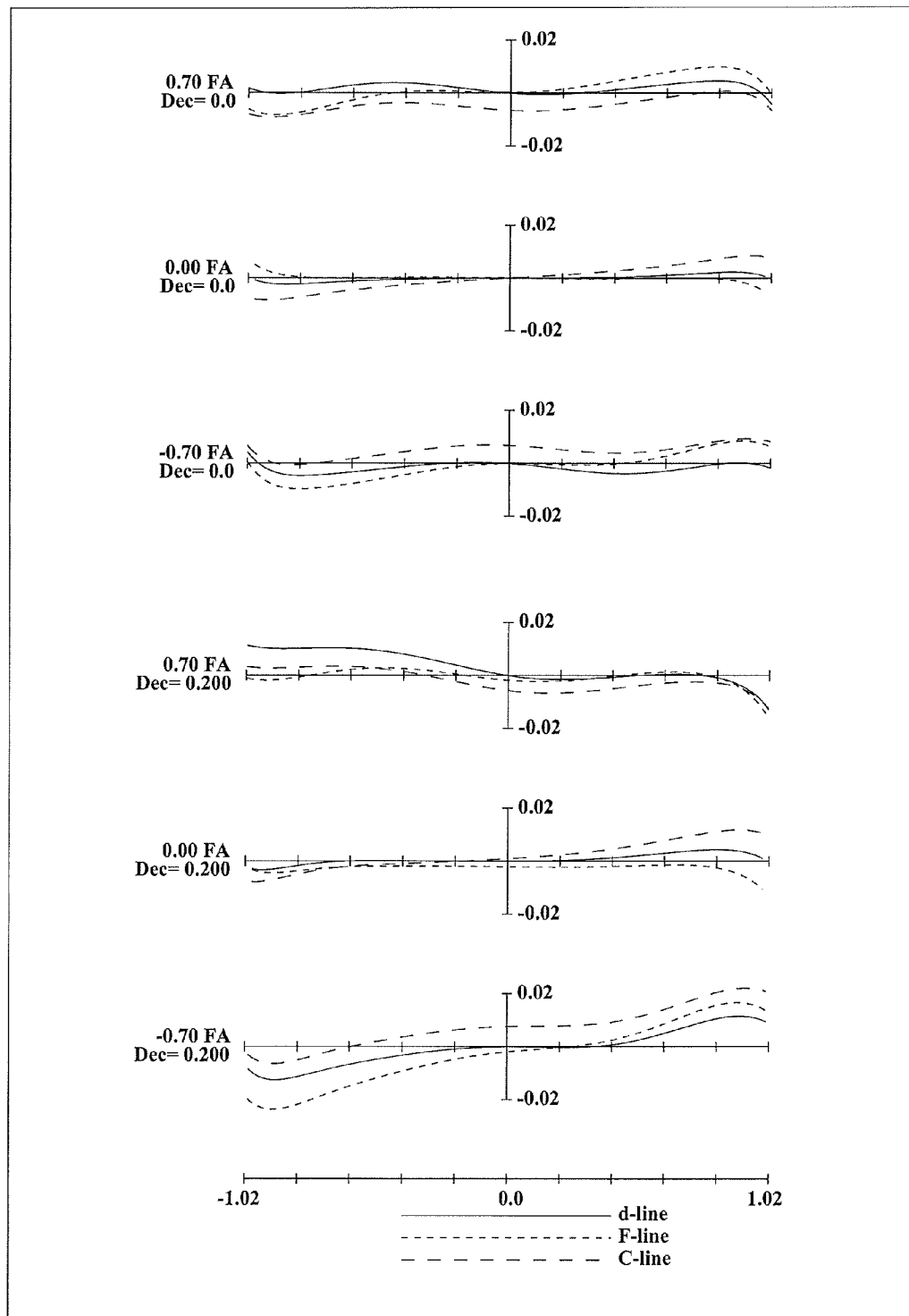
FIG. 4 is a lateral aberration diagram of a zoom lens system according to Numerical Example 1 at a telephoto limit in a basic state where image blur compensation is not performed and in an image blur compensation state.

Hereinafter, embodiments will be described with reference to the drawings as appropriate. However, descriptions more detailed than necessary may be omitted. For example, detailed description of already well known matters or description of substantially identical configurations may be omitted. This is intended to avoid redundancy in the description below, and to facilitate understanding of those skilled in the art.

It should be noted that the applicants provide the attached drawings and the following description so that those skilled in the art can fully understand this disclosure. Therefore, the drawings and description are not intended to limit the subject defined by the claims.

Embodiments 1 to 9

FIGS. 1, 5, 9, 13, 17, 21, 25, 29, and 33 are lens arrangement diagrams of zoom lens systems according to Embodiments 1 to 9, respectively, and each of the zoom lens systems is in an infinity in-focus condition.

In each Fig., part (a) shows a lens configuration at a wide-angle limit (in the minimum focal length condition: focal length $f_W$), part (b) shows a lens configuration at a middle position (in an intermediate focal length condition: focal length $f_M = \sqrt{(f_W * f_T)}$), and part (c) shows a lens configuration at a telephoto limit (in the maximum focal length condition: focal length $f_T$). Further, in each Fig., each bent arrow located between part (a) and part (b) indicates a line obtained by connecting the positions of each lens unit respectively at a wide-angle limit, a middle position and a telephoto limit, in order from the top. In the part between the wide-angle limit and the middle position and the part between the middle position and the telephoto limit, the positions are connected simply with a straight line, and hence this line does not indicate actual motion of each lens unit.

Moreover, in each Fig., an arrow imparted to a lens unit indicates focusing from an infinity in-focus condition to a close-object in-focus condition. That is, in FIGS. 1, 5, and 25, the arrow indicates the moving direction of a fifth lens unit G5 described later, in focusing from an infinity in-focus condition to a close-object in-focus condition. In FIGS. 9, 13, 17, 21, 29, and 33, the arrow indicates the moving direction of a fourth lens unit G4 described later, in focusing from an infinity in-focus condition to a close-object in-focus condition. In FIGS. 1, 5, 9, 13, 17, 21, 25, 29, and 33, since the symbols of the respective lens units are imparted to part (a), the arrow indicating focusing is placed beneath each symbol of each lens unit for the convenience sake. However, the direction along which each lens unit moves in focusing in each zooming condition will be hereinafter described in detail for each embodiment.

Each of the zoom lens systems according to Embodiments 1, 2, and 7, in order from the object side to the image side, comprises a first lens unit G1 having positive optical power, a second lens unit G2 having negative optical power, a third lens unit G3 having positive optical power, a fourth lens unit G4 having positive optical power, a fifth lens unit G5 having negative optical power, and a sixth lens unit G6 having positive optical power. In the zoom lens system according to each Embodiment, in zooming, the second lens unit G2, the third lens unit G3, and the fifth lens unit G5 individually move in the direction along the optical axis so that the intervals between the respective lens units, i.e., the interval between the first lens unit G1 and the second lens unit G2, the interval between the second lens unit G2 and the third lens unit G3, the interval between the third lens unit G3 and the fourth lens unit G4, the interval between the fourth lens unit G4 and the fifth lens unit G5, and the interval between the fifth lens unit G5 and the sixth lens unit G6, vary. In the zoom lens system according to each Embodiment, these lens units are arranged in a desired optical power configuration, thereby achieving size reduction of the entire lens system while maintaining high optical performance.

Each of the zoom lens systems according to Embodiments 3, 4, and 8, in order from the object side to the image side, comprises a first lens unit G1 having positive optical power, a second lens unit G2 having negative optical power, a third lens unit G3 having positive optical power, a fourth lens unit G4 having negative optical power, a fifth lens unit G5 having negative optical power, and a sixth lens unit G6 having positive optical power. In the zoom lens system according to each Embodiment, in zooming, the second lens unit G2, the fourth lens unit G4, and the fifth lens unit G5 individually move in the direction along the optical axis so that the intervals between the respective lens units, i.e., the interval between the first lens unit G1 and the second lens unit G2, the interval between the second lens unit G2 and the third lens unit G3, the interval between the third lens unit G3 and the fourth lens unit G4, the interval between the fourth lens unit G4 and the fifth lens unit G5, and the interval between the fifth lens unit G5 and the sixth lens unit G6, vary. In the zoom lens system according to each Embodiment, these lens units are arranged in a desired optical power configuration, thereby achieving size reduction of the entire lens system while maintaining high optical performance.

Each of the zoom lens systems according to Embodiments 5, 6, and 9, in order from the object side to the image side, comprises a first lens unit G1 having positive optical power, a second lens unit G2 having negative optical power, a third lens unit G3 having positive optical power, a fourth lens unit G4 having negative optical power, and a fifth lens unit G5 having positive optical power. In the zoom lens system according to each Embodiment, in zooming, the second lens unit G2, the third lens unit G3, and the fourth lens unit G4 individually move in the direction along the optical axis so that the intervals between the respective lens units, i.e., the interval between the first lens unit G1 and the second lens unit G2, the interval between the second lens unit G2 and the third lens unit G3, the interval between the third lens unit G3 and the fourth lens unit G4, and the interval between the fourth lens unit G4 and the fifth lens unit G5, vary. In the zoom lens system according to each Embodiment, these lens units are arranged in a desired optical power configuration, thereby achieving size reduction of the entire lens system while maintaining high optical performance.

In FIGS. 1, 5, 9, 13, 17, 21, 25, 29, and 33, an asterisk "*" imparted to a particular surface indicates that the surface is aspheric. In each Fig., symbol (+) or (−) imparted to the symbol of each lens unit corresponds to the sign of the optical power of the lens unit. In each Fig., a straight line located on the most right-hand side indicates the position of an image surface S.

Figure 5:
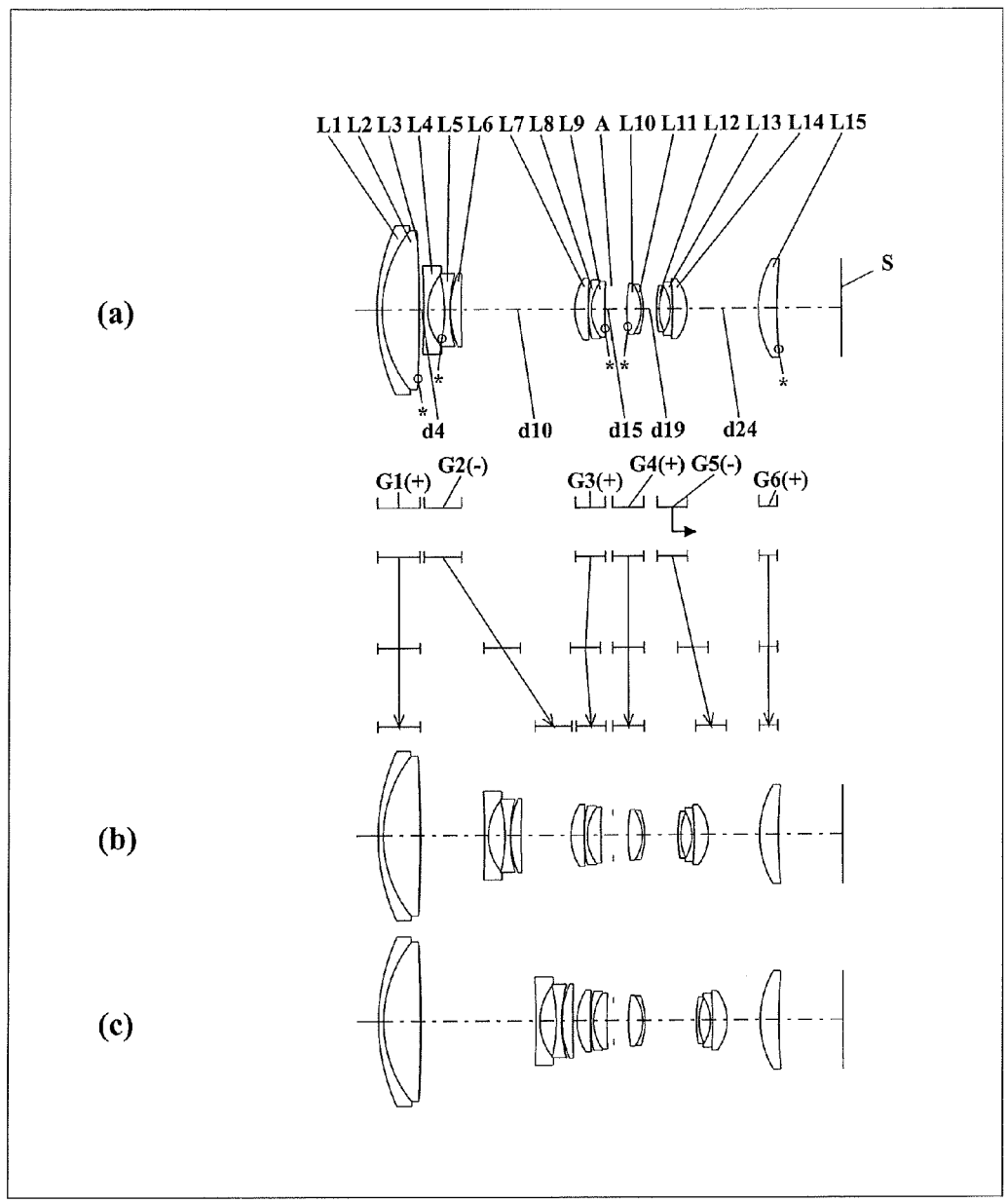
FIG. 5 is a lens arrangement diagram showing an infinity in-focus condition of a zoom lens system according to Embodiment 2 (Numerical Example 2)
Figure 6:
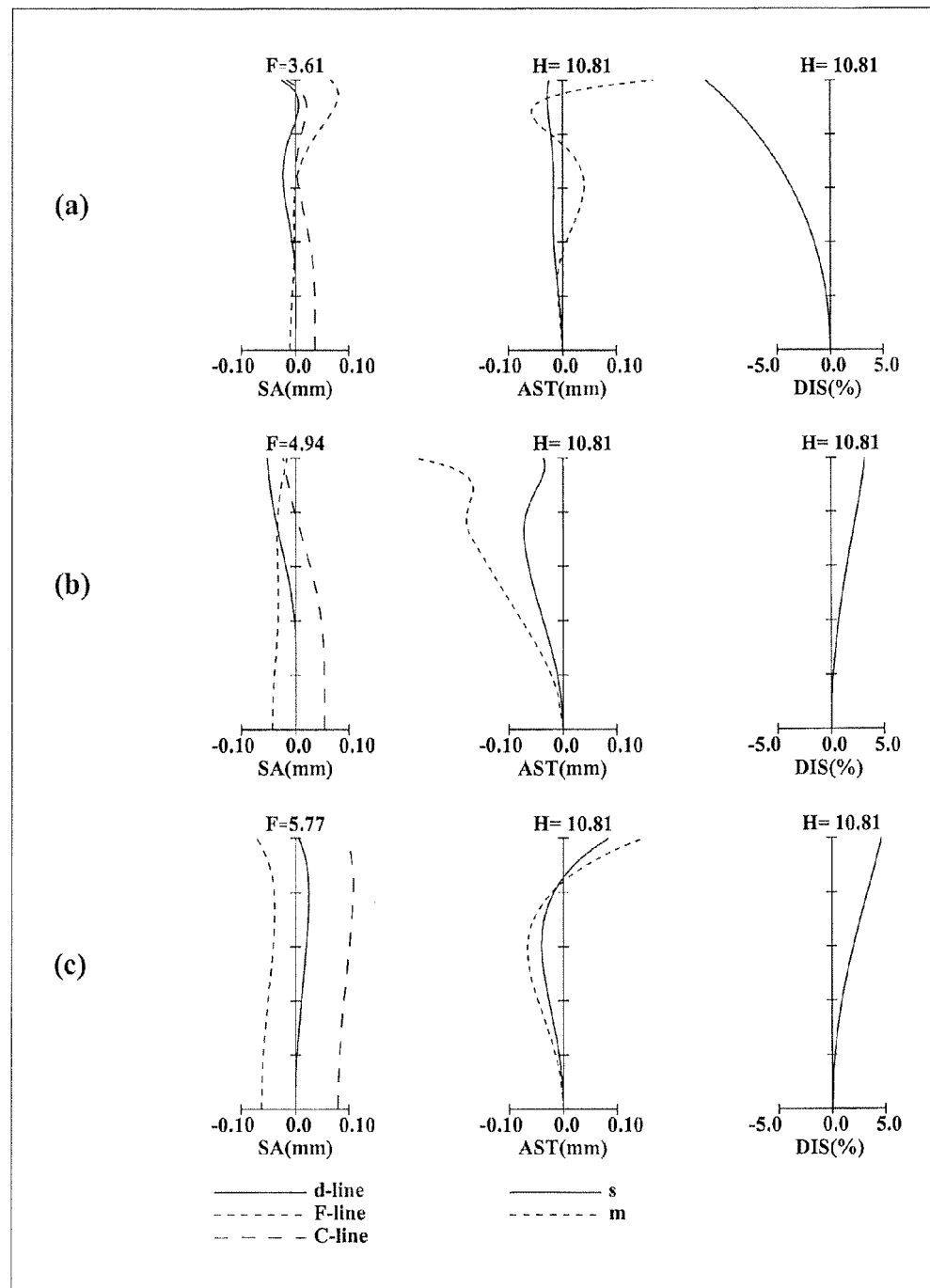
FIG. 6 is a longitudinal aberration diagram of an infinity in-focus condition of a zoom lens system according to Numerical Example 2.
Figure 7:
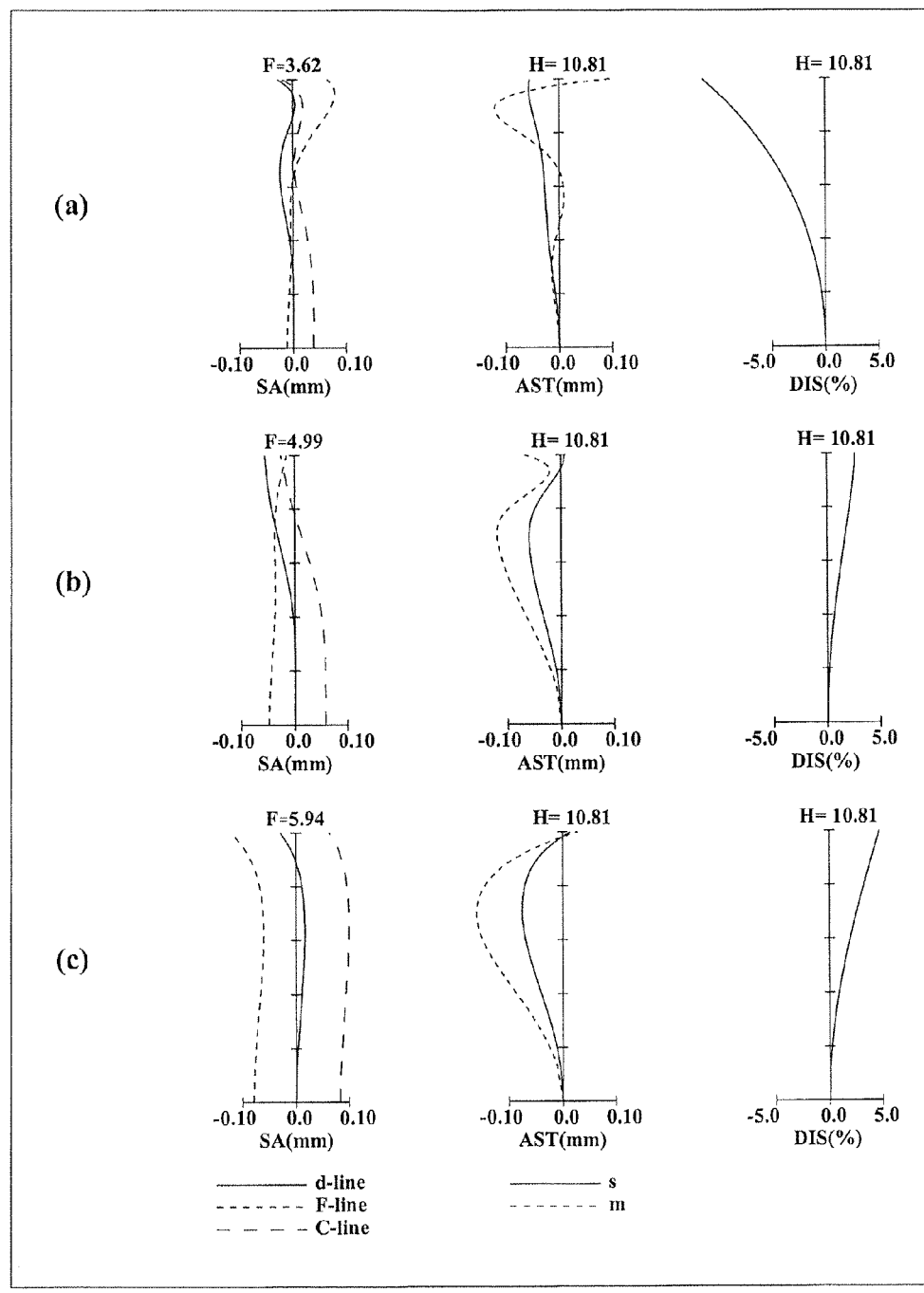
FIG. 7 is a longitudinal aberration diagram of a close-object in-focus condition of a zoom lens system according to Numerical Example 2.
Figure 8:
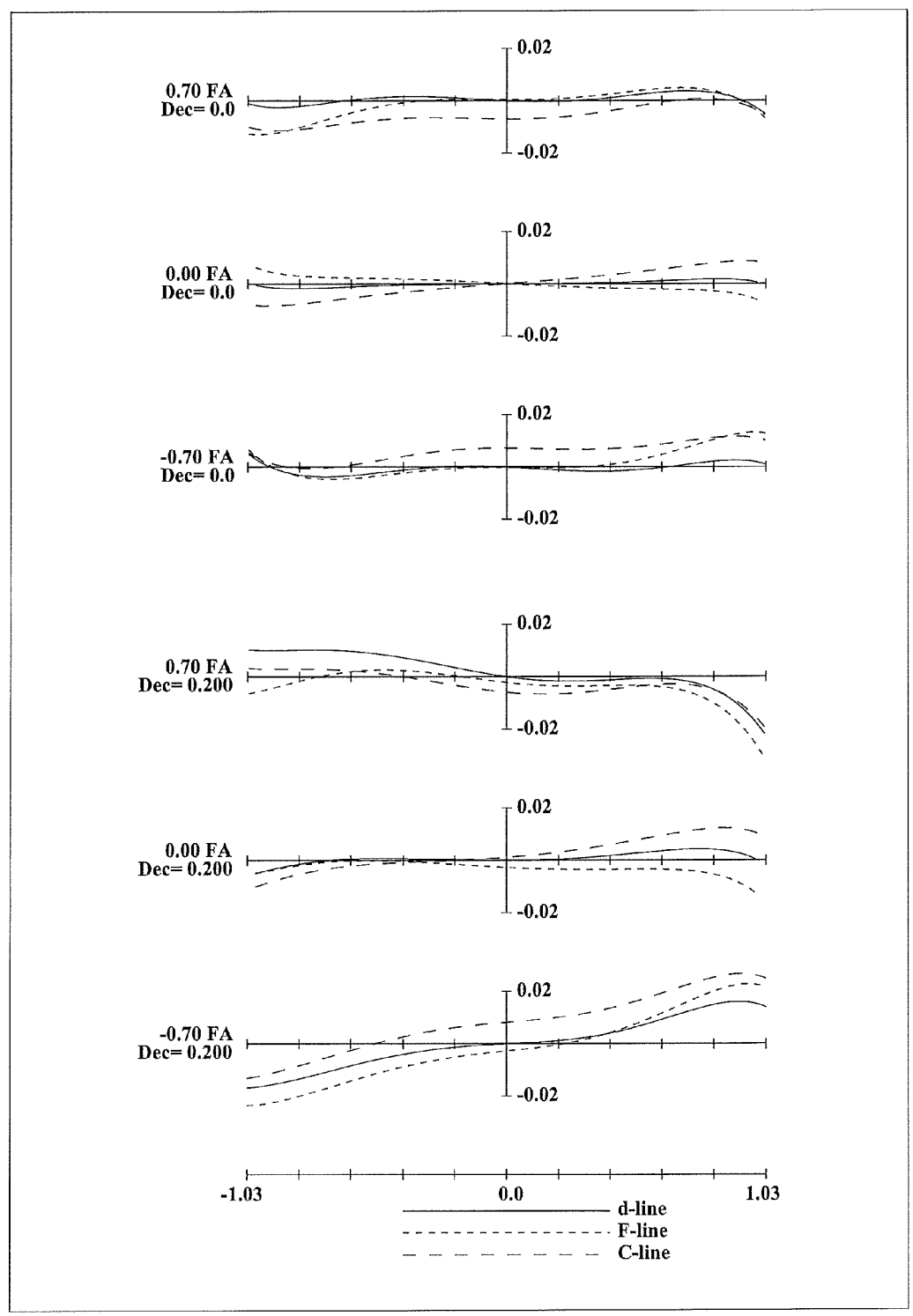
FIG. 8 is a lateral aberration diagram of a zoom lens system according to Numerical Example 2 at a telephoto limit in a basic state where image blur compensation is not performed and in an image blur compensation state.
Figure 9:
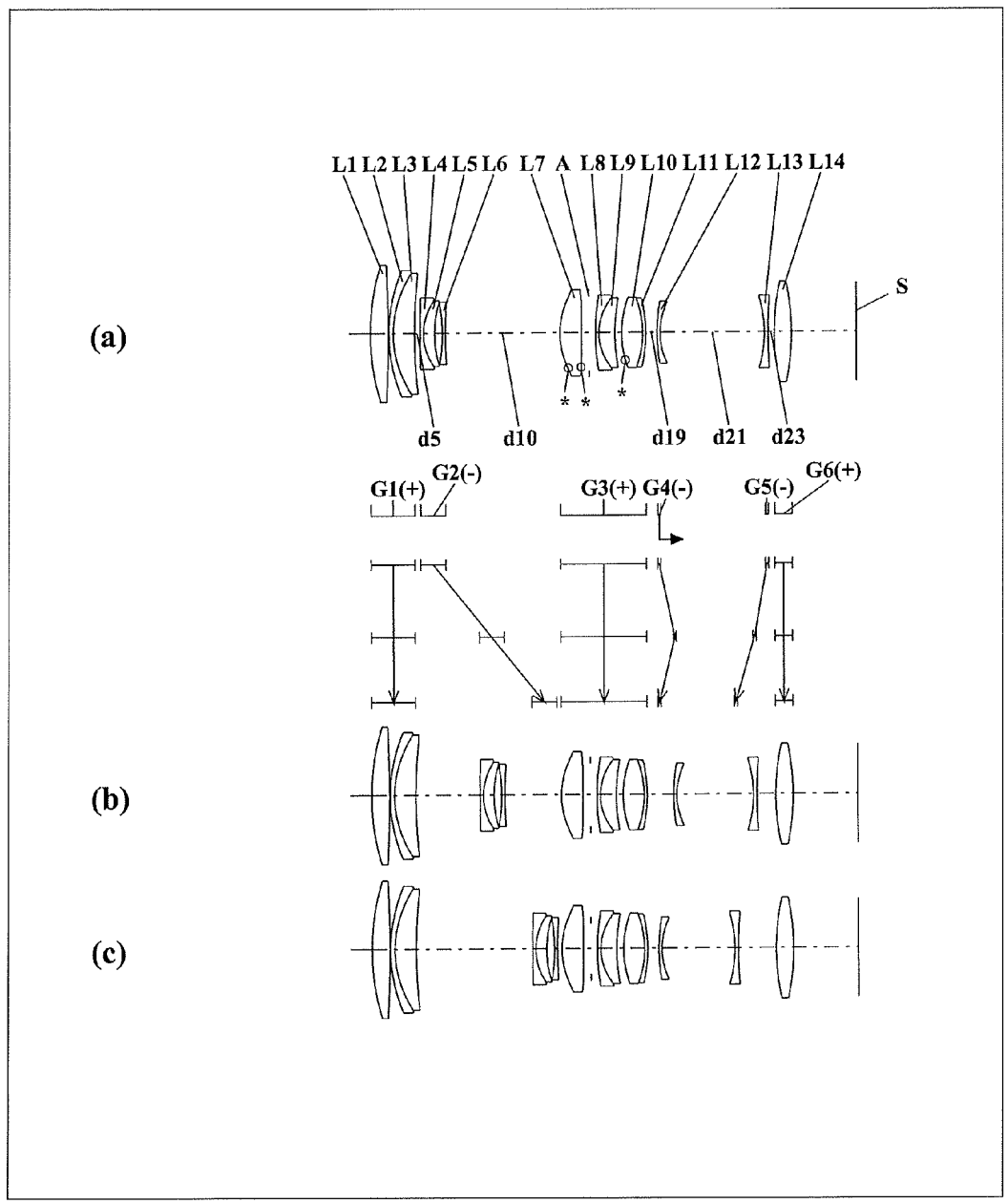
FIG. 9 is a lens arrangement diagram showing an infinity in-focus condition of a zoom lens system according to Embodiment 3 (Numerical Example 3)
Figure 10:
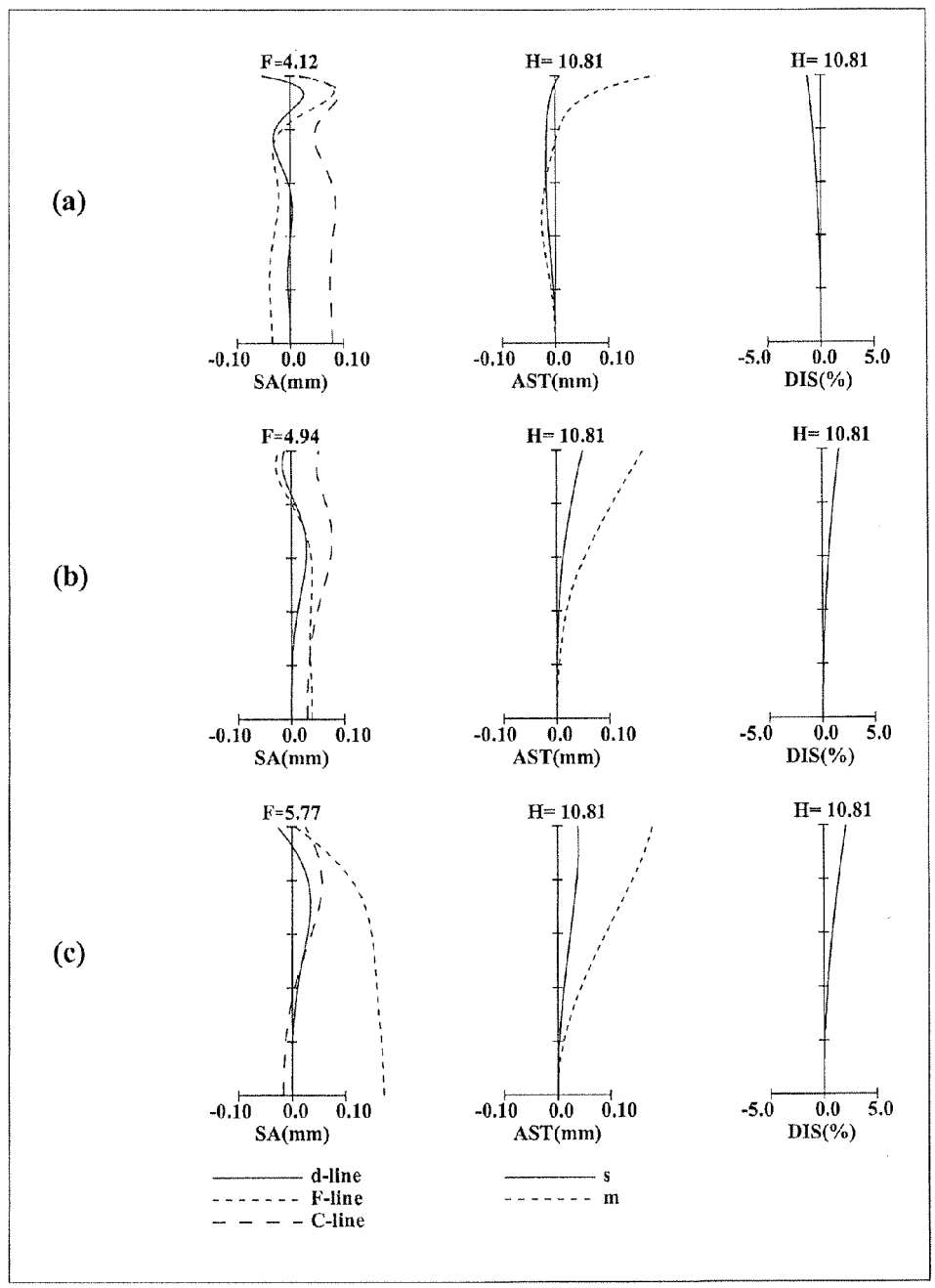
FIG. 10 is a longitudinal aberration diagram of an infinity in-focus condition of a zoom lens system according to Numerical Example 3.
Figure 11:
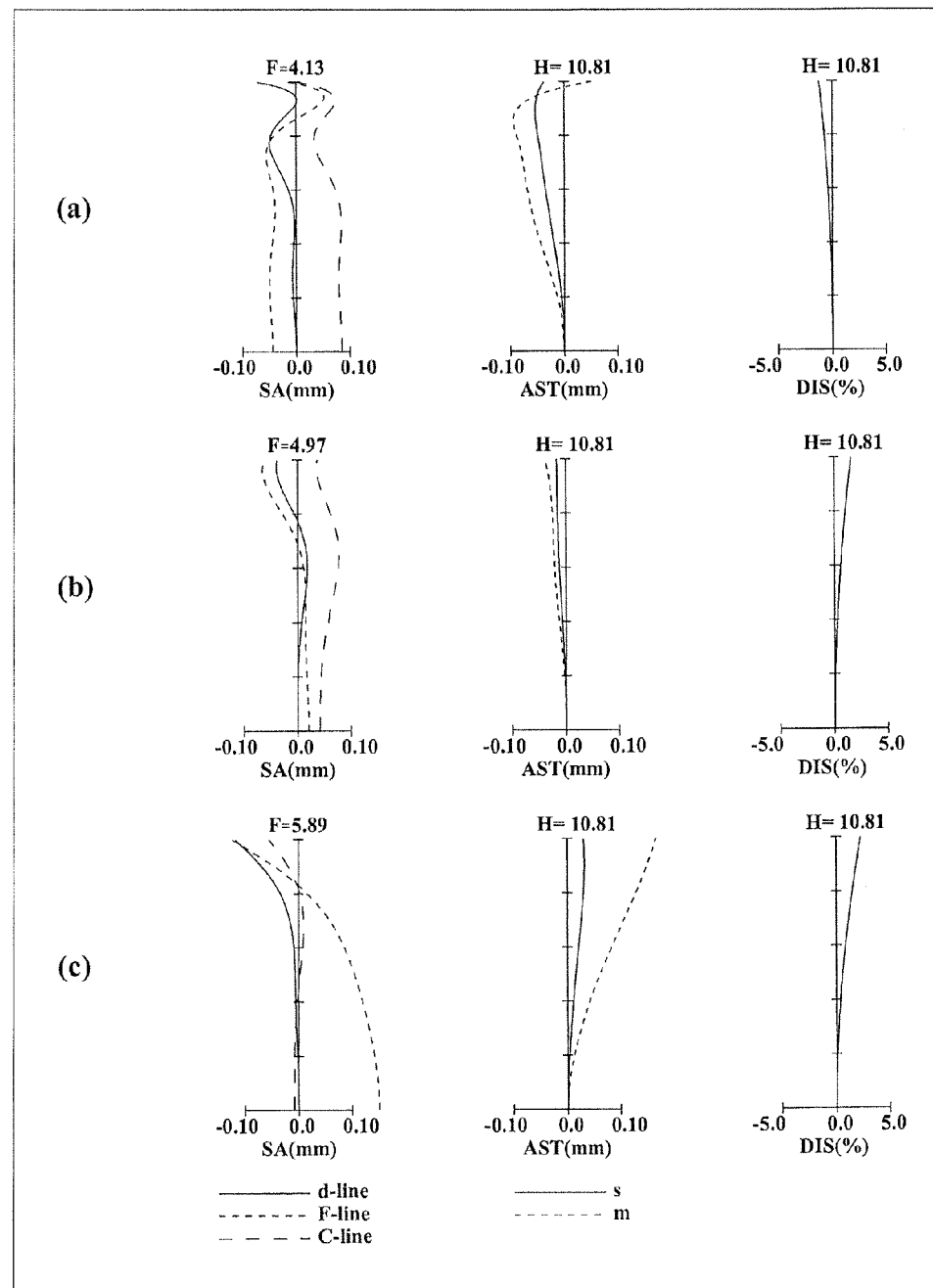
FIG. 11 is a longitudinal aberration diagram of a close-object in-focus condition of a zoom lens system according to Numerical Example 3.
Figure 12:
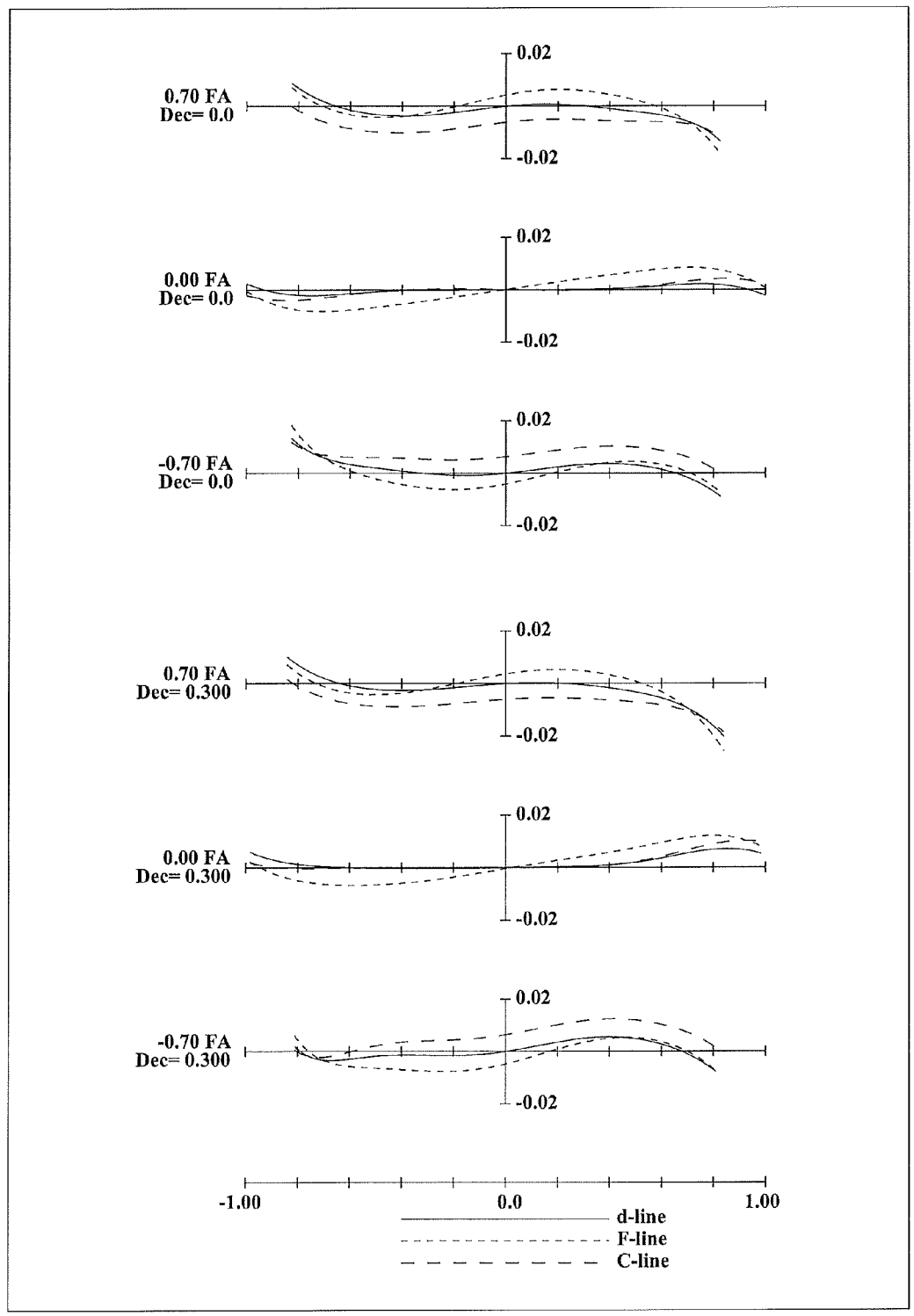
FIG. 12 is a lateral aberration diagram of a zoom lens system according to Numerical Example 3 at a telephoto limit in a basic state where image blur compensation is not performed and in an image blur compensation state.
Figure 13:
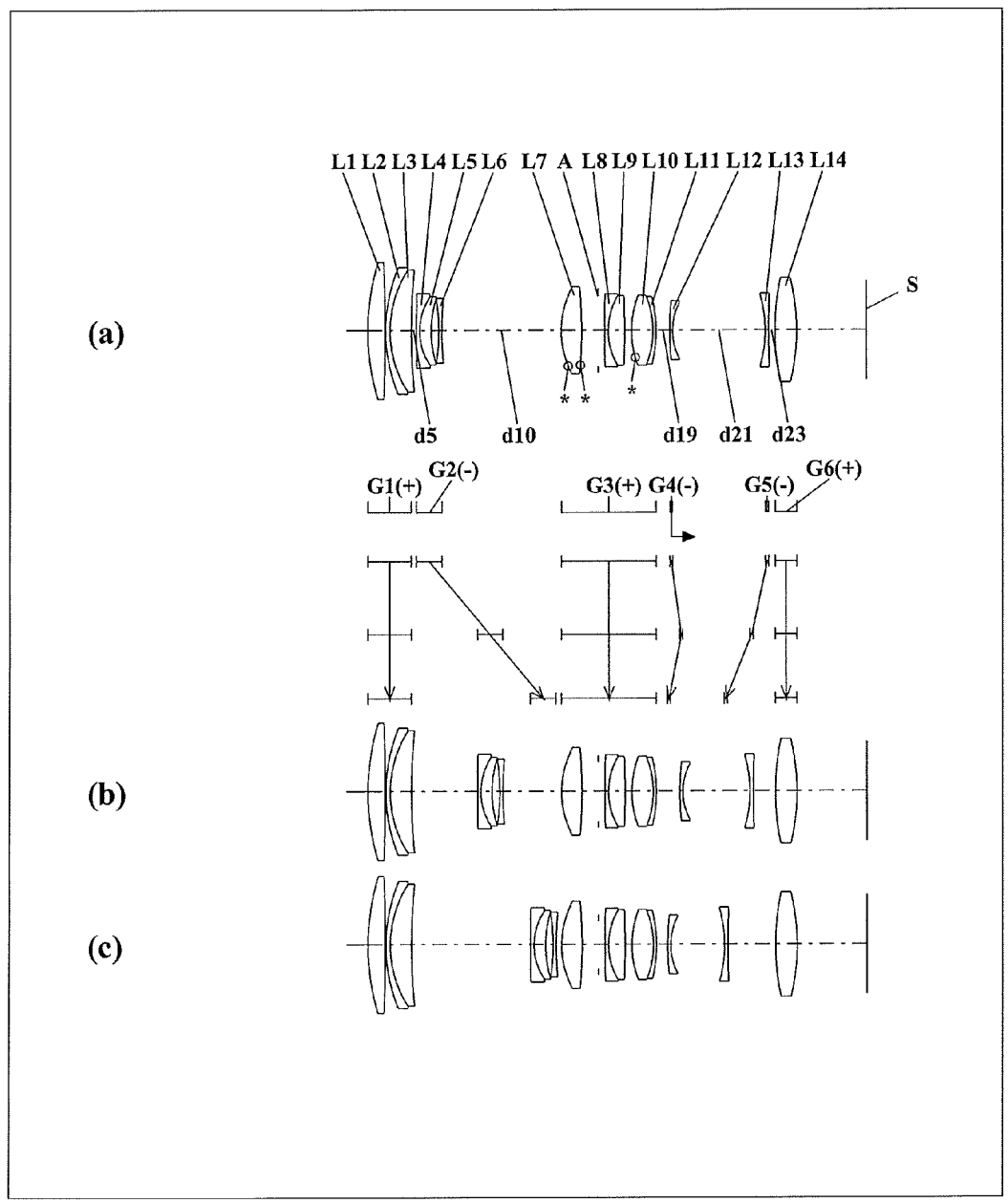
FIG. 13 is a lens arrangement diagram showing an infinity in-focus condition of a zoom lens system according to Embodiment 4 (Numerical Example 4)
Figure 14:
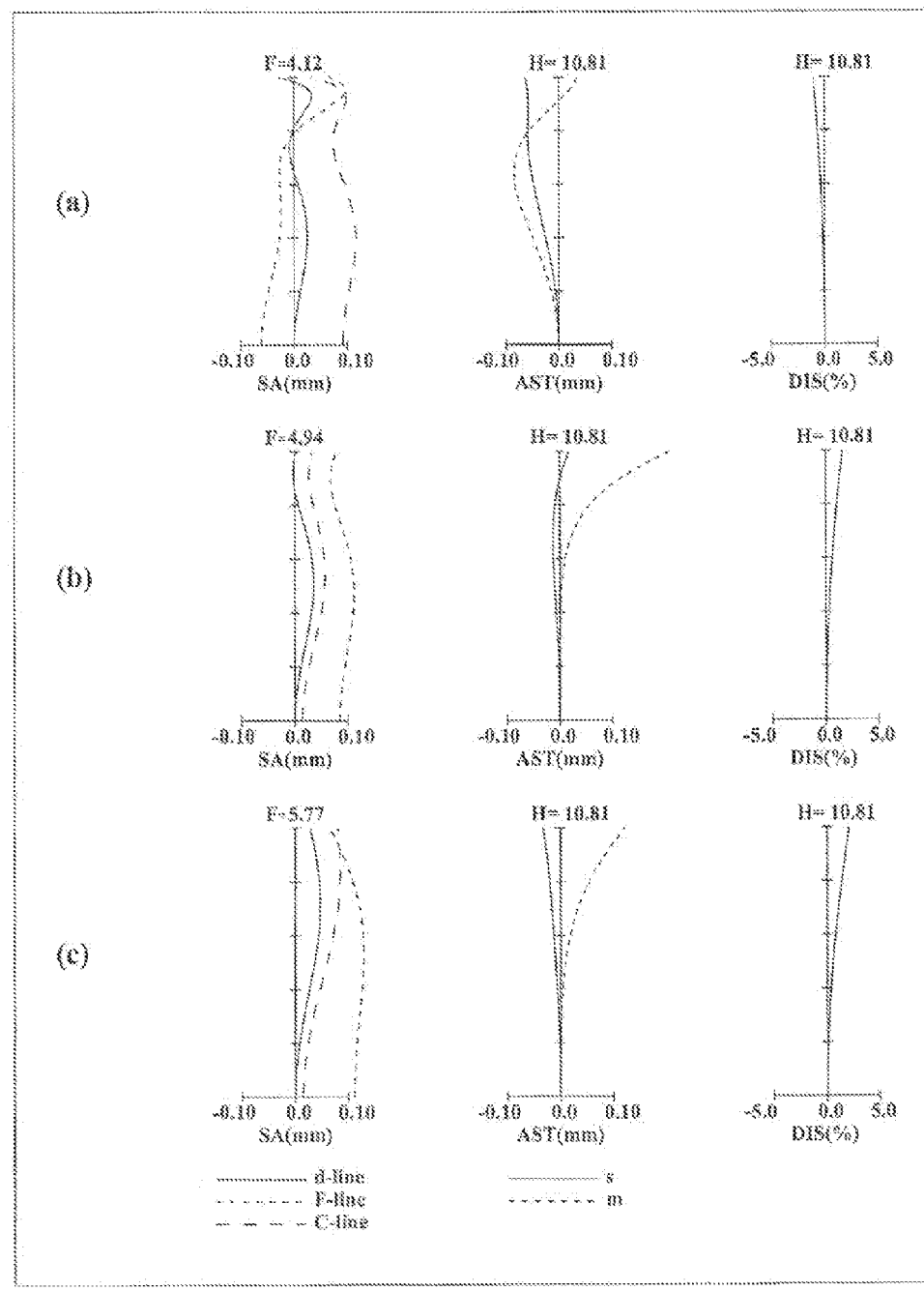
FIG. 14 is a longitudinal aberration diagram of an infinity in-focus condition of a zoom lens system according to Numerical Example 4.
Figure 15:
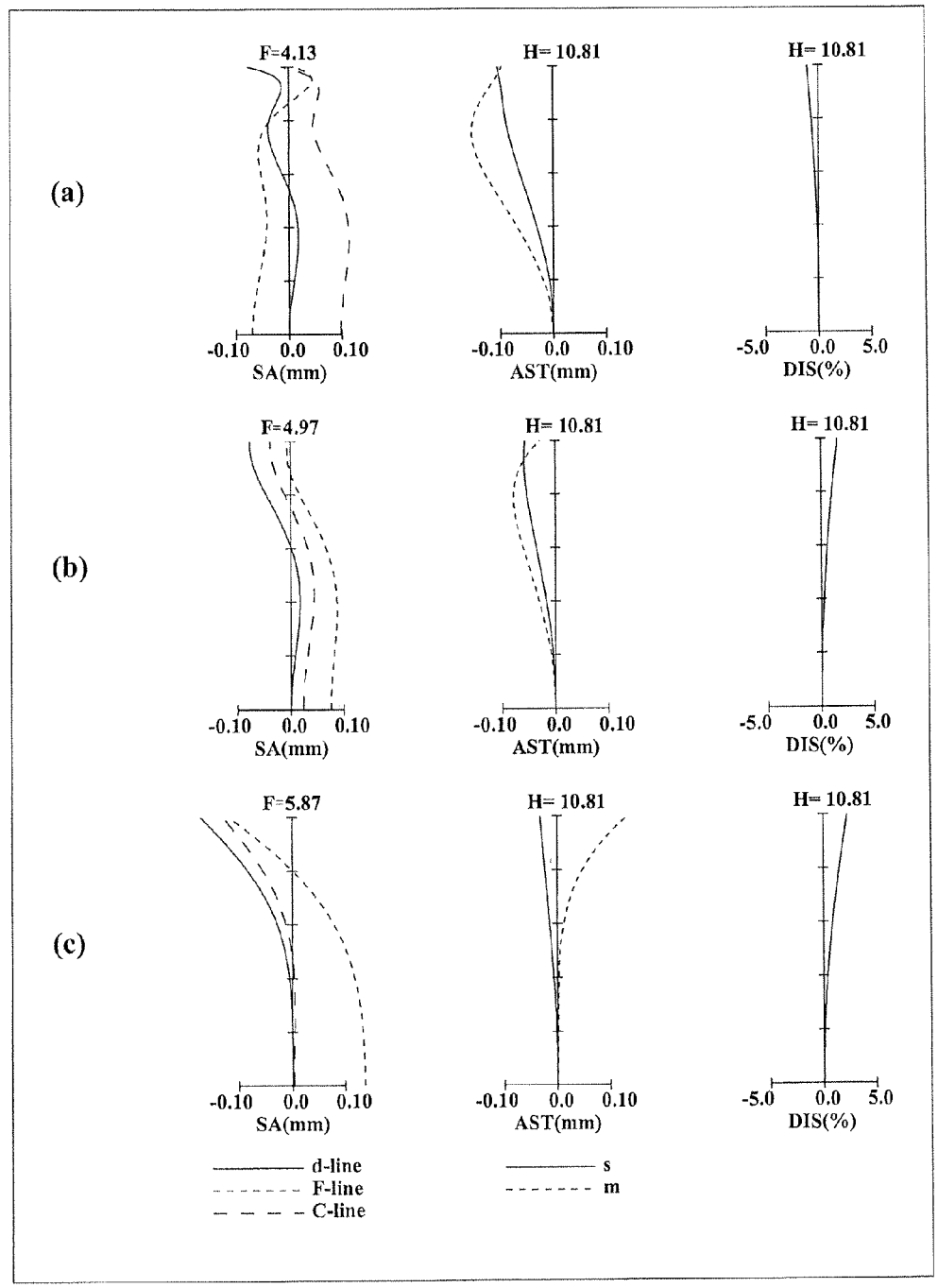
FIG. 15 is a longitudinal aberration diagram of a close-object in-focus condition of a zoom lens system according to Numerical Example 4.
Figure 16:
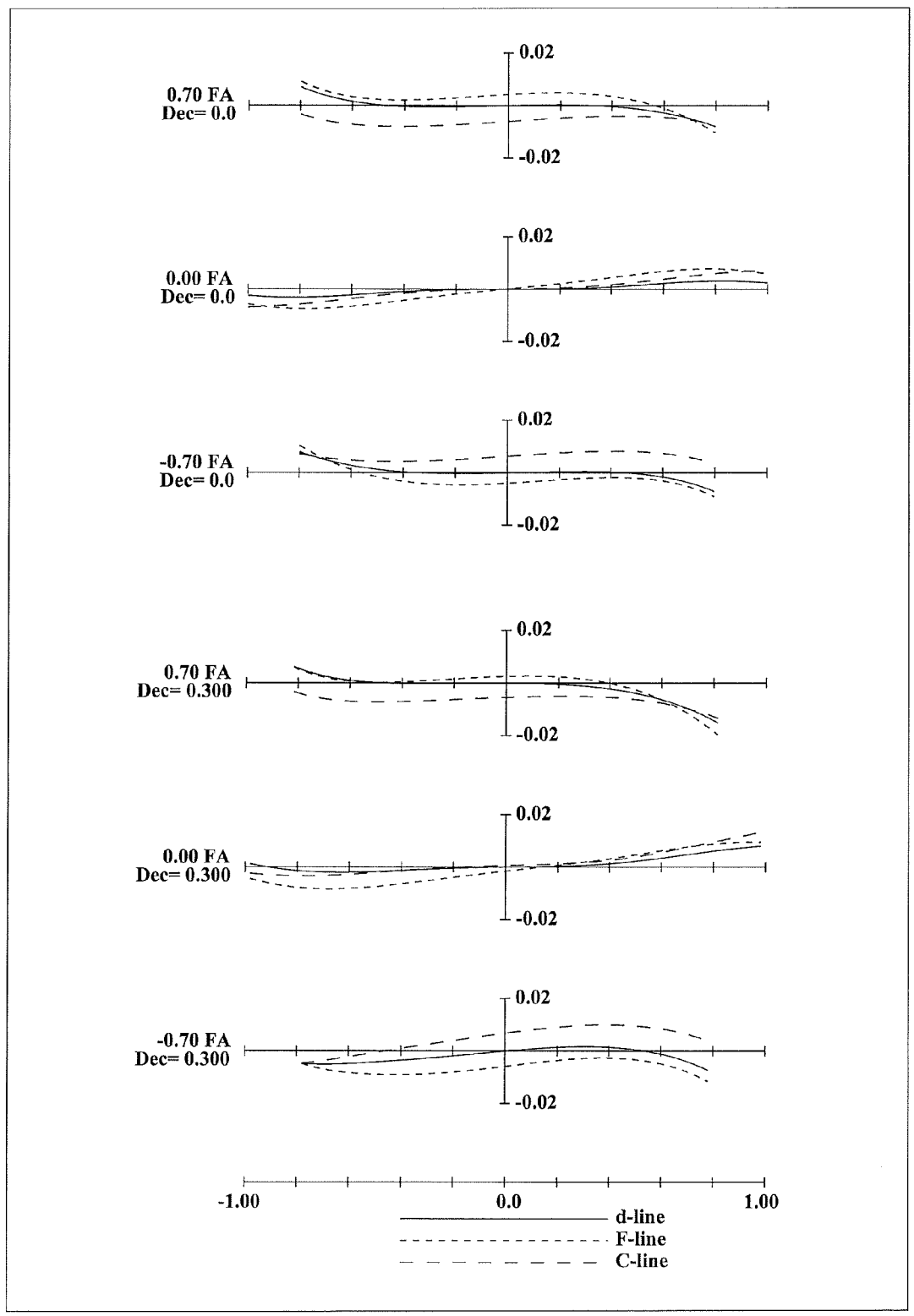
FIG. 16 is a lateral aberration diagram of a zoom lens system according to Numerical Example 4 at a telephoto limit in a basic state where image blur compensation is not performed and in an image blur compensation state.
Figure 17:
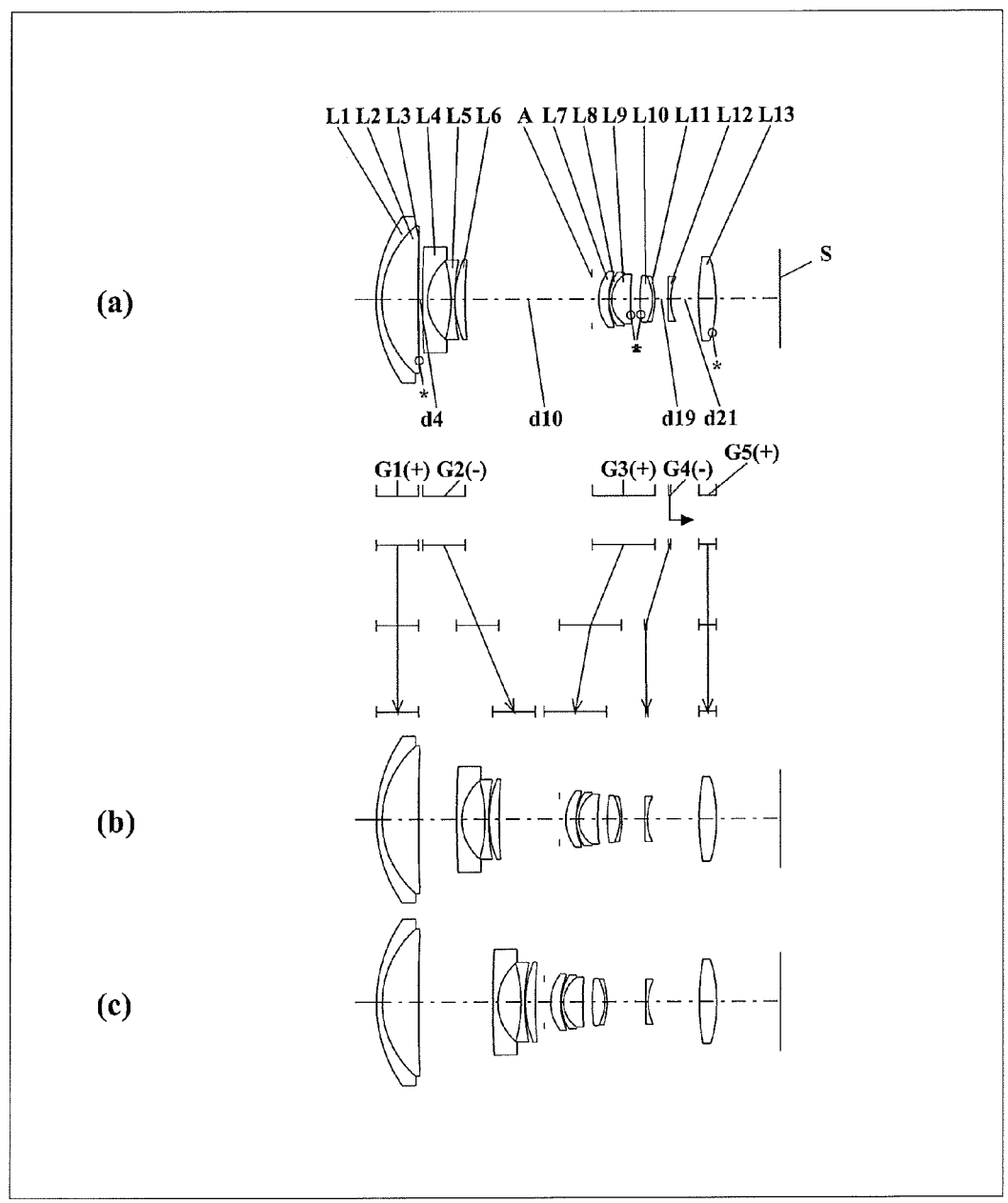
FIG. 17 is a lens arrangement diagram showing an infinity in-focus condition of a zoom lens system according to Embodiment 5 (Numerical Example 5)
Figure 18:
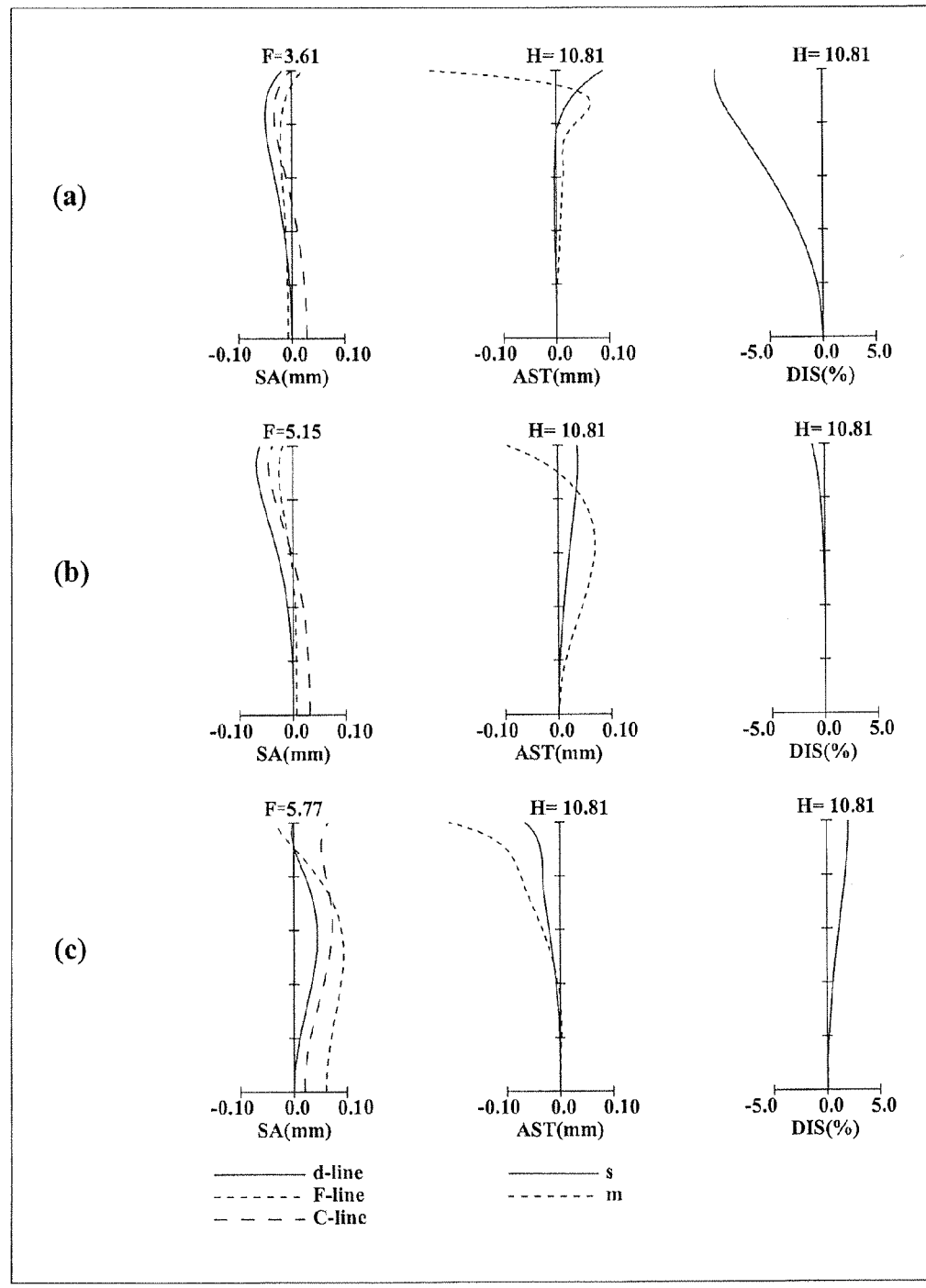
FIG. 18 is a longitudinal aberration diagram of an infinity in-focus condition of a zoom lens system according to Numerical Example 5.
Figure 19:
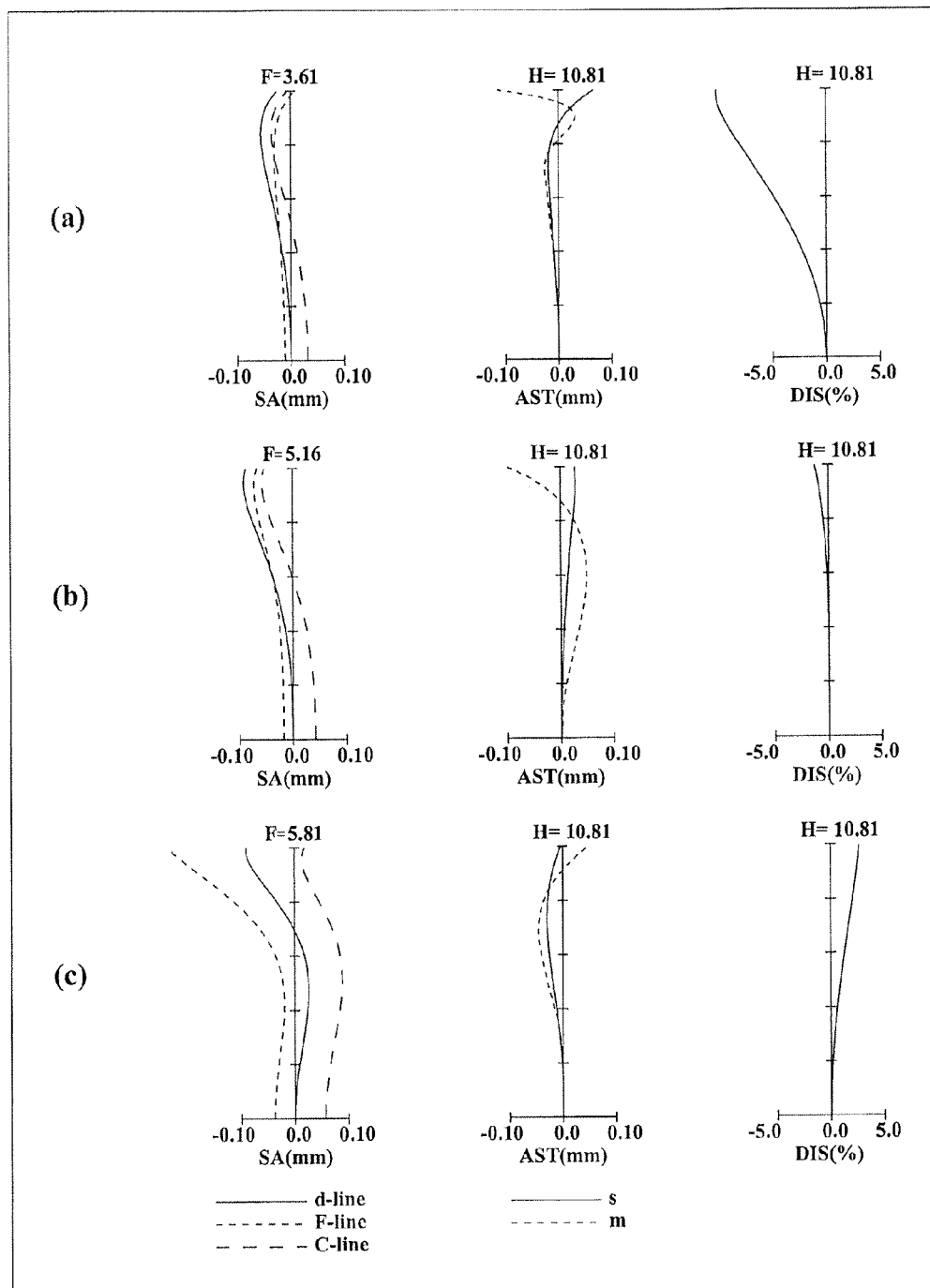
FIG. 19 is a longitudinal aberration diagram of a close-object in-focus condition of a zoom lens system according to Numerical Example 5.
Figure 20:
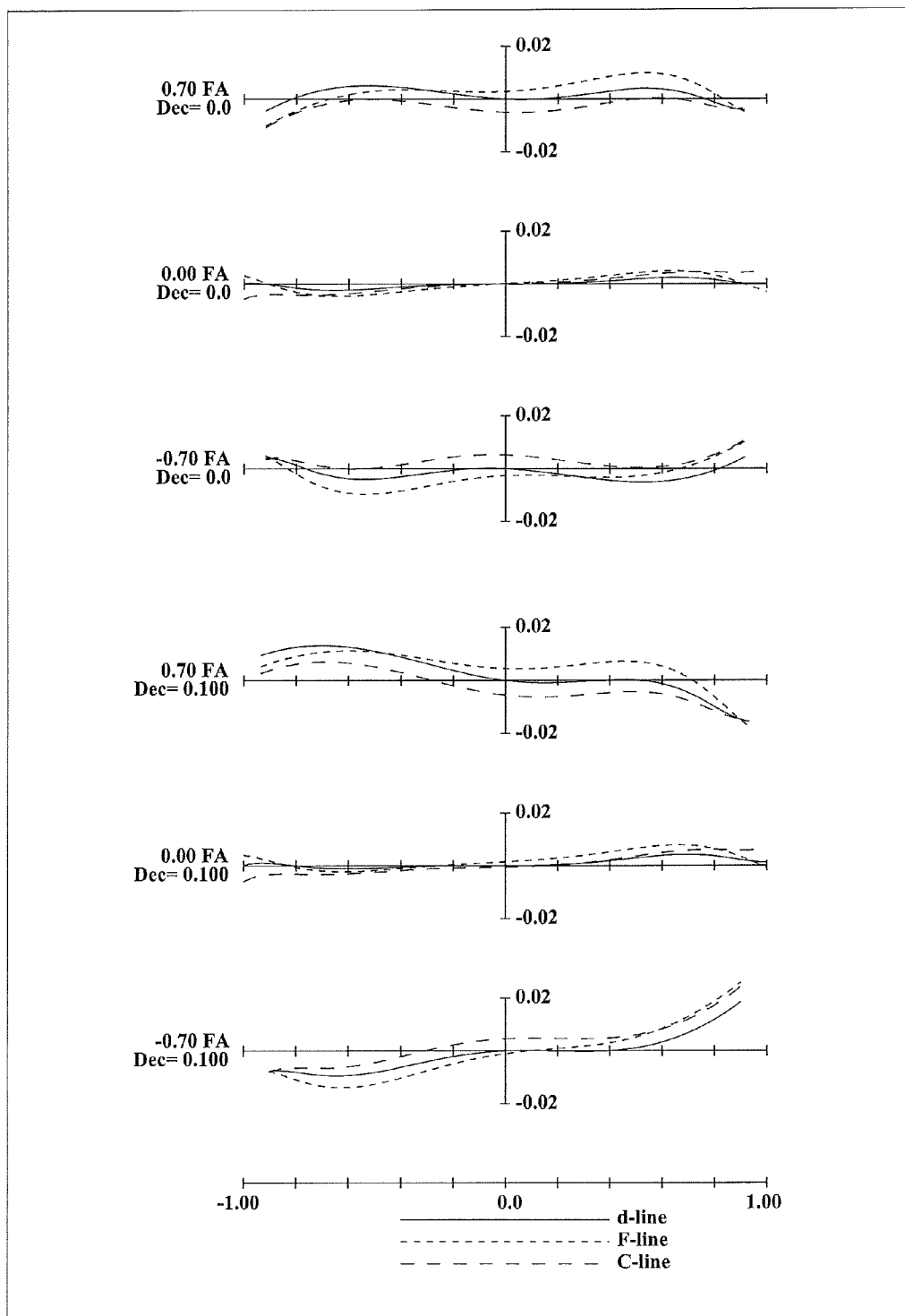
FIG. 20 is a lateral aberration diagram of a zoom lens system according to Numerical Example 5 at a telephoto limit in a basic state where image blur compensation is not performed and in an image blur compensation state.
Figure 21:
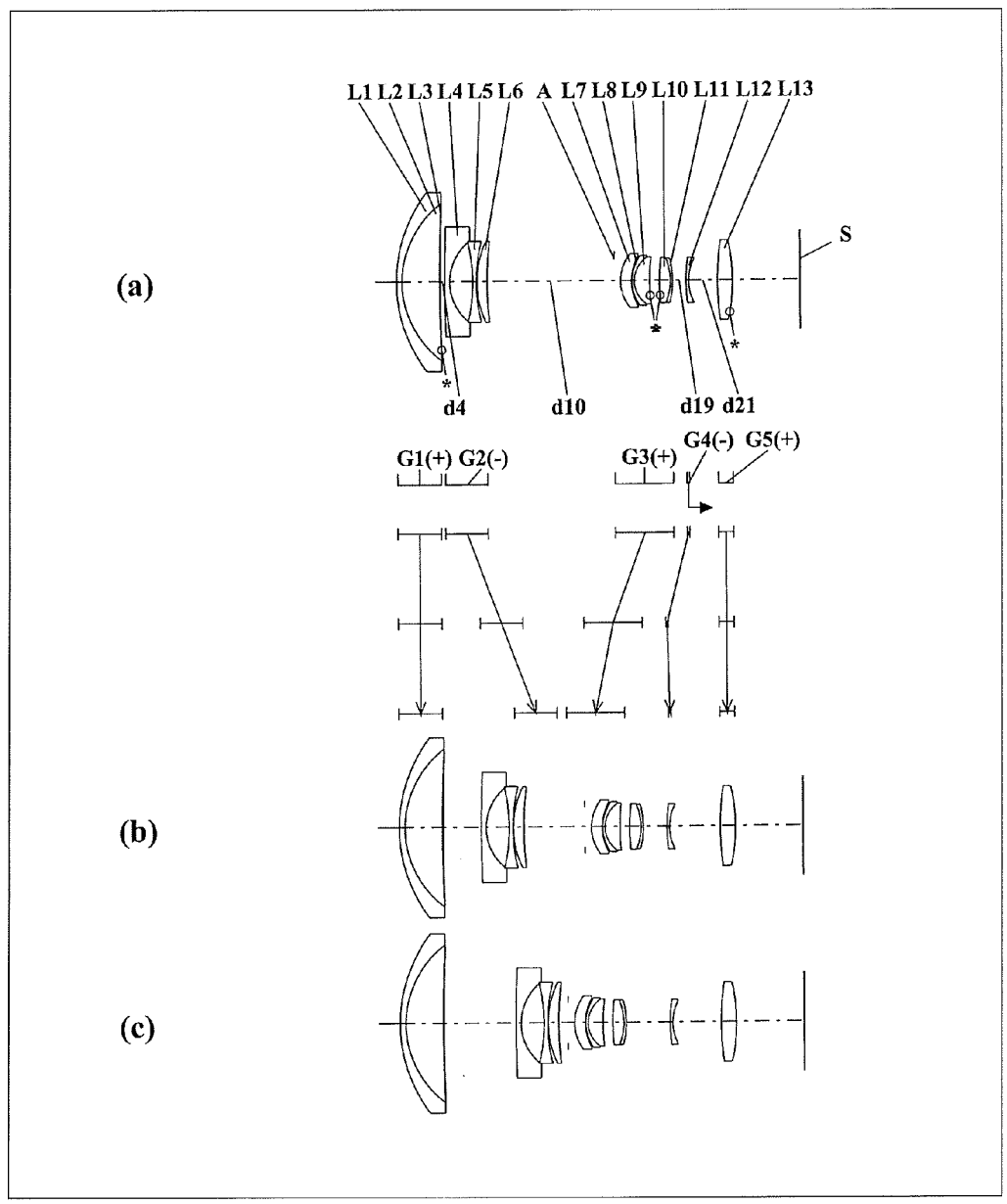
FIG. 21 is a lens arrangement diagram showing an infinity in-focus condition of a zoom lens system according to Embodiment 6 (Numerical Example 6)
Figure 22:
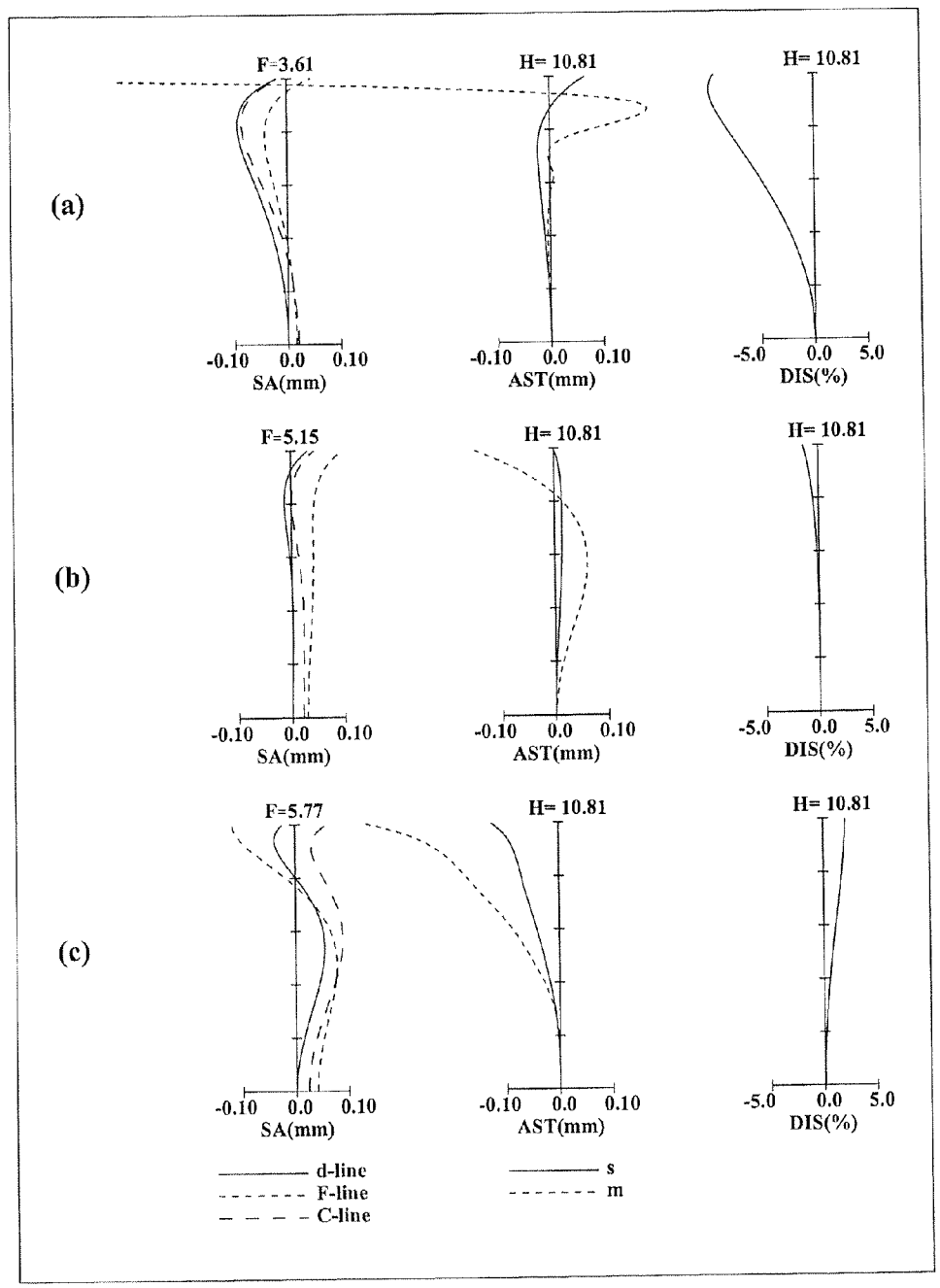
FIG. 22 is a longitudinal aberration diagram of an infinity in-focus condition of a zoom lens system according to Numerical Example 6.
Figure 23:
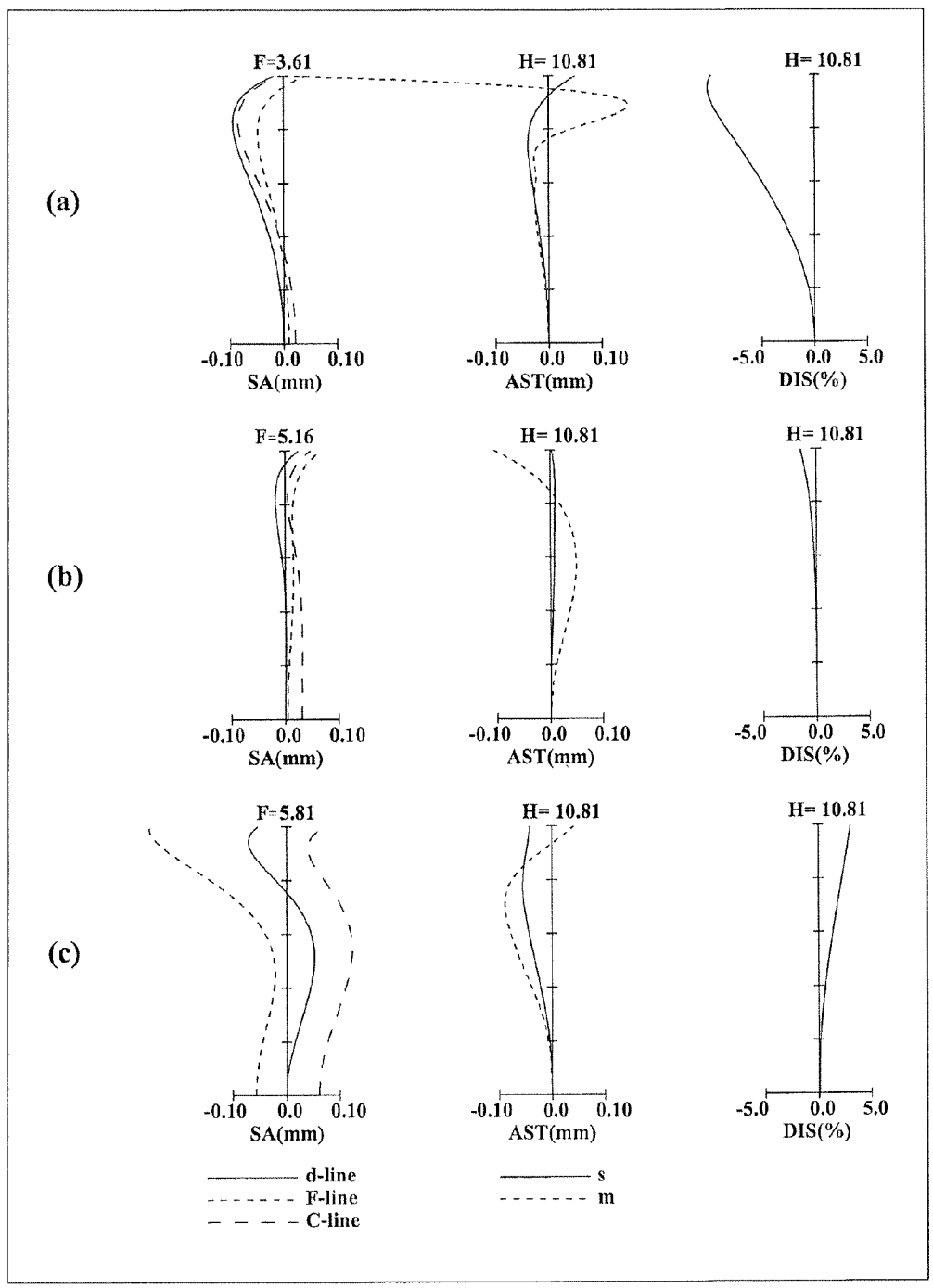
FIG. 23 is a longitudinal aberration diagram of a close-object in-focus condition of a zoom lens system according to Numerical Example 6.
Figure 24:
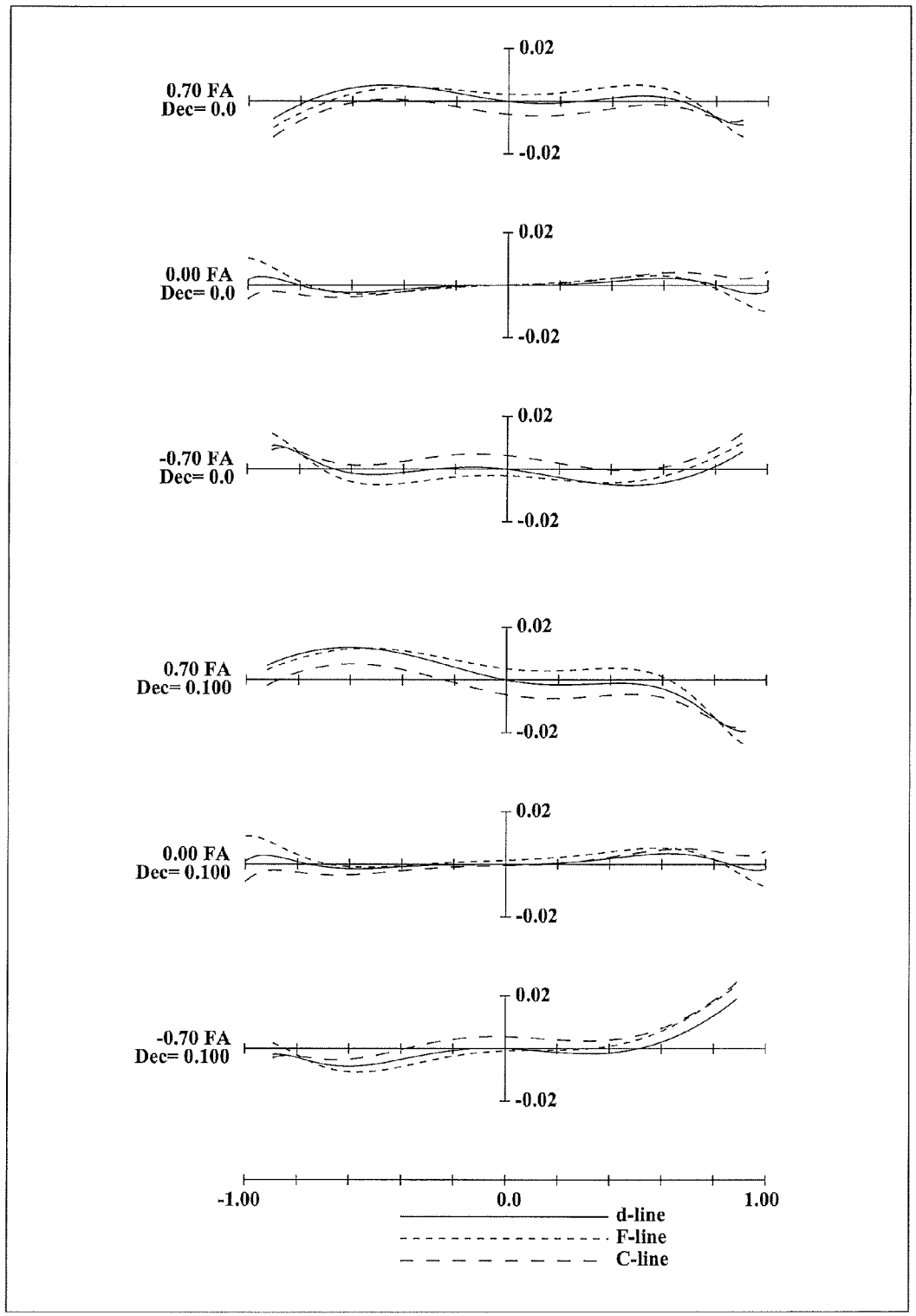
FIG. 24 is a lateral aberration diagram of a zoom lens system according to Numerical Example 6 at a telephoto limit in a basic state where image blur compensation is not performed and in an image blur compensation state.
Figure 25:
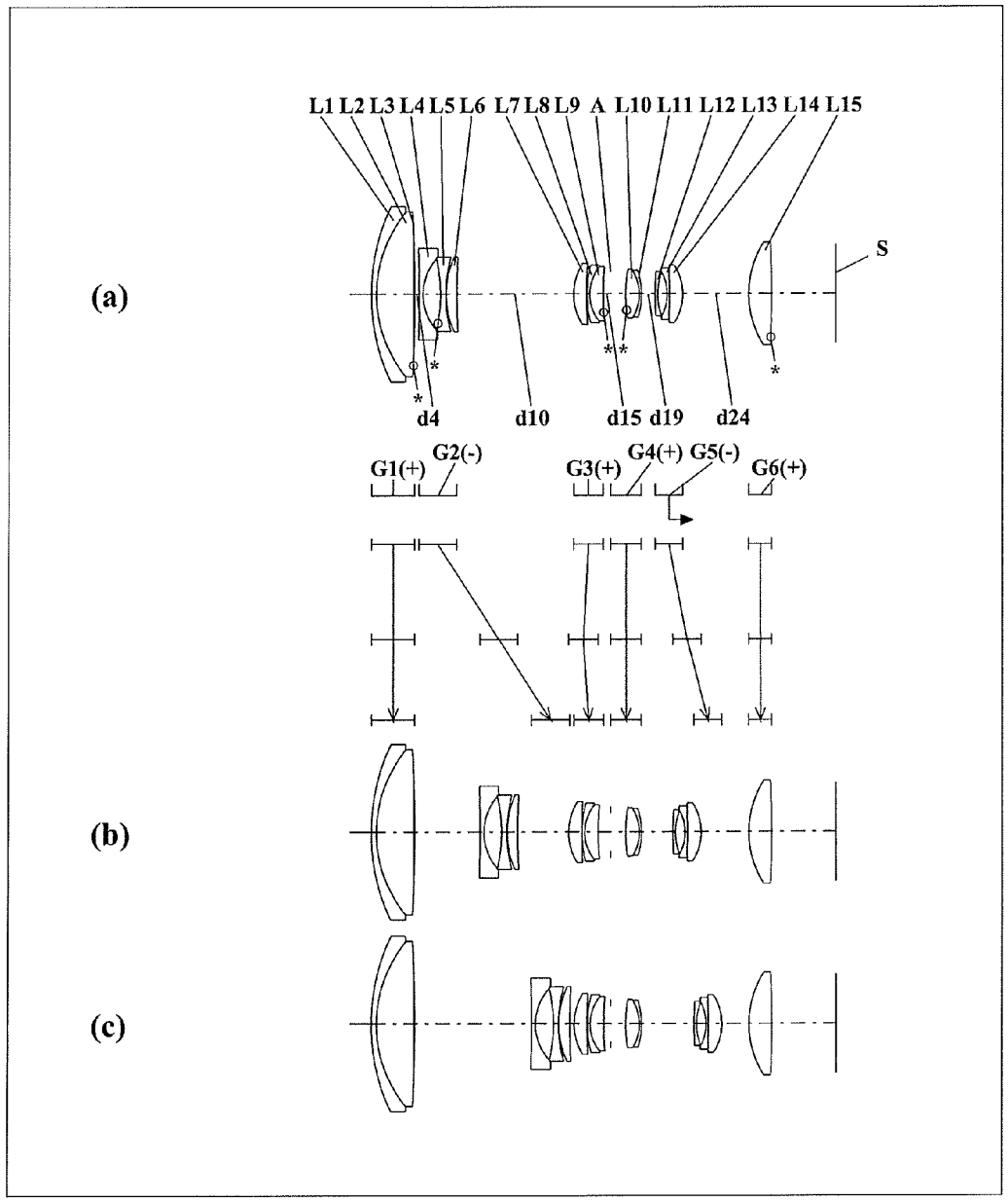
FIG. 25 is a lens arrangement diagram showing an infinity in-focus condition of a zoom lens system according to Embodiment 7 (Numerical Example 7)
Figure 26:
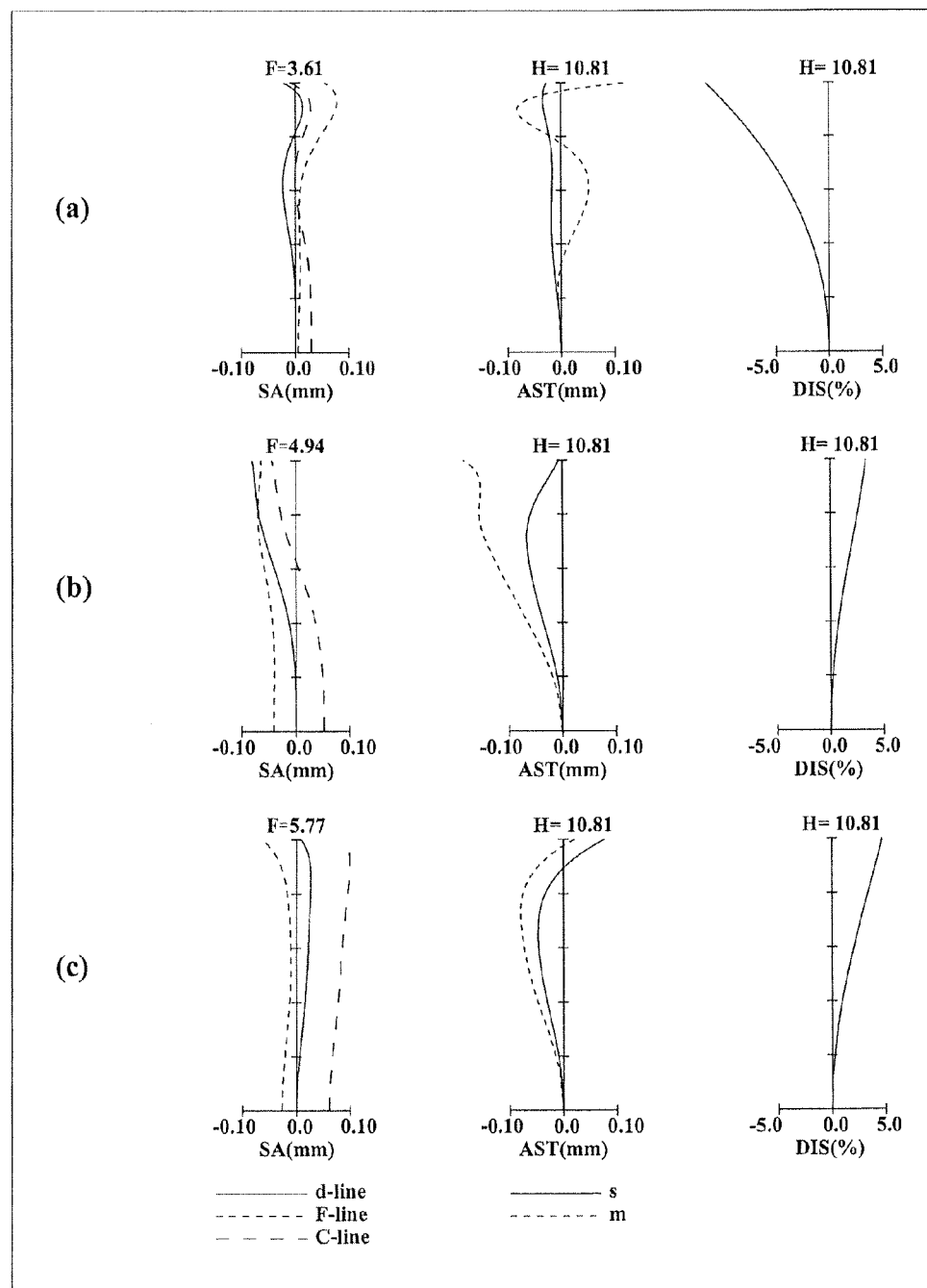
FIG. 26 is a longitudinal aberration diagram of an infinity in-focus condition of a zoom lens system according to Numerical Example 7.
Figure 27:
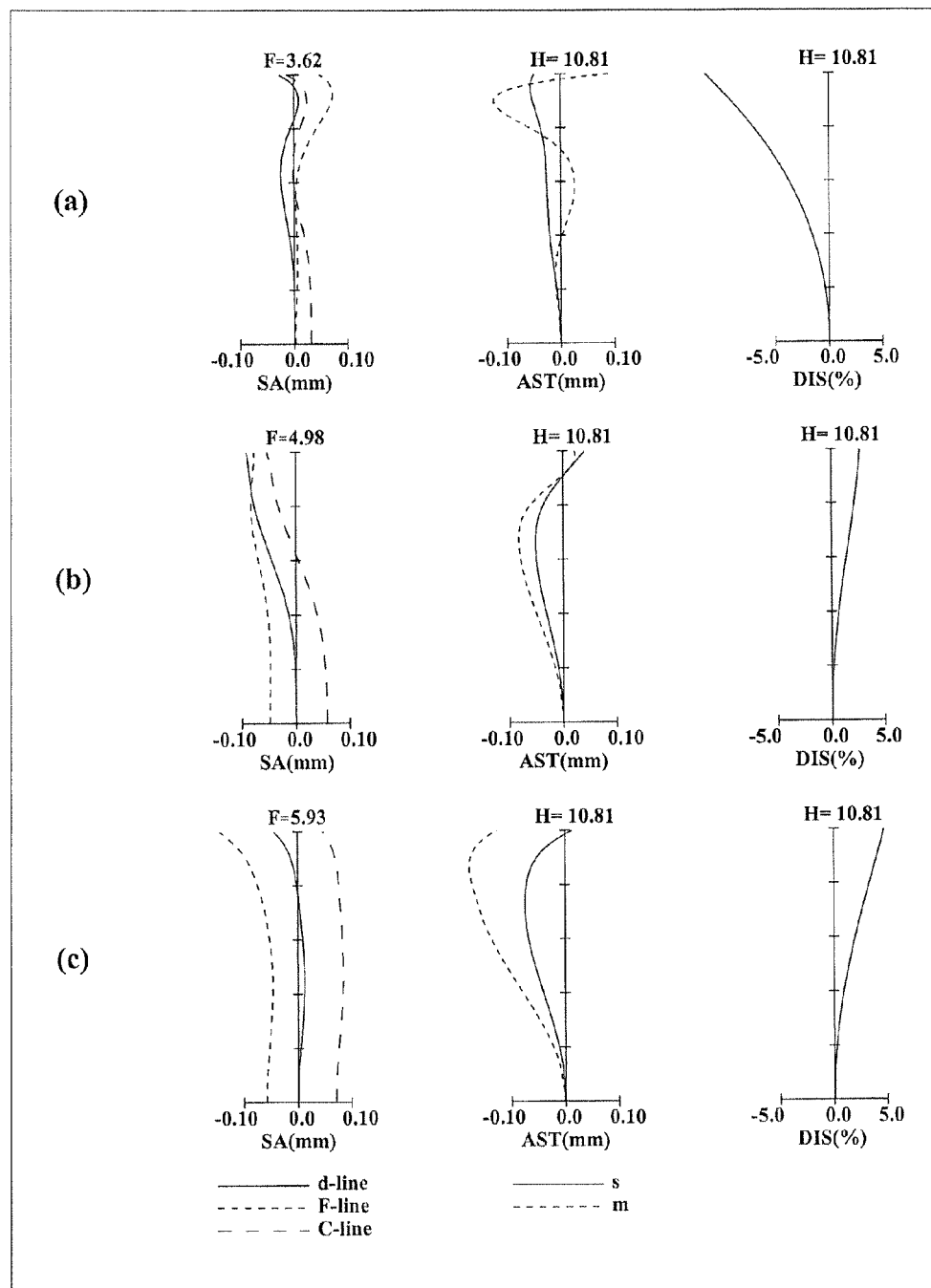
FIG. 27 is a longitudinal aberration diagram of a close-object in-focus condition of a zoom lens system according to Numerical Example 7.
Figure 28:
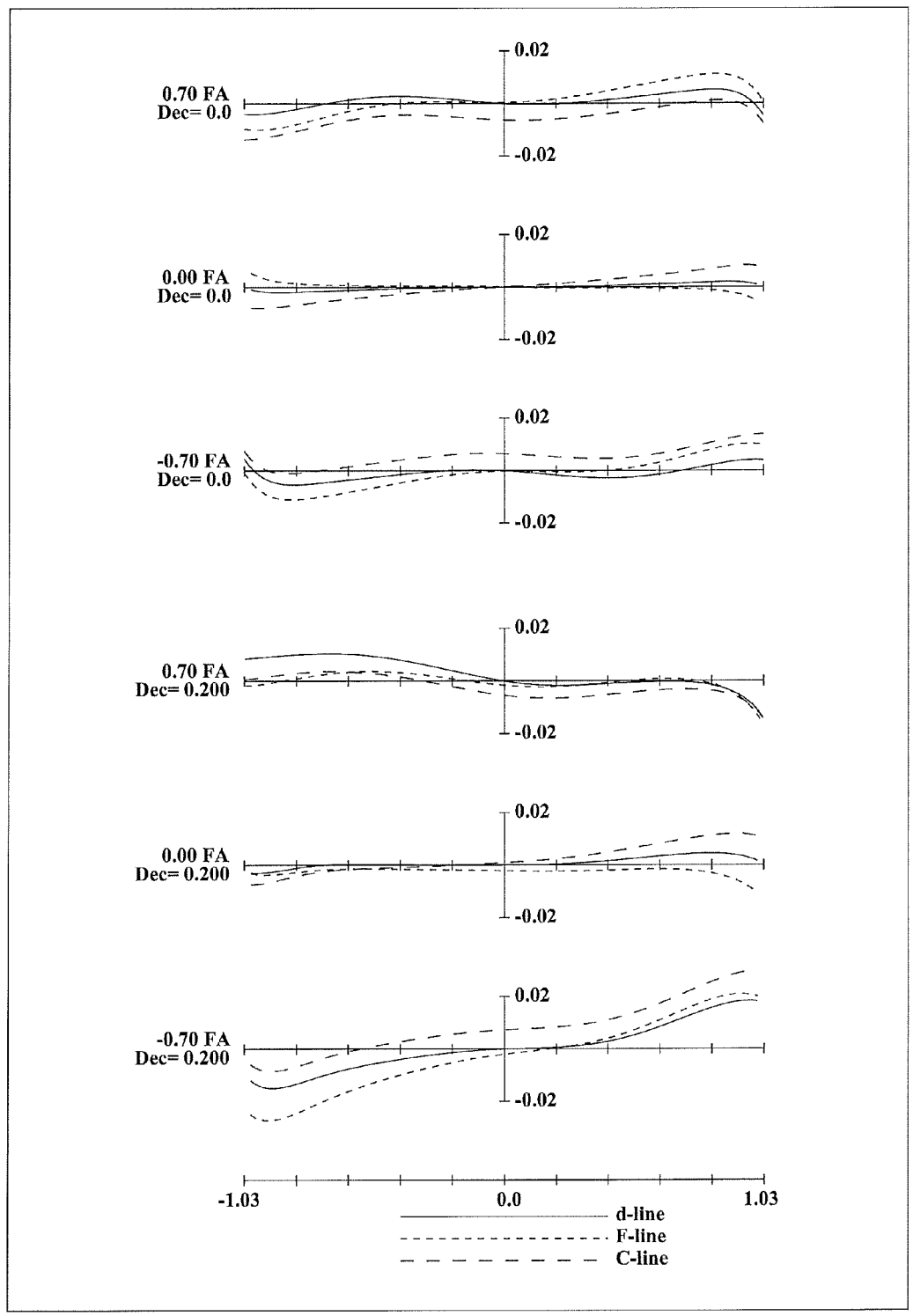
FIG. 28 is a lateral aberration diagram of a zoom lens system according to Numerical Example 7 at a telephoto limit in a basic state where image blur compensation is not performed and in an image blur compensation state.
Figure 29:
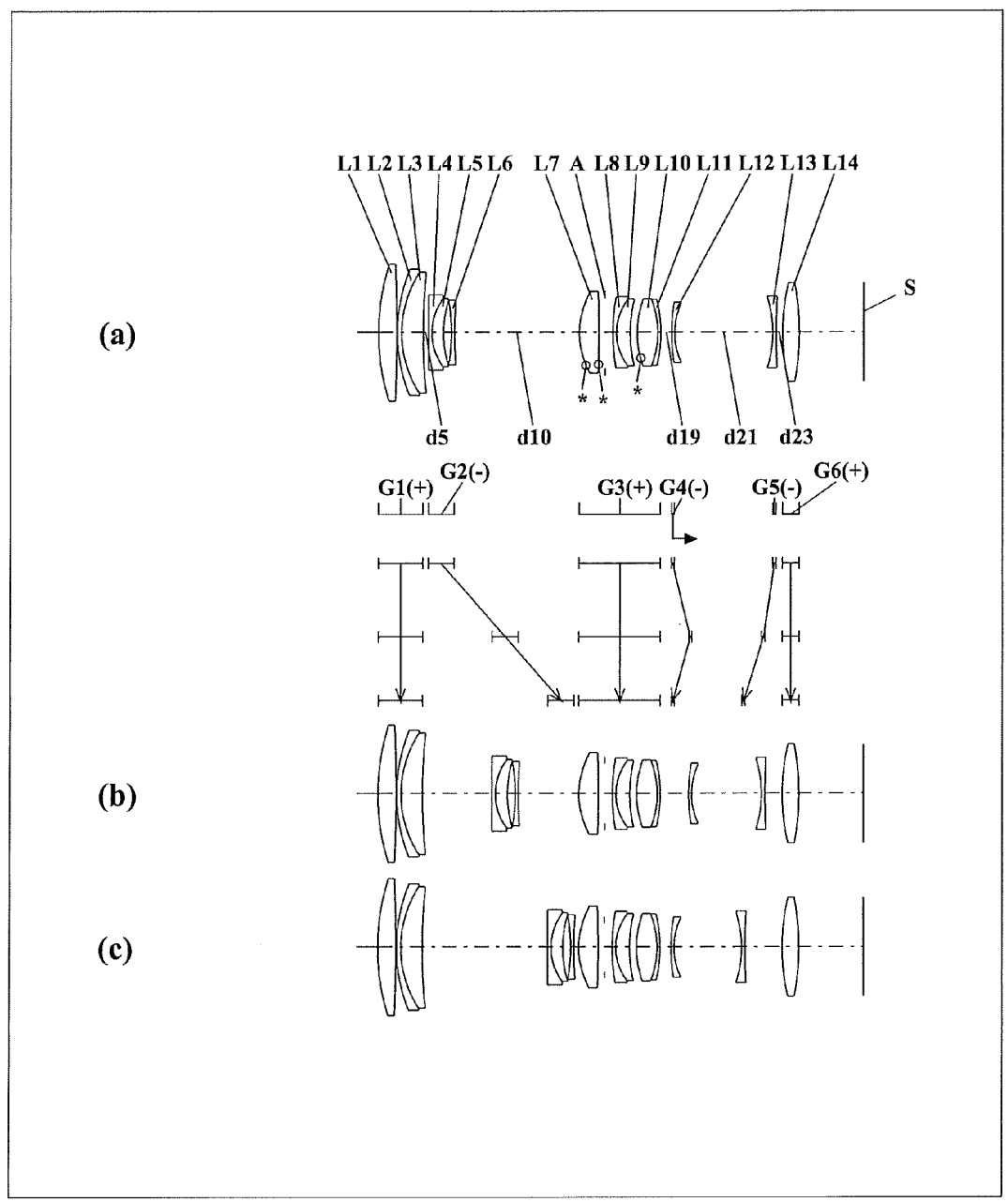
FIG. 29 is a lens arrangement diagram showing an infinity in-focus condition of a zoom lens system according to Embodiment 8 (Numerical Example 8)
Figure 30:
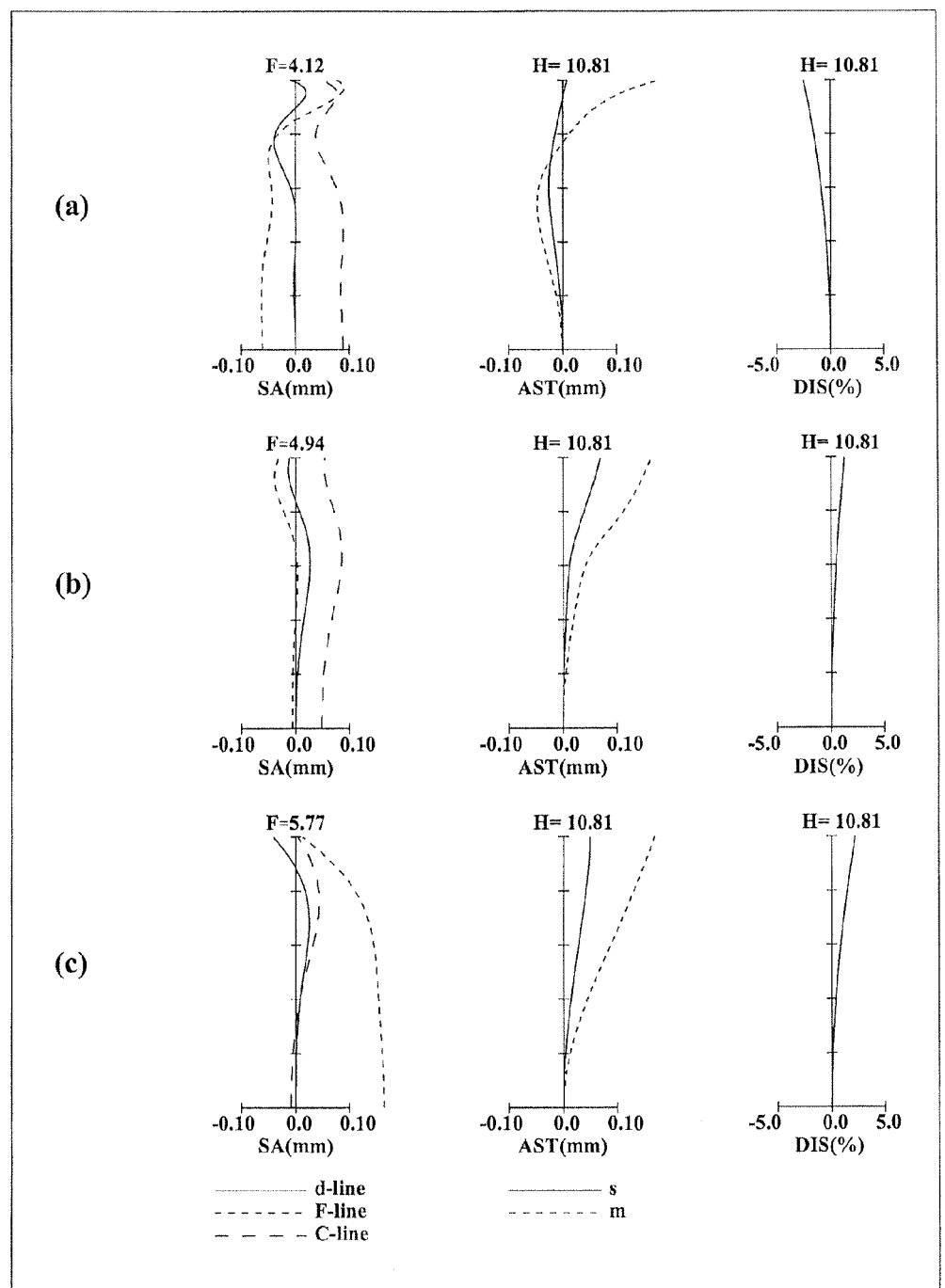
FIG. 30 is a longitudinal aberration diagram of an infinity in-focus condition of a zoom lens system according to Numerical Example 8.
Figure 31:
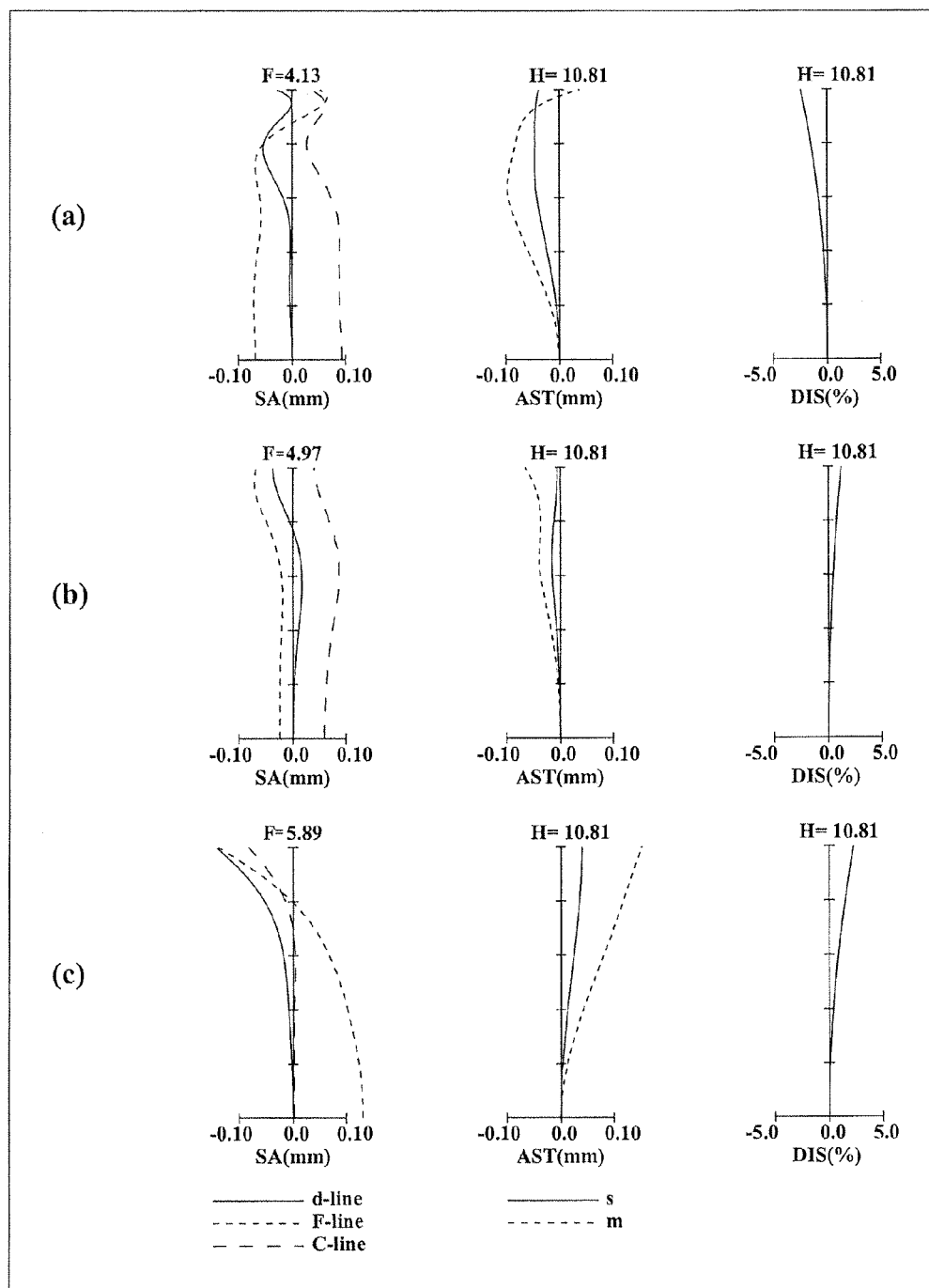
FIG. 31 is a longitudinal aberration diagram of a close-object in-focus condition of a zoom lens system according to Numerical Example 8.
Figure 32:
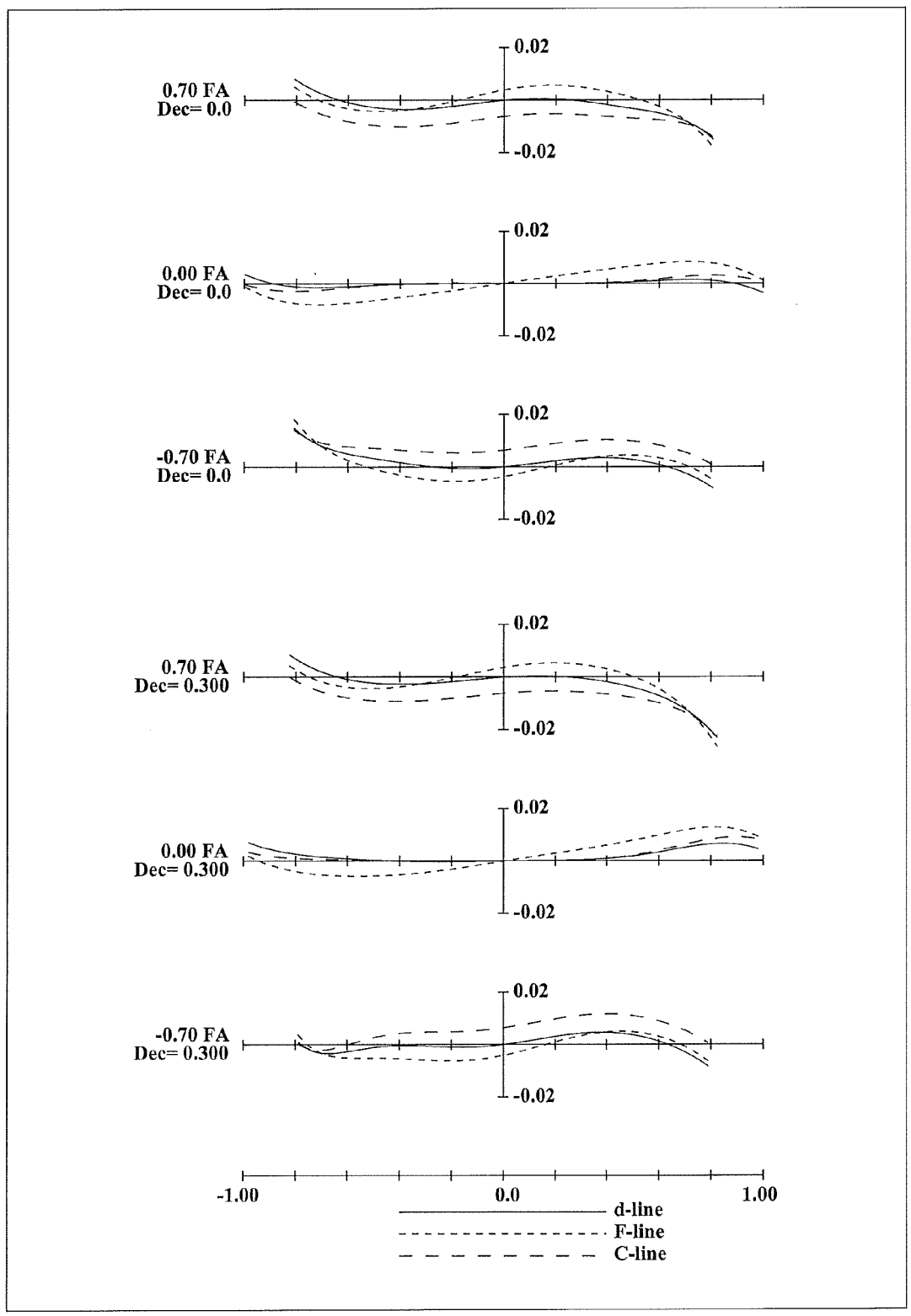
FIG. 32 is a lateral aberration diagram of a zoom lens system according to Numerical Example 8 at a telephoto limit in a basic state where image blur compensation is not performed and in an image blur compensation state.
Figure 33:
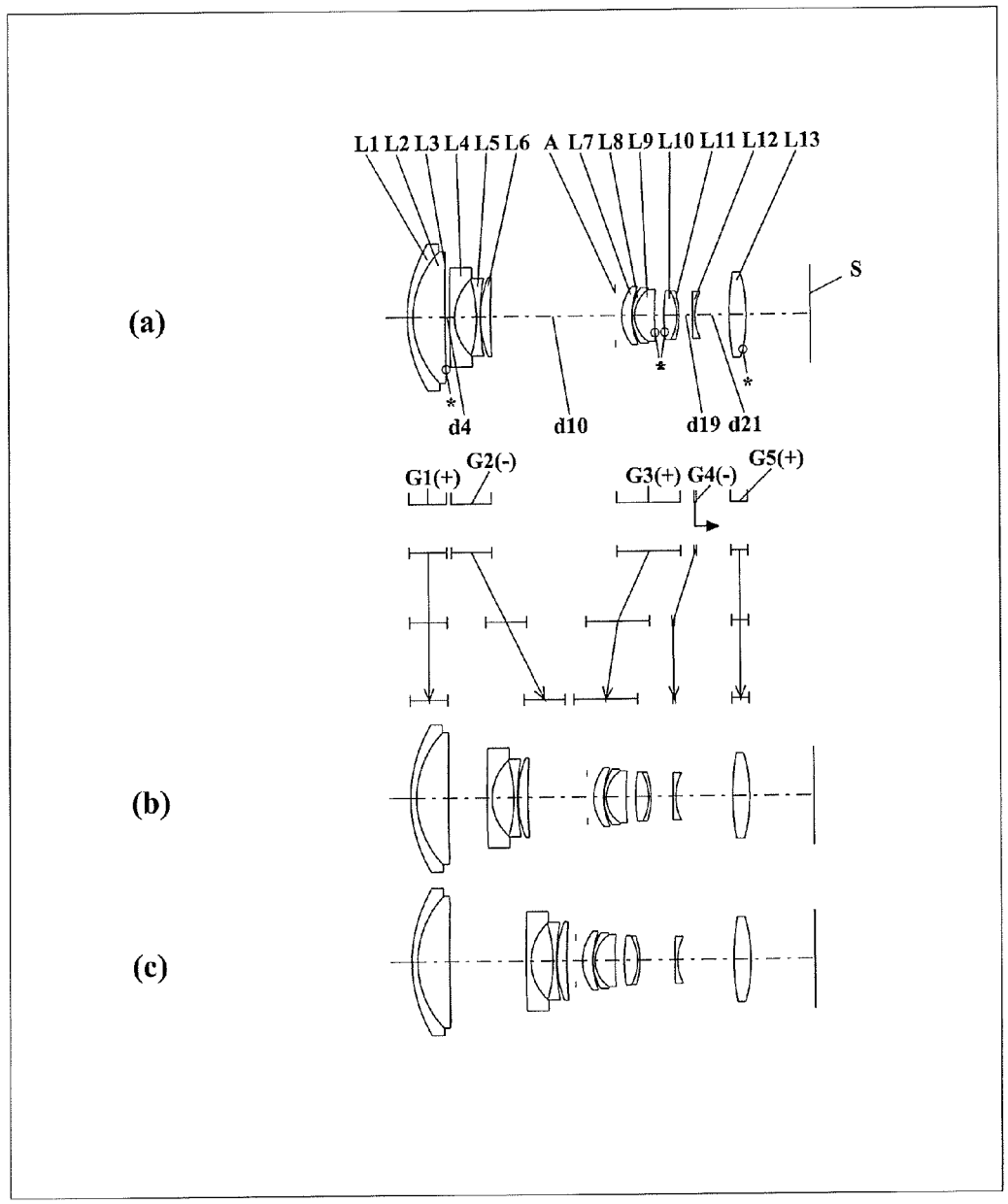
FIG. 33 is a lens arrangement diagram showing an infinity in-focus condition of a zoom lens system according to Embodiment 9 (Numerical Example 9)
Figure 34:
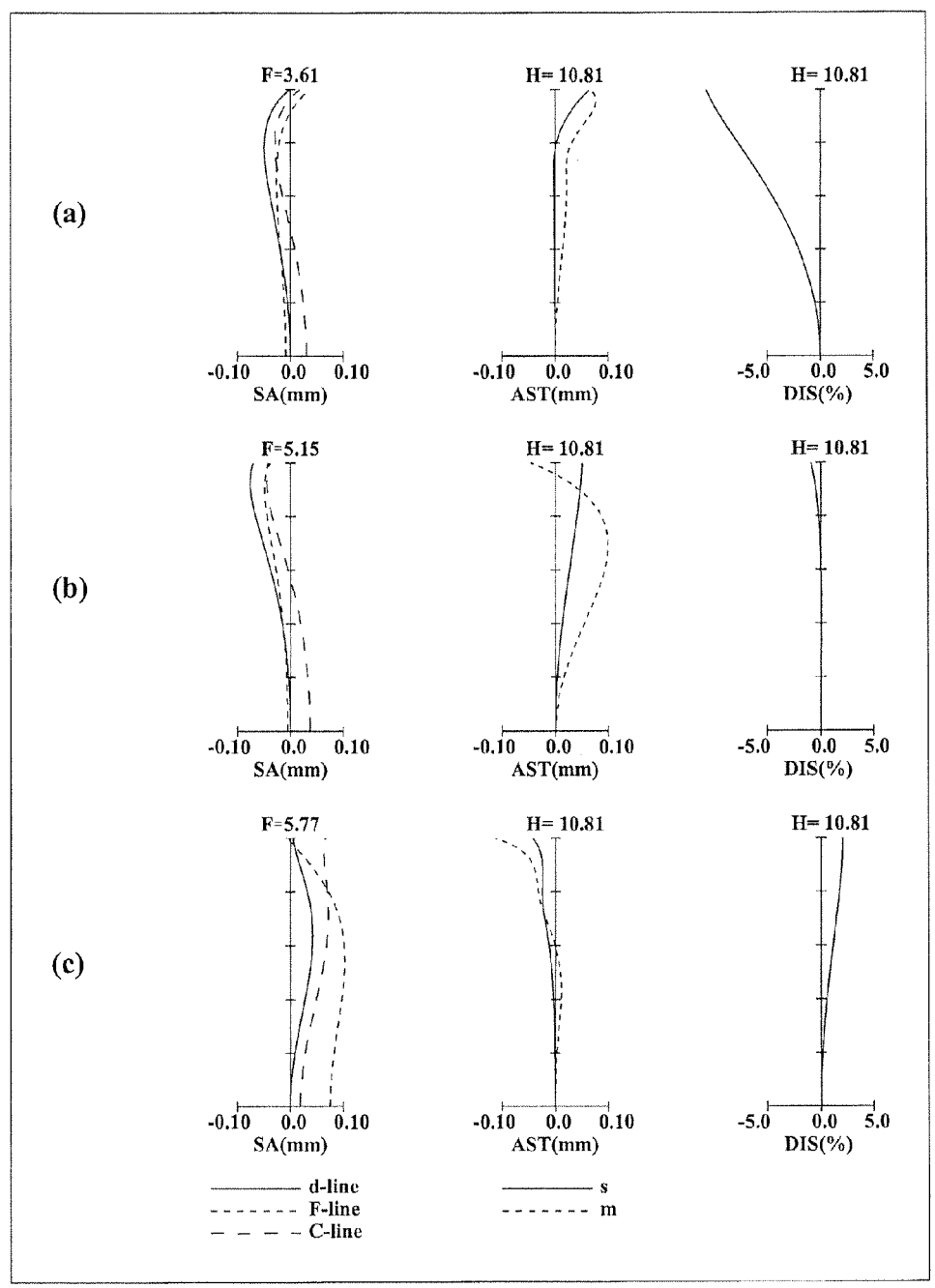
FIG. 34 is a longitudinal aberration diagram of an infinity in-focus condition of a zoom lens system according to Numerical Example 9.
Figure 35:
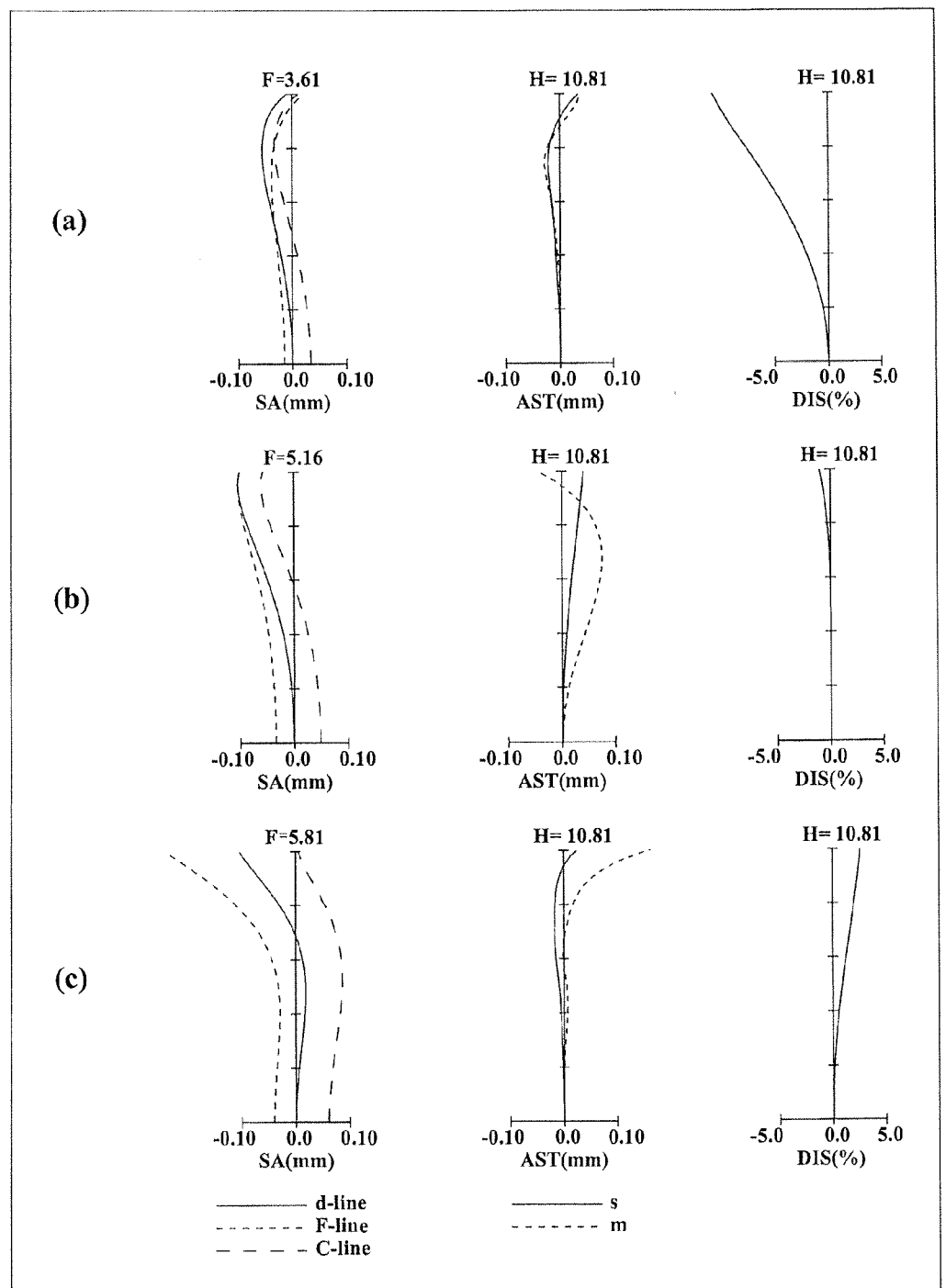
FIG. 35 is a longitudinal aberration diagram of a close-object in-focus condition of a zoom lens system according to Numerical Example 9.
Figure 36:
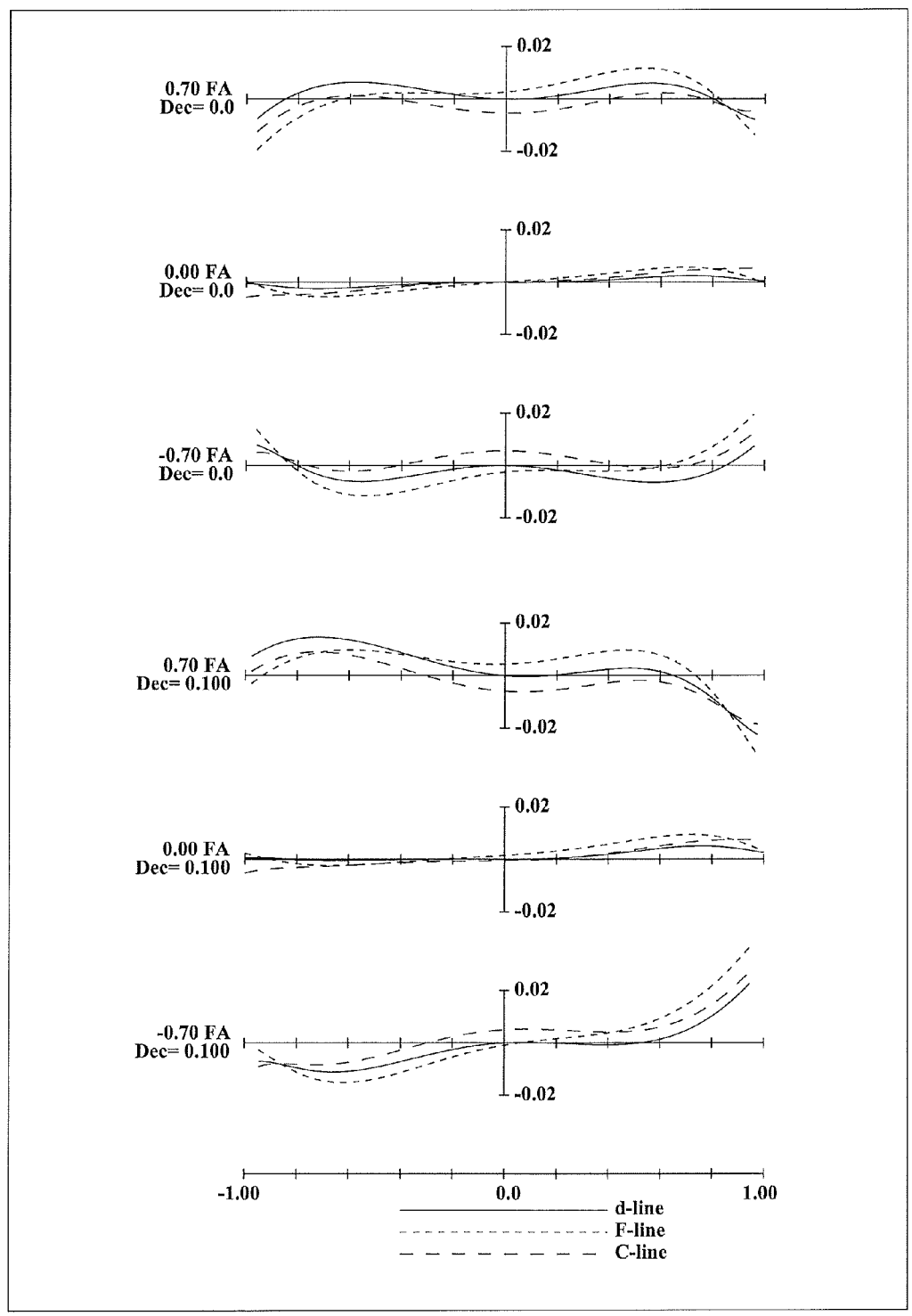
FIG. 36 is a lateral aberration diagram of a zoom lens system according to Numerical Example 9 at a telephoto limit in a basic state where image blur compensation is not performed and in an image blur compensation state.

Further, as shown in FIGS. 1, 5, and 25, an aperture diaphragm A is provided on the most object side in the fourth lens unit G4, i.e., on the object side of a tenth lens element L10. As shown in FIGS. 9, 13, and 29, an aperture diaphragm A is provided between a seventh lens element L7 and an eighth lens element L8 in the third lens unit G3. As shown in FIGS. 17, 21, and 33 an aperture diaphragm A is provided on the most object side in the third lens unit G3, i.e., on the object side of a seventh lens element L7.

Embodiment 1

As shown in FIG. 1, the first lens unit G1, in order from the object side to the image side, comprises: a negative meniscus first lens element L1 with the convex surface facing the object side; a bi-convex second lens element L2; and a positive meniscus third lens element L3 with the convex surface facing the image side. The first lens element L1, the second lens element L2, and the third lens element L3 are cemented with each other. The third lens element L3 is an aspherical lens element formed of a thin layer of resin or the like, and has an aspheric image side surface.

The second lens unit G2, in order from the object side to the image side, comprises: a biconcave fourth lens element L4; a bi-concave fifth lens element L5; and a positive meniscus sixth lens element L6 with the convex surface facing the object side. Among these, the fifth lens element L5 has an aspheric object side surface.

The third lens unit G3, in order from the object side to the image side, comprises: a positive meniscus seventh lens element L7 with the convex surface facing the object side; a negative meniscus eighth lens element L8 with the convex surface facing the object side; and a positive meniscus ninth lens element L9 with the convex surface facing the object side. Among these, the eighth lens element L8 and the ninth lens element L9 are cemented with each other. The ninth lens element L9 has an aspheric image side surface.

The fourth lens unit G4, in order from the object side to the image side, comprises: a bi-convex tenth lens element L10; and a negative meniscus eleventh lens element L11 with the convex surface facing the image side. The tenth lens element L10 and the eleventh lens element L11 are cemented with each other. The tenth lens element L10 has an aspheric object side surface. Further, an aperture diaphragm A is provided on the object side of the tenth lens element L10.

The fifth lens unit G5, in order from the object side to the image side, comprises: a negative meniscus twelfth lens element L12 with the convex surface facing the object side; a bi-concave thirteenth lens element L13; and a bi-convex fourteenth lens element L14. Among these, the thirteenth lens element L13 and the fourteenth lens element L14 are cemented with each other.

The sixth lens unit G6 comprises solely a bi-convex fifteenth lens element L15. The fifteenth lens element L15 has an aspheric image side surface.

The tenth lens element L10 and the eleventh lens element L11 which are components of the fourth lens unit G4 correspond to an image blur compensating lens unit described later, which moves in a direction perpendicular to the optical axis in order to optically compensate image blur.

In zooming from a wide-angle limit to a telephoto limit at the time of image taking, the second lens unit G2 and the fifth lens unit G5 monotonically move to the image side, the third lens unit G3 moves with locus of a slight convex to the object side, and the first lens unit G1, the fourth lens unit G4, and the sixth lens unit G6 are fixed with respect to the image surface S. That is, in zooming, the second lens unit G2, the third lens unit G3, and the fifth lens unit G5 individually move along the optical axis so that the interval between the first lens unit G1 and the second lens unit G2 and the interval between the fourth lens unit G4 and the fifth lens unit G5 increase, the interval between the second lens unit G2 and the third lens unit G3 and the interval between the fifth lens unit G5 and the sixth lens unit G6 decrease, and the interval between the third lens unit G3 and the fourth lens unit G4 varies.

In focusing from an infinity in-focus condition to a close-object in-focus condition, the fifth lens unit G5 as a focusing lens unit moves to the image side along the optical axis in any zooming condition.

Embodiment 2

As shown in FIG. 5, the first lens unit G1, in order from the object side to the image side, comprises: a negative meniscus first lens element L1 with the convex surface facing the object side; a bi-convex second lens element L2; and a positive meniscus third lens element L3 with the convex surface facing the image side. The first lens element L1, the second lens element L2, and the third lens element L3 are cemented with each other. The third lens element L3 is an aspherical lens element formed of a thin layer of resin or the like, and has an aspheric image side surface.

The second lens unit G2, in order from the object side to the image side, comprises: a bi-concave fourth lens element L4; a bi-concave fifth lens element L5; and a positive meniscus sixth lens element L6 with the convex surface facing the object side. Among these, the fifth lens element L5 has an aspheric object side surface.

The third lens unit G3, in order from the object side to the image side, comprises: a positive meniscus seventh lens element L7 with the convex surface facing the object side; a negative meniscus eighth lens element L8 with the convex surface facing the object side; and a positive meniscus ninth lens element L9 with the convex surface facing the object side. Among these, the eighth lens element L8 and the ninth lens element L9 are cemented with each other. The ninth lens element L9 has an aspheric image side surface.

The fourth lens unit G4, in order from the object side to the image side, comprises: a bi-convex tenth lens element L10; and a negative meniscus eleventh lens element L11 with the convex surface facing the image side. The tenth lens element L10 and the eleventh lens element L11 are cemented with each other. The tenth lens element L10 has an aspheric object side surface. Further, an aperture diaphragm A is provided on the object side of the tenth lens element L10.

The fifth lens unit G5, in order from the object side to the image side, comprises: a negative meniscus twelfth lens element L12 with the convex surface facing the object side; a negative meniscus thirteenth lens element L13 with the convex surface facing the image side; and a positive meniscus fourteenth lens element L14 with the convex surface facing the image side. Among these, the thirteenth lens element L13 and the fourteenth lens element L14 are cemented with each other.

The sixth lens unit G6 comprises solely a positive meniscus fifteenth lens element L15 with the convex surface facing the object side. The fifteenth lens element L15 has an aspheric image side surface.

The tenth lens element L10 and the eleventh lens element L11 which are components of the fourth lens unit G4 correspond to an image blur compensating lens unit described later, which moves in a direction perpendicular to the optical axis in order to optically compensate image blur.

In zooming from a wide-angle limit to a telephoto limit at the time of image taking, the second lens unit G2 and the fifth lens unit G5 monotonically move to the image side, the third lens unit G3 moves with locus of a slight convex to the object side, and the first lens unit G1, the fourth lens unit G4, and the sixth lens unit G6 are fixed with respect to the image surface S. That is, in zooming, the second lens unit G2, the third lens unit G3, and the fifth lens unit G5 individually move along the optical axis so that the interval between the first lens unit G1 and the second lens unit G2 and the interval between the fourth lens unit G4 and the fifth lens unit G5 increase, the interval between the second lens unit G2 and the third lens unit G3 and the interval between the fifth lens unit G5 and the sixth lens unit G6 decrease, and the interval between the third lens unit G3 and the fourth lens unit G4 varies.

In focusing from an infinity in-focus condition to a close-object in-focus condition, the fifth lens unit G5 as a focusing lens unit moves to the image side along the optical axis in any zooming condition.

Embodiment 3

As shown in FIG. 9, the first lens unit G1, in order from the object side to the image side, comprises: a biconvex first lens element L1; a negative meniscus second lens element L2 with the convex surface facing the object side; and a positive meniscus third lens element L3 with the convex surface facing the object side. Among these, the second lens element L2 and the third lens element L3 are cemented with each other.

The second lens unit G2, in order from the object side to the image side, comprises: a negative meniscus fourth lens element L4 with the convex surface facing the object side; a positive meniscus fifth lens element L5 with the convex surface facing the object side; and a bi-concave sixth lens element L6. Among these, the fourth lens element L4 and the fifth lens element L5 are cemented with each other.

The third lens unit G3, in order from the object side to the image side, comprises: a bi-convex seventh lens element L7; a negative meniscus eighth lens element L8 with the convex surface facing the object side; a positive meniscus ninth lens element L9 with the convex surface facing the object side; a bi-convex tenth lens element L10; and a negative meniscus eleventh lens element L11 with the convex surface facing the image side. Among these, the eighth lens element L8 and the ninth lens element L9 are cemented with each other, and the tenth lens element L10 and the eleventh lens element L11 are cemented with each other. The seventh lens element L7 has two aspheric surfaces, and the tenth lens element L10 has an aspheric object side surface. Further, an aperture diaphragm A is provided between the seventh lens element L7 and the eighth lens element L8.

The fourth lens unit G4 comprises solely a negative meniscus twelfth lens element L12 with the convex surface facing the object side.

The fifth lens unit G5 comprises solely a bi-concave thirteenth lens element L13.

The sixth lens unit G6 comprises solely a bi-convex fourteenth lens element L14.

The tenth lens element L10 and the eleventh lens element L11 in the third lens unit G3 correspond to an image blur compensating lens unit described later, which moves in a direction perpendicular to the optical axis in order to optically compensate image blur.

In zooming from a wide-angle limit to a telephoto limit at the time of image taking, the second lens unit G2 monotonically moves to the image side, the fourth lens unit G4 moves with locus of a convex to the image side, the fifth lens unit G5 substantially monotonically moves to the object side, and the first lens unit G1, the third lens unit G3, and the sixth lens unit G6 are fixed with respect to the image surface S. That is, in zooming, the second lens unit G2, the fourth lens unit G4, and the fifth lens unit G5 individually move along the optical axis so that the interval between the first lens unit G1 and the second lens unit G2 and the interval between the fifth lens unit G5 and the sixth lens unit G6 increase, the interval between the second lens unit G2 and the third lens unit G3 and the interval between the fourth lens unit G4 and the fifth lens unit G5 decrease, and the interval between the third lens unit G3 and the fourth lens unit G4 varies.

In focusing from an infinity in-focus condition to a close-object in-focus condition, the fourth lens unit G4 as a focusing lens unit moves to the image side along the optical axis in any zooming condition.

Embodiment 4

As shown in FIG. 13, the first lens unit G1, in order from the object side to the image side, comprises: a bi-convex first lens element L1; a negative meniscus second lens element L2 with the convex surface facing the object side; and a positive meniscus third lens element L3 with the convex surface facing the object side. Among these, the second lens element L2 and the third lens element L3 are cemented with each other.

The second lens unit G2, in order from the object side to the image side, comprises: a negative meniscus fourth lens element L4 with the convex surface facing the object side; a positive meniscus fifth lens element L5 with the convex surface facing the object side; and a bi-concave sixth lens element L6. Among these, the fourth lens element L4 and the fifth lens element L5 are cemented with each other.

The third lens unit G3, in order from the object side to the image side, comprises: a bi-convex seventh lens element L7; a negative meniscus eighth lens element L8 with the convex surface facing the object side; a bi-convex ninth lens element L9; a bi-convex tenth lens element L10; and a negative meniscus eleventh lens element L11 with the convex surface facing the image side. Among these, the eighth lens element L8 and the ninth lens element L9 are cemented with each other, and the tenth lens element L10 and the eleventh lens element L11 are cemented with each other. The seventh lens element L7 has two aspheric surfaces, and the tenth lens element L10 has an aspheric object side surface. Further, an aperture diaphragm A is provided between the seventh lens element L7 and the eighth lens element L8.

The fourth lens unit G4 comprises solely a negative meniscus twelfth lens element L12 with the convex surface facing the object side.

The fifth lens unit G5 comprises solely a bi-concave thirteenth lens element L13.

The sixth lens unit G6 comprises solely a bi-convex fourteenth lens element L14.

The tenth lens element L10 and the eleventh lens element L11 in the third lens unit G3 correspond to an image blur compensating lens unit described later, which moves in a direction perpendicular to the optical axis in order to optically compensate image blur.

In zooming from a wide-angle limit to a telephoto limit at the time of image taking, the second lens unit G2 monotonically moves to the image side, the fourth lens unit G4 moves with locus of a convex to the image side, the fifth lens unit G5 substantially monotonically moves to the object side, and the first lens unit G1, the third lens unit G3, and the sixth lens unit G6 are fixed with respect to the image surface S. That is, in zooming, the second lens unit G2, the fourth lens unit G4, and the fifth lens unit G5 individually move along the optical axis so that the interval between the first lens unit G1 and the second lens unit G2 and the interval between the fifth lens unit G5 and the sixth lens unit G6 increase, the interval between the second lens unit G2 and the third lens unit G3 and the interval between the fourth lens unit G4 and the fifth lens unit G5 decrease, and the interval between the third lens unit G3 and the fourth lens unit G4 varies.

In focusing from an infinity in-focus condition to a close-object in-focus condition, the fourth lens unit G4 as a focusing lens unit moves to the image side along the optical axis in any zooming condition.

Embodiment 5

As shown in FIG. 17, the first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. The first lens element L1, the second lens element L2, and the third lens element L3 are cemented with each other. The third lens element L3 is an aspherical lens element formed of a thin layer of resin or the like, and has an aspheric image side surface.

The second lens unit G2, in order from the object side to the image side, comprises: a negative meniscus fourth lens element L4 with the convex surface facing the object side; a bi-concave fifth lens element L5; and a positive meniscus sixth lens element L6 with the convex surface facing the object side.

The third lens unit G3, in order from the object side to the image side, comprises: a positive meniscus seventh lens element L7 with the convex surface facing the object side; a negative meniscus eighth lens element L8 with the convex surface facing the object side; a positive meniscus ninth lens element L9 with the convex surface facing the object side; a bi-convex tenth lens element L10; and a negative meniscus eleventh lens element L11 with the convex surface facing the image side. Among these, the eighth lens element L8 and the ninth lens element L9 are cemented with each other, and the tenth lens element L10 and the eleventh lens element L11 are cemented with each other. The ninth lens element L9 has an aspheric image side surface, and the tenth lens element L10 has an aspheric object side surface. Further, an aperture diaphragm A is provided on the object side of the seventh lens element L7.

The fourth lens unit G4 comprises solely a negative meniscus twelfth lens element L12 with the convex surface facing the object side.

The fifth lens unit G5 comprises solely a bi-convex thirteenth lens element L13. The thirteenth lens element L13 has an aspheric image side surface.

The tenth lens element L10 and the eleventh lens element L11 in the third lens unit G3 correspond to an image blur compensating lens unit described later, which moves in a direction perpendicular to the optical axis in order to optically compensate image blur.

In zooming from a wide-angle limit to a telephoto limit at the time of image taking, the second lens unit G2 monotonically moves to the image side, the third lens unit G3 substantially monotonically moves to the object side, the fourth lens unit G4 moves with locus of a slight convex to the object side, and the first lens unit G1 and the fifth lens unit G5 are fixed with respect to the image surface S. That is, in zooming, the second lens unit G2, the third lens unit G3, and the fourth lens unit G4 individually move along the optical axis so that the interval between the first lens unit G1 and the second lens unit G2 and the interval between the third lens unit G3 and the fourth lens unit G4 increase, the interval between the second lens unit G2 and the third lens unit G3 decreases, and the interval between the fourth lens unit G4 and the fifth lens unit G5 varies.

In focusing from an infinity in-focus condition to a close-object in-focus condition, the fourth lens unit G4 as a focusing lens unit moves to the image side along the optical axis in any zooming condition.

Embodiment 6

As shown in FIG. 21, the first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. The first lens element L1, the second lens element L2, and the third lens element L3 are cemented with each other. The third lens element L3 is an aspherical lens element formed of a thin layer of resin or the like, and has an aspheric image side surface.

The second lens unit G2, in order from the object side to the image side, comprises: a negative meniscus fourth lens element L4 with the convex surface facing the object side; a bi-concave fifth lens element L5; and a positive meniscus sixth lens element L6 with the convex surface facing the object side.

The third lens unit G3, in order from the object side to the image side, comprises: a positive meniscus seventh lens element L7 with the convex surface facing the object side; a negative meniscus eighth lens element L8 with the convex surface facing the object side; a positive meniscus ninth lens element L9 with the convex surface facing the object side; a bi-convex tenth lens element L10; and a negative meniscus eleventh lens element L11 with the convex surface facing the image side. Among these, the eighth lens element L8 and the ninth lens element L9 are cemented with each other, and the tenth lens element L10 and the eleventh lens element L11 are cemented with each other. The ninth lens element L9 has an aspheric image side surface, and the tenth lens element L10 has an aspheric object side surface. Further, an aperture diaphragm A is provided on the object side of the seventh lens element L7.

The fourth lens unit G4 comprises solely a negative meniscus twelfth lens element L12 with the convex surface facing the object side.

The fifth lens unit G5 comprises solely a bi-convex thirteenth lens element L13. The thirteenth lens element L13 has an aspheric image side surface.

The tenth lens element L10 and the eleventh lens element L11 in the third lens unit G3 correspond to an image blur compensating lens unit described later, which moves in a direction perpendicular to the optical axis in order to optically compensate image blur.

In zooming from a wide-angle limit to a telephoto limit at the time of image taking, the second lens unit G2 monotonically moves to the image side, the third lens unit G3 substantially monotonically moves to the object side, the fourth lens unit G4 moves with locus of a slight convex to the object side, and the first lens unit G1 and the fifth lens unit G5 are fixed with respect to the image surface S. That is, in zooming, the second lens unit G2, the third lens unit G3, and the fourth lens unit G4 individually move along the optical axis so that the interval between the first lens unit G1 and the second lens unit G2 and the interval between the third lens unit G3 and the fourth lens unit G4 increase, the interval between the second lens unit G2 and the third lens unit G3 decreases, and the interval between the fourth lens unit G4 and the fifth lens unit G5 varies.

In focusing from an infinity in-focus condition to a close-object in-focus condition, the fourth lens unit G4 as a focusing lens unit moves to the image side along the optical axis in any zooming condition.

Embodiment 7

As shown in FIG. 25, the first lens unit G1, in order from the object side to the image side, comprises: a negative meniscus first lens element L1 with the convex surface facing the object side; a bi-convex second lens element L2; and a positive meniscus third lens element L3 with the convex surface facing the image side. The first lens element L1, the second lens element L2, and the third lens element L3 are cemented with each other. The third lens element L3 is an aspherical lens element formed of a thin layer of resin or the like, and has an aspheric image side surface.

The second lens unit G2, in order from the object side to the image side, comprises: a bi-concave fourth lens element L4; a bi-concave fifth lens element L5; and a positive meniscus sixth lens element L6 with the convex surface facing the object side. Among these, the fifth lens element L5 has an aspheric object side surface.

The third lens unit G3, in order from the object side to the image side, comprises: a positive meniscus seventh lens element L7 with the convex surface facing the object side; a negative meniscus eighth lens element L8 with the convex surface facing the object side; and a positive meniscus ninth lens element L9 with the convex surface facing the object side. Among these, the eighth lens element L8 and the ninth lens element L9 are cemented with each other. The ninth lens element L9 has an aspheric image side surface.

The fourth lens unit G4, in order from the object side to the image side, comprises: a bi-convex tenth lens element L10; and a negative meniscus eleventh lens element L11 with the convex surface facing the image side. The tenth lens element L10 and the eleventh lens element L11 are cemented with each other. The tenth lens element L10 has an aspheric object side surface. Further, an aperture diaphragm A is provided on the object side of the tenth lens element L10.

The fifth lens unit G5, in order from the object side to the image side, comprises: a negative meniscus twelfth lens element L12 with the convex surface facing the object side; a negative meniscus thirteenth lens element L13 with the convex surface facing the image side; and a positive meniscus fourteenth lens element L14 with the convex surface facing the image side. Among these, the thirteenth lens element L13 and the fourteenth lens element L14 are cemented with each other.

The sixth lens unit G6 comprises solely a bi-convex fifteenth lens element L15. The fifteenth lens element L15 has an aspheric image side surface.

The tenth lens element L10 and the eleventh lens element L11 which are components of the fourth lens unit G4 correspond to an image blur compensating lens unit described later, which moves in a direction perpendicular to the optical axis in order to optically compensate image blur.

In zooming from a wide-angle limit to a telephoto limit at the time of image taking, the second lens unit G2 and the fifth lens unit G5 monotonically move to the image side, the third lens unit G3 moves with locus of a slight convex to the object side, and the first lens unit G1, the fourth lens unit G4, and the sixth lens unit G6 are fixed with respect to the image surface S. That is, in zooming, the second lens unit G2, the third lens unit G3, and the fifth lens unit G5 individually move along the optical axis so that the interval between the first lens unit G1 and the second lens unit G2 and the interval between the fourth lens unit G4 and the fifth lens unit G5 increase, the interval between the second lens unit G2 and the third lens unit G3 and the interval between the fifth lens unit G5 and the sixth lens unit G6 decrease, and the interval between the third lens unit G3 and the fourth lens unit G4 varies.

In focusing from an infinity in-focus condition to a close-object in-focus condition, the fifth lens unit G5 as a focusing lens unit moves to the image side along the optical axis in any zooming condition.

Embodiment 8

As shown in FIG. 29, the first lens unit G1, in order from the object side to the image side, comprises: a bi-convex first lens element L1; a negative meniscus second lens element L2 with the convex surface facing the object side; and a positive meniscus third lens element L3 with the convex surface facing the object side. Among these, the second lens element L2 and the third lens element L3 are cemented with each other.

The second lens unit G2, in order from the object side to the image side, comprises: a negative meniscus fourth lens element L4 with the convex surface facing the object side; a positive meniscus fifth lens element L5 with the convex surface facing the object side; and a bi-concave sixth lens element L6. Among these, the fourth lens element L4 and the fifth lens element L5 are cemented with each other.

The third lens unit G3, in order from the object side to the image side, comprises: a bi-convex seventh lens element L7; a negative meniscus eighth lens element L8 with the convex surface facing the object side; a positive meniscus ninth lens element L9 with the convex surface facing the object side; a bi-convex tenth lens element L10; and a negative meniscus eleventh lens element L11 with the convex surface facing the image side. Among these, the eighth lens element L8 and the ninth lens element L9 are cemented with each other, and the tenth lens element L10 and the eleventh lens element L11 are cemented with each other. The seventh lens element L7 has two aspheric surfaces, and the tenth lens element L10 has an aspheric object side surface. Further, an aperture diaphragm A is provided between the seventh lens element L7 and the eighth lens element L8.

The fourth lens unit G4 comprises solely a negative meniscus twelfth lens element L12 with the convex surface facing the object side.

The fifth lens unit G5 comprises solely a bi-concave thirteenth lens element L13.

The sixth lens unit G6 comprises solely a bi-convex fourteenth lens element L14.

The tenth lens element L10 and the eleventh lens element L11 in the third lens unit G3 correspond to an image blur compensating lens unit described later, which moves in a direction perpendicular to the optical axis in order to optically compensate image blur.

In zooming from a wide-angle limit to a telephoto limit at the time of image taking, the second lens unit G2 monotonically moves to the image side, the fourth lens unit G4 moves with locus of a convex to the image side, the fifth lens unit G5 substantially monotonically moves to the object side, and the first lens unit G1, the third lens unit G3, and the sixth lens unit G6 are fixed with respect to the image surface S. That is, in zooming, the second lens unit G2, the fourth lens unit G4, and the fifth lens unit G5 individually move along the optical axis so that the interval between the first lens unit G1 and the second lens unit G2 and the interval between the fifth lens unit G5 and the sixth lens unit G6 increase, the interval between the second lens unit G2 and the third lens unit G3 and the interval between the fourth lens unit G4 and the fifth lens unit G5 decrease, and the interval between the third lens unit G3 and the fourth lens unit G4 varies.

In focusing from an infinity in-focus condition to a close-object in-focus condition, the fourth lens unit G4 as a focusing lens unit moves to the image side along the optical axis in any zooming condition.

Embodiment 9

As shown in FIG. 33, the first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. The first lens element L1, the second lens element L2, and the third lens element L3 are cemented with each other. The third lens element L3 is an aspherical lens element formed of a thin layer of resin or the like, and has an aspheric image side surface.

The second lens unit G2, in order from the object side to the image side, comprises: a negative meniscus fourth lens element L4 with the convex surface facing the object side; a bi-concave fifth lens element L5; and a positive meniscus sixth lens element L6 with the convex surface facing the object side.

The third lens unit G3, in order from the object side to the image side, comprises: a positive meniscus seventh lens element L7 with the convex surface facing the object side; a negative meniscus eighth lens element L8 with the convex surface facing the object side; a positive meniscus ninth lens element L9 with the convex surface facing the object side; a bi-convex tenth lens element L10; and a negative meniscus eleventh lens element L11 with the convex surface facing the image side. Among these, the eighth lens element L8 and the ninth lens element L9 are cemented with each other, and the tenth lens element L10 and the eleventh lens element L11 are cemented with each other. The ninth lens element L9 has an aspheric image side surface, and the tenth lens element L10 has an aspheric object side surface. Further, an aperture diaphragm A is provided on the object side of the seventh lens element L7.

The fourth lens unit G4 comprises solely a negative meniscus twelfth lens element L12 with the convex surface facing the object side.

The fifth lens unit G5 comprises solely a bi-convex thirteenth lens element L13. The thirteenth lens element L13 has an aspheric image side surface.

The tenth lens element L10 and the eleventh lens element L11 in the third lens unit G3 correspond to an image blur compensating lens unit described later, which moves in a direction perpendicular to the optical axis in order to optically compensate image blur.

In zooming from a wide-angle limit to a telephoto limit at the time of image taking, the second lens unit G2 monotonically moves to the image side, the third lens unit G3 substantially monotonically moves to the object side, the fourth lens unit G4 moves with locus of a slight convex to the object side, and the first lens unit G1 and the fifth lens unit G5 are fixed with respect to the image surface S. That is, in zooming, the second lens unit G2, the third lens unit G3, and the fourth lens unit G4 individually move along the optical axis so that the interval between the first lens unit G1 and the second lens unit G2 and the interval between the third lens unit G3 and the fourth lens unit G4 increase, the interval between the second lens unit G2 and the third lens unit G3 decreases, and the interval between the fourth lens unit G4 and the fifth lens unit G5 varies.

In focusing from an infinity in-focus condition to a close-object in-focus condition, the fourth lens unit G4 as a focusing lens unit moves to the image side along the optical axis in any zooming condition.

In the zoom lens systems according to Embodiments 1 to 9, in zooming from a wide-angle limit to a telephoto limit at the time of image taking, the lens unit located closest to the object side, i.e., the first lens unit G1, is fixed with respect to the image surface. Therefore, weight reduction of the movable lens units is achieved, and actuators can be arranged inexpensively. In addition, generation of noise during zooming is suppressed. Moreover, since the overall length of lens system is not changed, a user can easily operate the lens system, and entry of dust or the like into the lens system is sufficiently prevented.

In the zoom lens systems according to Embodiments 1 to 9, since the lens unit located closest to the object side, i.e., the first lens unit G1, has positive optical power, the size of the lens system can be reduced, and the amount of aberration caused by decentering of a lens element can be reduced.

In the zoom lens systems according to Embodiments 1 to 9, among the lens units located on the image side relative to the aperture diaphragm, the lens unit having negative optical power, i.e., the fifth lens unit G5 in Embodiments 1, 2, and 7 or the fourth lens unit G4 in Embodiments 3 to 6, 8, and 9, is a focusing lens unit which moves along the optical axis in at least one zooming position from a wide-angle limit to a telephoto limit, in focusing from an infinity in-focus condition to a close-object in-focus condition. Therefore, the overall length of lens system can be reduced. The overall length of lens system can be further reduced by increasing the negative optical power, for example. Moreover, the amount of lens movement in focusing is reduced, which is advantageous for size reduction of the lens system.

The zoom lens systems according to Embodiments 1 to 9 are each provided with the image blur compensating lens unit which moves in the direction perpendicular to the optical axis. The image blur compensating lens unit compensates image point movement caused by vibration of the entire system, that is, optically compensates image blur caused by hand blurring, vibration and the like.

When image point movement caused by vibration of the entire system is to be compensated, the image blur compensating lens unit moves in the direction perpendicular to the optical axis, so that image blur is compensated in a state that size increase in the entire zoom lens system is suppressed to realize a compact construction and that excellent imaging characteristics such as small decentering coma aberration and small decentering astigmatism are satisfied.

The image blur compensating lens unit according to the present disclosure may be a single lens unit. When a single lens unit is composed of a plurality of lens elements, the image blur compensating lens unit may be any one lens element or a plurality of adjacent lens elements among the plurality of lens elements.

In the zoom lens systems according to Embodiments 1 to 9, the image blur compensating lens unit having positive optical power contradicts the focusing lens unit having negative optical power. Therefore, the optical powers thereof can be increased, and thereby the amount of lens movement in focusing is reduced. Moreover, the amount of movement of the image blur compensating lens unit in the direction perpendicular to the optical axis is also reduced.

By arranging the image blur compensating lens unit and the focusing lens unit adjacent to each other as in the zoom lens systems according to Embodiments 1 to 9, the optical powers thereof can be further increased.

In the zoom lens systems according to Embodiments 1 to 9, in zooming from a wide-angle limit to a telephoto limit at the time of image taking, the lens unit having the aperture diaphragm, i.e., the fourth lens unit G4 in Embodiments 1, 2, and 7 or the third lens unit G3 in Embodiments 3 to 6, 8, and 9, is fixed with respect to the image surface. Therefore, a unit including the lens unit having the aperture diaphragm which is heavy in weight is not moved, and thereby the actuators can be arranged inexpensively.

In the zoom lens systems according to Embodiments 1, 2, 5 to 7, and 9, a lens unit having positive optical power is provided on each of the object side and the image side of the focusing lens unit. Therefore, the optical power of the focusing lens unit can be increased, and thereby the amount of lens movement in focusing is reduced, which is advantageous for size reduction of the lens system.

In the zoom lens systems according to Embodiments 1 to 4, 7, and 8, in zooming from a wide-angle limit to a telephoto limit at the time of image taking, the image blur compensating lens unit is fixed with respect to the image surface. Therefore, increase in the size of the entire zoom lens system is suppressed to construct the zoom lens system compactly. In addition, since a unit including the image blur compensating lens unit which is heavy in weight is not moved, the actuators can be arranged inexpensively.

In the zoom lens systems according to Embodiments 1 to 9, in zooming from a wide-angle limit to a telephoto limit at the time of image taking, the lens unit located closest to the image side, i.e., the sixth lens unit G6 in Embodiments 1 to 4, 7, and 8 or the fifth lens unit G5 in Embodiments 5, 6, and 9, is fixed with respect to the image surface. Therefore, entry of dust or the like into the lens system is sufficiently prevented.

Further, in the zoom lens systems according to Embodiments 1 to 9, the lens unit located closest to the image side is composed of one lens element having positive optical power. Therefore, the negative optical power of the focusing lens unit can be further increased, and the amount of lens movement in focusing can be further reduced. Furthermore, the lens unit having such a simple configuration of one lens element is space saving, and can be easily incorporated in a lens barrel.

The zoom lens systems according to Embodiments 1 to 4, 7, and 8 each have a six-unit construction including the first to sixth lens units G1 to G6, and the zoom lens systems according to Embodiments 5, 6, and 9 each have a five-unit construction including the first to fifth lens units G1 to G5. In the present disclosure, the number of the lens units constituting each zoom lens system is not particularly limited so long as the lens unit having positive optical power, which is located closest to the object side, is fixed with respect to the image surface in zooming, and the lens unit having negative optical power among the lens units located on the image side relative to the aperture diaphragm is a focusing lens unit. Further, the optical powers of the respective lens units constituting the zoom lens system are also not particularly limited.

As described above, Embodiments 1 to 9 have been described as examples of art disclosed in the present application. However, the art in the present disclosure is not limited to these embodiments. It is understood that various modifications, replacements, additions, omissions, and the like have been performed in these embodiments to give optional embodiments, and the art in the present disclosure can be applied to the optional embodiments.

The following description is given for conditions that are beneficial to be satisfied by a zoom lens system like the zoom lens systems according to Embodiments 1 to 9. Here, a plurality of beneficial conditions is set forth for the zoom lens system according to each embodiment. A construction that satisfies all the plural conditions is most effective for the zoom lens system. However, when an individual condition is satisfied, a zoom lens system having the corresponding effect is obtained.

For example, in a zoom lens system like the zoom lens systems according to Embodiments 1 to 9, which has a plurality of lens units each comprising at least one lens element, and in which a lens unit located closest to the object side is fixed with respect to the image surface in zooming from a wide-angle limit to a telephoto limit at the time of image taking, in which the lens unit located closest to the object side has positive optical power, and in which a lens unit having negative optical power among lens units located on the image side relative to an aperture diaphragm is a focusing lens unit which moves along the optical axis in at least one zooming position from a wide-angle limit to a telephoto limit, in focusing from an infinity in-focus condition to a close-object in-focus condition (this lens configuration is referred to as a basic configuration of the embodiments, hereinafter), the following conditions (1) and (2) are satisfied.

$$-1.8 < f_n/f_W < -0.3 \tag{1}$$

$$0.1 < T_1/f_W < 1.5 \tag{2}$$

where $f_n$ is a composite focal length of the lens unit having negative optical power, which is a focusing lens unit, $T_1$ is an axial thickness of the lens unit located closest to the object side, and $f_W$ is a focal length of the entire system at a wide-angle limit.

The condition (1) sets forth the relationship between the focal length of the lens unit having negative optical power, which is a focusing lens unit, and the focal length of the entire system at a wide-angle limit. When the value goes below the lower limit of the condition (1), the amount of lens movement in focusing increases, and the overall length of lens system also increases. When the value exceeds the upper limit of the condition (1), the optical power of the focusing lens unit becomes excessively high, and thereby spherical aberration or curvature of field occurs in focusing, resulting in deterioration of performance in a close-object in-focus condition, and increase in occurrence of aberration when the focusing lens unit is decentered.

When at least one of the following conditions (1)' and (1)" is satisfied, the above-mentioned effect is achieved more successfully.

$$-1.6 < f_n/f_W \qquad (1)'$$

$$f_n/f_W < -0.4 \qquad (1)"$$

The condition (2) sets forth the relationship between the axial thickness of the lens unit located closest to the object side, i.e., the first lens unit, and the focal length of the entire system at a wide-angle limit. When the value goes below the lower limit of the condition (2), the optical power of the first lens unit cannot be increased, and the size of the zoom lens system increases. When the value exceeds the upper limit of the condition (2), the thickness of the first lens unit increases, and the size of the zoom lens system also increases.

When at least one of the following conditions (2)' and (2)" is satisfied, the above-mentioned effect is achieved more successfully.

$$0.17 < T_1/f_W \qquad (2)'$$

$$T_1/f_W < 1.20 \qquad (2)"$$

It is beneficial that a zoom lens system having the basic configuration like the zoom lens systems according to Embodiments 1 to 9 satisfies the following condition (3).

$$1.0 < |f_1/f_W| < 4.5 \qquad (3)$$

where $f_1$ is a composite focal length of the lens unit located closest to the object side, and $f_W$ is a focal length of the entire system at a wide-angle limit.

The condition (3) sets forth the relationship between the focal length of the first lens unit and the focal length of the entire system at a wide-angle limit. When the value goes below the lower limit of the condition (3), the optical power of the first lens unit increases, which might cause increase in occurrence of aberration when the first lens unit is decentered. When the value exceeds the upper limit of the condition (3), the thickness of the first lens unit increases, which might cause increase in the size of the zoom lens system.

When at least one of the following conditions (3)' and (3)" is satisfied, the above-mentioned effect is achieved more successfully.

$$1.2 < |f_1/f_W| \qquad (3)'$$

$$|f_1/f_W| < 4.0 \qquad (3)"$$

It is beneficial that a zoom lens system having the basic configuration like the zoom lens systems according to Embodiments 1 to 9 satisfies the following condition (4).

$$0.2 < |f_2/f_W| < 1.0 \qquad (4)$$

where $f_2$ is a composite focal length of a lens unit which is located having one air space toward the image side from the lens unit located closest to the object side, and $f_W$ is a focal length of the entire system at a wide-angle limit.

The condition (4) sets forth the relationship between the focal length of the lens unit located just on the image side of the first lens unit, i.e., the second lens unit, and the focal length of the entire system at a wide-angle limit. When the value goes below the lower limit of the condition (4), the optical power of the second lens unit increases, which might cause increase in occurrence of aberration when the second lens unit is decentered. When the value exceeds the upper limit of the condition (4), the amount of movement of the second lens unit increases in zooming, which might cause increase in the overall length of lens system.

When at least one of the following conditions (4)' and (4)" is satisfied, the above-mentioned effect is achieved more successfully.

$$0.3 < |f_2/f_W| \qquad (4)'$$

$$|f_2/f_W| < 0.9 \qquad (4)"$$

It is beneficial that a zoom lens system having the basic configuration like the zoom lens systems according to Embodiments 1 to 9 satisfies the following condition (5).

$$0.1 < (T_1+T_2)/f_W < 2.5 \qquad (5)$$

where $T_1$ is an axial thickness of the lens unit located closest to the object side, $T_2$ is an axial thickness of a lens unit which is located having one air space toward the image side from the lens unit located closest to the object side, and $f_W$ is a focal length of the entire system at a wide-angle limit.

The condition (5) sets forth the relationship between the sum of the axial thickness of the first lens unit and the axial thickness of the second lens unit, and the focal length of the entire system at a wide-angle limit. When the value goes below the lower limit of the condition (5), the optical powers of the lens units cannot be increased, which might cause increase in the size of the zoom lens system. When the value exceeds the upper limit of the condition (5), the thicknesses of the lens units increase, which also might cause increase in the size of the zoom lens system.

When at least one of the following conditions (5)' and (5)" is satisfied, the above-mentioned effect is achieved more successfully.

$$0.2 < (T_1+T_2)/f_W \qquad (5)'$$

$$(T_1+T_2)/f_W < 2.0 \qquad (5)"$$

It is beneficial that a zoom lens system having the basic configuration like the zoom lens systems according to Embodiments 1 to 9 satisfies the following condition (6).

$$0.1 < (T_1+T_2)/H < 2.0 \qquad (6)$$

where $T_1$ is an axial thickness of the lens unit located closest to the object side, $T_2$ is an axial thickness of a lens unit which is located having one air space toward the image side from the lens unit located closest to the object side, and H is an image height.

The condition (6) sets forth the relationship between the sum of the axial thickness of the first lens unit and the axial thickness of the second lens unit, and the image height. When the value goes below the lower limit of the condition (6), the optical powers of the lens units cannot be increased, which might cause increase in the size of the zoom lens system. When the value exceeds the upper limit of the condition (6), the thicknesses of the lens units increase, which also might cause increase in the size of the zoom lens system.

When at least one of the following conditions (6)' and (6)" is satisfied, the above-mentioned effect is achieved more successfully.

$$1.0 < (T_1+T_2)/H \quad (6)'$$

$$(T_1+T_2)/H < 1.9 \quad (6)''$$

The individual lens units constituting the zoom lens systems according to Embodiments 1 to 9 are each composed exclusively of refractive type lens elements that deflect incident light by refraction (that is, lens elements of a type in which deflection is achieved at the interface between media having different refractive indices). However, the present invention is not limited to this construction. For example, the lens units may employ diffractive type lens elements that deflect incident light by diffraction; refractive-diffractive hybrid type lens elements that deflect incident light by a combination of diffraction and refraction; or gradient index type lens elements that deflect incident light by distribution of refractive index in the medium. In particular, in the refractive-diffractive hybrid type lens element, when a diffraction structure is formed in the interface between media having different refractive indices, wavelength dependence of the diffraction efficiency is improved. Thus, such a configuration is beneficial.

Embodiment 10

Figure 37:
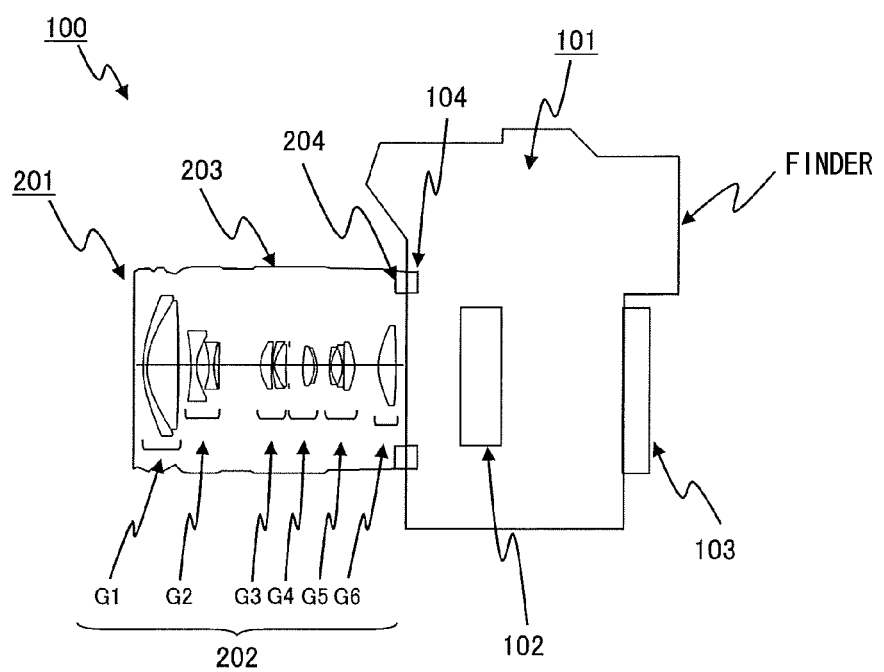
FIG. 37 is a schematic construction diagram of an interchangeable-lens type digital camera system according to Embodiment 10.

FIG. 37 is a schematic construction diagram of an interchangeable-lens type digital camera system according to Embodiment 10.

The interchangeable-lens type digital camera system 100 according to Embodiment 10 includes a camera body 101, and an interchangeable lens apparatus 201 which is detachably connected to the camera body 101.

The camera body 101 includes: an image sensor 102 which receives an optical image formed by a zoom lens system 202 of the interchangeable lens apparatus 201, and converts the optical image into an electric image signal; a liquid crystal monitor 103 which displays the image signal obtained by the image sensor 102; and a camera mount section 104. On the other hand, the interchangeable lens apparatus 201 includes: a zoom lens system 202 according to any of Embodiments 1 to 9; a lens barrel 203 which holds the zoom lens system 202; and a lens mount section 204 connected to the camera mount section 104 of the camera body 101. The camera mount section 104 and the lens mount section 204 are physically connected to each other. Moreover, the camera mount section 104 and the lens mount section 204 function as interfaces which allow the camera body 101 and the interchangeable lens apparatus 201 to exchange signals, by electrically connecting a controller (not shown) in the camera body 101 and a controller (not shown) in the interchangeable lens apparatus 201. In FIG. 37, the zoom lens system according to Embodiment 1 is employed as the zoom lens system 202.

In Embodiment 10, since the zoom lens system 202 according to any of Embodiments 1 to 9 is employed, a compact interchangeable lens apparatus having excellent imaging performance can be realized at low cost. Moreover, size reduction and cost reduction of the entire camera system 100 according to Embodiment 10 can be achieved. In the zoom lens systems according to Embodiments 1 to 9, the entire zooming range need not be used. That is, in accordance with a desired zooming range, a range where satisfactory optical performance is obtained may exclusively be used. Then, the zoom lens system may be used as one having a lower magnification than the zoom lens systems described in Embodiments 1 to 9.

As described above, Embodiment 10 has been described as an example of art disclosed in the present application. However, the art in the present disclosure is not limited to this embodiment. It is understood that various modifications, replacements, additions, omissions, and the like have been performed in this embodiment to give optional embodiments, and the art in the present disclosure can be applied to the optional embodiments.

Numerical examples are described below in which the zoom lens systems according to Embodiments 1 to 9 are implemented. Here, in the numerical examples, the units of length are all "mm", while the units of view angle are all "°". Moreover, in the numerical examples, r is the radius of curvature, d is the axial distance, nd is the refractive index to the d-line, and vd is the Abbe number to the d-line. In the numerical examples, the surfaces marked with * are aspherical surfaces, and the aspherical surface configuration is defined by the following expression.

$$Z = \frac{h^2/r}{1 + \sqrt{1 - (1+\kappa)(h/r)^2}} + \sum A_n h^n$$

Here, the symbols in the formula indicate the following quantities.

Z is a distance from a point on an aspherical surface at a height h relative to the optical axis to a tangential plane at the vertex of the aspherical surface, h is a height relative to the optical axis, r is a radius of curvature at the top, κ is a conic constant, and $A_n$ is a n-th order aspherical coefficient.

FIGS. 2, 6, 10, 14, 18, 22, 26, 30, and 34 are longitudinal aberration diagrams of an infinity in-focus condition of the zoom lens systems according to Numerical Examples 1 to 9, respectively.

FIGS. 3, 7, 11, 15, 19, 23, 27, 31, and 35 are longitudinal aberration diagrams of a close-object in-focus condition of the zoom lens systems according to Numerical Examples 1 to 9, respectively. The object distance in each Numerical Example is as follows.

| Numerical Example | Object distance (mm) |
|---|---|
| 1 | 892 |
| 2 | 892 |
| 3 | 1887 |
| 4 | 1884 |
| 5 | 906 |
| 6 | 906 |
| 7 | 892 |
| 8 | 1887 |
| 9 | 906 |

In each longitudinal aberration diagram, part (a) shows the aberration at a wide-angle limit, part (b) shows the aberration at a middle position, and part (c) shows the aberration at a telephoto limit. Each longitudinal aberration diagram, in order from the left-hand side, shows the spherical aberration (SA (mm)), the astigmatism (AST (mm)) and the distortion (DIS (%)). In each spherical aberration diagram, the vertical axis indicates the F-number (in each Fig., indicated as F), and the solid line, the short dash line and the long dash line indicate the characteristics to the d-line, the F-line and the C-line, respectively. In each astigmatism diagram, the vertical axis indicates the image height (in each Fig., indicated as H), and the solid line and the dash line indicate the characteristics to the sagittal plane (in each Fig., indicated as "s") and the meridional plane (in each Fig., indicated as "m"), respectively. In each distortion diagram, the vertical axis indicates the image height (in each Fig., indicated as H).

FIGS. 4, 8, 12, 16, 20, 24, 28, 32, and 36 are lateral aberration diagrams of the zoom lens systems at a telephoto limit according to Numerical Examples 1 to 9, respectively.

In each lateral aberration diagram, the aberration diagrams in the upper three parts correspond to a basic state where image blur compensation is not performed at a telephoto limit, while the aberration diagrams in the lower three parts correspond to an image blur compensation state where the image blur compensating lens unit (Numerical Examples 1, 2, and 7: the tenth lens element L10 and the eleventh lens element L11 in the fourth lens unit G4, Numerical Examples 3 to 6, 8, and 9: the tenth lens element L10 and the eleventh lens element L11 in the third lens unit G3) is moved by a predetermined amount in a direction perpendicular to the optical axis at a telephoto limit. Among the lateral aberration diagrams of a basic state, the upper part shows the lateral aberration at an image point of 70% of the maximum image height, the middle part shows the lateral aberration at the axial image point, and the lower part shows the lateral aberration at an image point of −70% of the maximum image height. Among the lateral aberration diagrams of an image blur compensation state, the upper part shows the lateral aberration at an image point of 70% of the maximum image height, the middle part shows the lateral aberration at the axial image point, and the lower part shows the lateral aberration at an image point of −70% of the maximum image height. In each lateral aberration diagram, the horizontal axis indicates the distance from the principal ray on the pupil surface, and the solid line, the short dash line and the long dash line indicate the characteristics to the d-line, the F-line and the C-line, respectively. In each lateral aberration diagram, the meridional plane is adopted as the plane containing the optical axis of the first lens unit G1 and the optical axis of the forth lens unit G4 (Numerical Examples 1, 2, and 7), or the optical axis of the first lens unit G1 and the optical axis of the third lens unit G3 (Numerical Examples 3 to 6, 8, and 9).

In the zoom lens system according to each Numerical Example, the amount of movement of the image blur compensating lens unit in a direction perpendicular to the optical axis in an image blur compensation state at a telephoto limit is as follows.

| Numerical Example | Amount of movement (mm) |
|---|---|
| 1 | 0.2 |
| 2 | 0.2 |
| 3 | 0.3 |
| 4 | 0.3 |
| 5 | 0.1 |
| 6 | 0.1 |
| 7 | 0.2 |
| 8 | 0.3 |
| 9 | 0.1 |

When the shooting distance is infinity, at a telephoto limit, the amount of image decentering in a case that the zoom lens system inclines by a prescribed angle is equal to the amount of image decentering in a case that the image blur compensating lens unit displaces in parallel by each of the above-mentioned values in a direction perpendicular to the optical axis.

As seen from the lateral aberration diagrams, satisfactory symmetry is obtained in the lateral aberration at the axial image point. Further, when the lateral aberration at the +70% image point and the lateral aberration at the −70% image point are compared with each other in the basic state, all have a small degree of curvature and almost the same inclination in the aberration curve. Thus, decentering coma aberration and decentering astigmatism are small. This indicates that sufficient imaging performance is obtained even in the image blur compensation state. Further, when the image blur compensation angle of a zoom lens system is the same, the amount of parallel translation required for image blur compensation decreases with decreasing focal length of the entire zoom lens system. Thus, at arbitrary zoom positions, sufficient image blur compensation can be performed for image blur compensation angles up to the prescribed angle without degrading the imaging characteristics.

Numerical Example 1

The zoom lens system of Numerical Example 1 corresponds to Embodiment 1 shown in FIG. 1. Table 1 shows the surface data of the zoom lens system of Numerical Example 1. Table 2 shows the aspherical data. Table 3 shows various data in an infinity in-focus condition. Table 4 shows various data in a close-object in-focus condition.

TABLE 1

(Surface data)

| Surface number | r | d | nd | vd |
|---|---|---|---|---|
| Object surface | ∞ | | | |
| 1 | 46.59700 | 1.20000 | 1.84666 | 23.8 |
| 2 | 29.34880 | 8.06990 | 1.72916 | 54.7 |
| 3 | −503.48930 | 0.14340 | 1.51340 | 52.9 |
| 4* | −317.73390 | Variable | | |
| 5 | −285.09150 | 0.95000 | 1.91082 | 35.2 |
| 6 | 12.84580 | 3.82700 | | |
| 7* | −34.42170 | 1.20000 | 1.69400 | 56.3 |
| 8 | 31.35840 | 0.15000 | | |
| 9 | 22.15390 | 2.37610 | 1.94595 | 18.0 |
| 10 | 195.32360 | Variable | | |
| 11 | 13.52110 | 3.01390 | 1.68893 | 31.2 |
| 12 | 66.99660 | 0.15000 | | |
| 13 | 23.77100 | 0.60000 | 1.90366 | 31.3 |
| 14 | 9.49470 | 3.46580 | 1.50670 | 70.5 |
| 15* | 302.21690 | Variable | | |
| 16(Diaphragm) | ∞ | 3.50000 | | |
| 17* | 31.79690 | 3.21400 | 1.58700 | 59.6 |
| 18 | −10.67340 | 0.50000 | 1.84666 | 23.8 |
| 19 | −19.18930 | Variable | | |
| 20 | 61.91570 | 0.60000 | 1.91082 | 35.2 |
| 21 | 13.28250 | 2.18970 | | |
| 22 | −10.52200 | 0.50000 | 1.77250 | 49.6 |
| 23 | 388.17750 | 3.20460 | 1.74950 | 35.0 |
| 24 | −12.12240 | Variable | | |
| 25 | 23.04370 | 5.03410 | 1.50670 | 70.5 |
| 26* | −317.40170 | (BF) | | |
| Image surface | ∞ | | | |

TABLE 2

(Aspherical data)

Surface No. 4

K = 0.00000E+00, A4 = 1.71813E−06, A6 = −7.27512E−10,
A8 = 0.00000E+00 A10 = 0.00000E+00

Surface No. 7

K = 0.00000E+00, A4 = 7.08869E−06, A6 = −1.79352E−07,
A8 = 2.99404E−09 A10 = −2.30427E−11

Surface No. 15

K = 0.00000E+00, A4 = 8.05746E−05, A6 = 2.31496E−07,
A8 = −7.31615E−10 A10 = 3.44991E−11

Surface No. 17

K = 0.00000E+00, A4 = −8.15426E−06, A6 = 2.32780E−07,
A8 = −1.20133E−08 A10 = 2.22536E−10

Surface No. 26

K = 0.00000E+00, A4 = 7.79328E−06, A6 = −5.20215E−08,
A8 = 3.54045E−11 A10 = 3.28593E−13

TABLE 3

(Various data in an infinity in-focus condition)

Zooming ratio 4.70881

| | Wide-angle limit | Middle position | Telephoto limit |
|---|---|---|---|
| Focal length | 17.5101 | 37.9940 | 82.4515 |
| F-number | 3.60541 | 4.94459 | 5.76831 |
| View angle | 34.9530 | 15.4671 | 7.1450 |
| Image height | 10.8150 | 10.8150 | 10.8150 |
| Overall length of lens system | 108.0000 | 108.0000 | 108.0000 |
| BF | 14.9500 | 14.9500 | 14.9500 |
| d4 | 1.0000 | 15.2321 | 27.2073 |
| d10 | 27.1147 | 11.8628 | 1.0000 |
| d15 | 1.6593 | 2.6791 | 1.5666 |
| d19 | 3.1000 | 7.3339 | 11.9603 |
| d24 | 16.2874 | 12.0534 | 7.4275 |

Zoom lens unit data

| Lens unit | Initial surface No. | Focal length |
|---|---|---|
| 1 | 1 | 62.12776 |
| 2 | 5 | −12.74152 |
| 3 | 11 | 26.41511 |
| 4 | 16 | 26.61438 |
| 5 | 20 | −20.48018 |
| 6 | 25 | 42.61196 |

TABLE 4

(Various data in a close-object in-focus condition)

Zooming ratio 4.40083

| | Wide-angle limit | Middle position | Telephoto limit |
|---|---|---|---|
| Object distance | 892.0000 | 892.0000 | 892.0000 |
| Focal length | 17.4999 | 37.7125 | 77.0140 |
| F-number | 3.61701 | 4.98560 | 5.93716 |
| View angle | 34.8555 | 15.4198 | 6.9326 |
| Image height | 10.8150 | 10.8150 | 10.8150 |
| Overall length of lens system | 108.0000 | 108.0000 | 108.0000 |
| BF | 14.9500 | 14.9500 | 14.9500 |
| d4 | 1.0000 | 15.2321 | 27.2073 |
| d10 | 27.1147 | 11.8628 | 1.0000 |
| d15 | 1.6593 | 2.6791 | 1.5666 |
| d19 | 3.1782 | 7.7398 | 14.1613 |
| d24 | 16.2092 | 11.6475 | 5.2265 |

Zoom lens unit data

| Lens unit | Initial surface No. | Focal length |
|---|---|---|
| 1 | 1 | 62.12776 |
| 2 | 5 | −12.74152 |
| 3 | 11 | 26.41511 |
| 4 | 16 | 26.61438 |
| 5 | 20 | −20.48018 |
| 6 | 25 | 42.61196 |

Numerical Example 2

The zoom lens system of Numerical Example 2 corresponds to Embodiment 2 shown in FIG. 5. Table 5 shows the surface data of the zoom lens system of Numerical Example 2. Table 6 shows the aspherical data. Table 7 shows various data in an infinity in-focus condition. Table 8 shows various data in a close-object in-focus condition.

TABLE 5

(Surface data)

| Surface number | r | d | nd | vd |
|---|---|---|---|---|
| Object surface | ∞ | | | |
| 1 | 46.11550 | 1.20000 | 1.84666 | 23.8 |
| 2 | 29.17070 | 8.53570 | 1.72916 | 54.7 |
| 3 | −411.92020 | 0.15300 | 1.51340 | 52.9 |
| 4* | −262.52070 | Variable | | |
| 5 | −228.36280 | 0.95000 | 1.91082 | 35.2 |
| 6 | 13.01010 | 3.84470 | | |
| 7* | −34.27340 | 1.20000 | 1.69400 | 56.3 |
| 8 | 30.40350 | 0.15000 | | |
| 9 | 22.11510 | 2.43210 | 1.94595 | 18.0 |
| 10 | 236.79690 | Variable | | |
| 11 | 13.57200 | 3.03470 | 1.68893 | 31.2 |
| 12 | 113.01200 | 0.15000 | | |
| 13 | 36.64910 | 0.60000 | 1.90366 | 31.3 |
| 14 | 10.86680 | 3.11920 | 1.50670 | 70.5 |
| 15* | 847.08880 | Variable | | |
| 16(Diaphragm) | ∞ | 3.50000 | | |
| 17* | 35.48400 | 3.33150 | 1.58700 | 59.6 |
| 18 | −10.06300 | 0.50000 | 1.84666 | 23.8 |
| 19 | −17.94420 | Variable | | |
| 20 | 32.68580 | 0.60000 | 1.91082 | 35.2 |
| 21 | 12.83010 | 2.61200 | | |
| 22 | −9.60040 | 0.50000 | 1.77250 | 49.6 |
| 23 | −78.40580 | 3.33980 | 1.74950 | 35.0 |
| 24 | −11.24400 | Variable | | |
| 25 | 22.20700 | 4.36240 | 1.50670 | 70.5 |
| 26* | 130.96730 | (BF) | | |
| Image surface | ∞ | | | |

TABLE 6

(Aspherical data)

Surface No. 4

K = 0.00000E+00, A4 = 1.99370E−06, A6 = −8.81281E−10,
A8 = 0.00000E+00 A10 = 0.00000E+00

Surface No. 7

K = 0.00000E+00, A4 = 8.32910E−06, A6 = −1.83944E−07,
A8 = 3.18843E−09 A10 = −2.47872E−11

TABLE 6-continued (Aspherical data)

Surface No. 15

K = 0.00000E+00, A4 = 9.53487E−05, A6 = −1.73705E−08,
A8 = 7.95402E−09 A10 = −1.09002E−10
Surface No. 17

K = 0.00000E+00, A4 = −2.69939E−06, A6 = −7.00806E−08,
A8 = 2.96797E−10 A10 = −2.76709E−12
Surface No. 26

K = 0.00000E+00, A4 = 8.41206E−06, A6 = −6.10967E−08,
A8 = −3.49600E−11 A10 = 5.55153E−13

TABLE 7

(Various data in an infinity in-focus condition)

Zooming ratio 4.70874

|  | Wide-angle limit | Middle position | Telephoto limit |
|---|---|---|---|
| Focal length | 17.5100 | 37.9714 | 82.4502 |
| F-number | 3.60511 | 4.94437 | 5.76808 |
| View angle | 34.9558 | 15.4331 | 7.1453 |
| Image height | 10.8150 | 10.8150 | 10.8150 |
| Overall length of lens system | 108.0000 | 108.0000 | 108.0000 |
| BF | 14.9500 | 14.9500 | 14.9500 |
| d4 | 1.0018 | 14.8023 | 26.6821 |
| d10 | 26.5949 | 11.5591 | 1.0000 |
| d15 | 1.6315 | 2.8668 | 1.5460 |
| d19 | 3.1000 | 7.8056 | 11.9949 |
| d24 | 16.6064 | 11.9008 | 7.7121 |

Zoom lens unit data

| Lens unit | Initial surface No. | Focal length |
|---|---|---|
| 1 | 1 | 60.05830 |
| 2 | 5 | −12.79907 |
| 3 | 11 | 28.73125 |
| 4 | 16 | 26.81941 |
| 5 | 20 | −26.13011 |
| 6 | 25 | 52.07339 |

TABLE 8

(Various data in a close-object in-focus condition)

Zooming ratio 4.39712

|  | Wide-angle limit | Middle position | Telephoto limit |
|---|---|---|---|
| Object distance | 892.0000 | 892.0000 | 892.0000 |
| Focal length | 17.4900 | 37.6135 | 76.9055 |
| F-number | 3.61728 | 4.98649 | 5.94328 |
| View angle | 34.8575 | 15.3896 | 6.9306 |
| Image height | 10.8150 | 10.8150 | 10.8150 |
| Overall length of lens system | 108.0000 | 108.0000 | 108.0000 |
| BF | 14.9500 | 14.9500 | 14.9500 |
| d4 | 1.0018 | 14.8023 | 26.6821 |
| d10 | 26.5949 | 11.5591 | 1.0000 |
| d15 | 1.6315 | 2.8668 | 1.5460 |
| d19 | 3.1940 | 8.2993 | 14.6463 |
| d24 | 16.5124 | 11.4071 | 5.0607 |

TABLE 8-continued (Various data in a close-object in-focus condition)

Zoom lens unit data

| Lens unit | Initial surface No. | Focal length |
|---|---|---|
| 1 | 1 | 60.05830 |
| 2 | 5 | −12.79907 |
| 3 | 11 | 28.73125 |
| 4 | 16 | 26.81941 |
| 5 | 20 | −26.13011 |
| 6 | 25 | 52.07339 |

Numerical Example 3

The zoom lens system of Numerical Example 3 corresponds to Embodiment 3 shown in FIG. 9. Table 9 shows the surface data of the zoom lens system of Numerical Example 3. Table 10 shows the aspherical data. Table 11 shows various data in an infinity in-focus condition. Table 12 shows various data in a close-object in-focus condition.

TABLE 9

(Surface data)

| Surface number | r | d | nd | vd |
|---|---|---|---|---|
| Object surface | ∞ |  |  |  |
| 1 | 54.35860 | 4.14390 | 1.48749 | 70.4 |
| 2 | −293.24900 | 0.15000 |  |  |
| 3 | 36.90230 | 1.00000 | 1.85026 | 32.3 |
| 4 | 24.73000 | 5.00000 | 1.49700 | 81.6 |
| 5 | 116.94580 | Variable |  |  |
| 6 | 299.48500 | 0.80000 | 1.80610 | 33.3 |
| 7 | 13.15670 | 2.52440 | 1.94595 | 18.0 |
| 8 | 24.75430 | 1.78040 |  |  |
| 9 | −40.03730 | 0.70000 | 1.80420 | 46.5 |
| 10 | 95.36520 | Variable |  |  |
| 11* | 18.21400 | 4.94770 | 1.73077 | 40.5 |
| 12* | −254.81190 | 1.74960 |  |  |
| 13(Diaphragm) | ∞ | 1.50000 |  |  |
| 14 | 52.13150 | 0.80000 | 1.90366 | 31.3 |
| 15 | 12.51040 | 3.69220 | 1.48749 | 70.4 |
| 16 | 41.64890 | 1.60000 |  |  |
| 17* | 22.31200 | 4.85300 | 1.58913 | 61.3 |
| 18 | −21.79360 | 0.70000 | 1.76182 | 26.6 |
| 19 | −34.45100 | Variable |  |  |
| 20 | 41.83500 | 0.70000 | 1.77250 | 49.6 |
| 21 | 15.81180 | Variable |  |  |
| 22 | −27.31410 | 0.80000 | 1.80420 | 46.5 |
| 23 | 95.60580 | Variable |  |  |
| 24 | 51.13830 | 4.04380 | 1.84666 | 23.8 |
| 25 | −54.86380 | (BF) |  |  |
| Image surface | ∞ |  |  |  |

TABLE 10

(Aspherical data)

Surface No. 11

K = 0.00000E+00, A4 = −1.53017E−05, A6 = −2.77884E−08,
A8 = −4.66255E−10 A10 = −1.11845E−11
Surface No. 12

K = 0.00000E+00, A4 = 4.36828E−06, A6 = 5.32333E−08,
A8 = −2.54160E−09 A10 = 1.79282E−12
Surface No. 17

K = 0.00000E+00, A4 = −2.15990E−05, A6 = 1.15735E−07,
A8 = −4.20116E−09 A10 = 3.76100E−11

TABLE 11

(Various data in an infinity in-focus condition)

Zooming ratio 3.66237

|  | Wide-angle limit | Middle position | Telephoto limit |
|---|---|---|---|
| Focal length | 46.3498 | 88.7103 | 169.7501 |
| F-number | 4.12039 | 4.94458 | 5.76850 |
| View angle | 13.2930 | 6.8442 | 3.5698 |
| Image height | 10.8150 | 10.8150 | 10.8150 |
| Overall length of lens system | 113.0000 | 113.0000 | 113.0000 |
| BF | 15.0500 | 15.0500 | 15.0500 |
| d5 | 1.3140 | 14.9096 | 27.0551 |
| d10 | 26.7846 | 13.1890 | 1.0435 |
| d19 | 2.6023 | 6.1759 | 2.6000 |
| d21 | 24.2630 | 17.7843 | 16.9458 |
| d23 | 1.5000 | 4.4051 | 8.8195 |

Zoom lens unit data

| Lens unit | Initial surface No. | Focal Length |
|---|---|---|
| 1 | 1 | 64.18055 |
| 2 | 6 | −18.66788 |
| 3 | 11 | 21.47506 |
| 4 | 20 | −33.29532 |
| 5 | 22 | −26.34068 |
| 6 | 24 | 31.81779 |

TABLE 12

(Various data in a close-object in-focus condition)

Zooming ratio 3.32045

|  | Wide-angle limit | Middle position | Telephoto limit |
|---|---|---|---|
| Object distance | 1887.0000 | 1887.0000 | 1887.0000 |
| Focal length | 45.5528 | 84.1373 | 151.2556 |
| F-number | 4.13400 | 4.97078 | 5.89181 |
| View angle | 13.2601 | 6.8094 | 3.4898 |
| Image height | 10.8150 | 10.8150 | 10.8150 |
| Overall length of lens system | 113.0000 | 113.0000 | 113.0000 |
| BF | 15.0500 | 15.0500 | 15.0500 |
| d5 | 1.3140 | 14.9096 | 27.0551 |
| d10 | 26.7846 | 13.1890 | 1.0435 |
| d19 | 2.8245 | 7.1030 | 5.7081 |
| d21 | 24.0408 | 16.8572 | 13.8377 |
| d23 | 1.5000 | 4.4051 | 8.8195 |

Zoom lens unit data

| Lens unit | Initial surface No. | Focal Length |
|---|---|---|
| 1 | 1 | 64.18055 |
| 2 | 6 | −18.66788 |
| 3 | 11 | 21.47506 |
| 4 | 20 | −33.29532 |
| 5 | 22 | −26.34068 |
| 6 | 24 | 31.81779 |

Numerical Example 4

The zoom lens system of Numerical Example 4 corresponds to Embodiment 4 shown in FIG. 13. Table 13 shows the surface data of the zoom lens system of Numerical Example 4. Table 14 shows the aspherical data. Table 15 shows various data in an infinity in-focus condition. Table 16 shows various data in a close-object in-focus condition.

TABLE 13

(Surface data)

| Surface number | r | d | nd | vd |
|---|---|---|---|---|
| Object surface | ∞ | | | |
| 1 | 53.12790 | 4.00010 | 1.48749 | 70.4 |
| 2 | −523.90820 | 0.15000 | | |
| 3 | 37.86710 | 1.00000 | 1.85026 | 32.3 |
| 4 | 25.69490 | 4.96280 | 1.49700 | 81.6 |
| 5 | 135.25000 | Variable | | |
| 6 | 542.82840 | 0.80000 | 1.80610 | 33.3 |
| 7 | 13.95760 | 2.67500 | 1.94595 | 18.0 |
| 8 | 25.73710 | 1.76960 | | |
| 9 | −48.06010 | 0.70000 | 1.80420 | 46.5 |
| 10 | 78.43530 | Variable | | |
| 11* | 20.90510 | 4.68260 | 1.73077 | 40.5 |
| 12* | −103.52470 | 3.88060 | | |
| 13(Diaphragm) | ∞ | 1.50000 | | |
| 14 | 876.57380 | 0.80000 | 1.90366 | 31.3 |
| 15 | 15.92120 | 3.82990 | 1.48749 | 70.4 |
| 16 | −204.48190 | 1.60000 | | |
| 17* | 21.02820 | 5.00000 | 1.58913 | 61.3 |
| 18 | −20.67470 | 0.70000 | 1.76182 | 26.6 |
| 19 | −33.14000 | Variable | | |
| 20 | 71.13160 | 0.70000 | 1.77250 | 49.6 |
| 21 | 13.94640 | Variable | | |
| 22 | −29.38550 | 0.80000 | 1.80420 | 46.5 |
| 23 | 270.34800 | Variable | | |
| 24 | 58.17970 | 5.00000 | 1.84666 | 23.8 |
| 25 | −50.77630 | (BF) | | |
| Image surface | ∞ | | | |

TABLE 14

(Aspherical data)

Surface No. 11

K = 0.00000E+00, A4 = −7.53929E−06, A6 = 2.34563E−09,
A8 = −1.57108E−10 A10 = −2.18254E−12

Surface No. 12

K = 0.00000E+00, A4 = 1.03152E−05, A6 = 1.26993E−08,
A8 = −3.99096E−10 A10 = −9.17315E−13

Surface No. 17

K = 0.00000E+00, A4 = −2.15516E−05, A6 = −4.36232E−11,
A8 = −1.25723E−09 A10 = 9.25701E−12

TABLE 15

(Various data in an infinity in-focus condition)

Zooming ratio 3.66231

|  | Wide-angle limit | Middle position | Telephoto limit |
|---|---|---|---|
| Focal length | 46.3507 | 88.6931 | 169.7505 |
| F-number | 4.12019 | 4.94424 | 5.76830 |
| View angle | 13.2727 | 6.8467 | 3.5708 |
| Image height | 10.8150 | 10.8150 | 10.8150 |
| Overall length of lens system | 116.0000 | 116.0000 | 116.0000 |
| BF | 16.1500 | 16.1500 | 16.1500 |
| d5 | 1.2086 | 15.3858 | 27.7816 |
| d10 | 27.8340 | 13.6569 | 1.2611 |
| d19 | 3.1788 | 5.5141 | 2.6000 |
| d21 | 21.5762 | 15.5785 | 12.5326 |
| d23 | 1.5000 | 5.1624 | 11.1224 |

TABLE 15-continued (Various data in an infinity in-focus condition)

Zoom lens unit data

| Lens unit | Initial surface No. | Focal Length |
|---|---|---|
| 1 | 1 | 64.46541 |
| 2 | 6 | −19.03422 |
| 3 | 11 | 20.96031 |
| 4 | 20 | −22.57697 |
| 5 | 22 | −32.91855 |
| 6 | 24 | 32.71188 |

TABLE 16

(Various data in a close-object in-focus condition)

Zooming ratio 3.41682

| | Wide-angle limit | Middle position | Telephoto limit |
|---|---|---|---|
| Object distance | 1884.0000 | 1884.0000 | 1884.0000 |
| Focal length | 45.6453 | 84.8027 | 155.9615 |
| F-number | 4.13209 | 4.96810 | 5.87437 |
| View angle | 13.2440 | 6.8141 | 3.4983 |
| Image height | 10.8150 | 10.8150 | 10.8150 |
| Overall length of lens system | 116.0000 | 116.0000 | 116.0000 |
| BF | 16.1500 | 16.1500 | 16.1500 |
| d5 | 1.2086 | 15.3858 | 27.7816 |
| d10 | 27.8340 | 13.6569 | 1.2611 |
| d19 | 3.3344 | 6.1451 | 4.8139 |
| d21 | 21.4206 | 14.9475 | 10.3187 |
| d23 | 1.5000 | 5.1624 | 11.1224 |

Zoom lens unit data

| Lens unit | Initial surface No. | Focal Length |
|---|---|---|
| 1 | 1 | 64.46541 |
| 2 | 6 | −19.03422 |
| 3 | 11 | 20.96031 |
| 4 | 20 | −22.57697 |
| 5 | 22 | −32.91855 |
| 6 | 24 | 32.71188 |

Numerical Example 5

The zoom lens system of Numerical Example 5 corresponds to Embodiment 5 shown in FIG. 17. Table 17 shows the surface data of the zoom lens system of Numerical Example 5. Table 18 shows the aspherical data. Table 19 shows various data in an infinity in-focus condition. Table 20 shows various data in a close-object in-focus condition.

TABLE 17

(Surface data)

| Surface number | r | d | nd | vd |
|---|---|---|---|---|
| Object surface | ∞ | | | |
| 1 | 33.97390 | 1.30000 | 1.84666 | 23.8 |
| 2 | 22.43660 | 8.33430 | 1.72916 | 54.7 |
| 3 | 418.69810 | 0.10000 | 1.51340 | 52.9 |
| 4* | 567.30530 | Variable | | |
| 5 | 249.42690 | 1.15000 | 1.91082 | 35.2 |
| 6 | 11.79970 | 5.44530 | | |
| 7 | −32.31060 | 0.85000 | 1.69680 | 55.5 |
| 8 | 46.03670 | 0.15000 | | |
| 9 | 24.31430 | 2.28220 | 1.94595 | 18.0 |
| 10 | 105.27090 | Variable | | |
| 11(Diaphragm) | ∞ | 1.50000 | | |
| 12 | 10.48260 | 2.36410 | 1.71736 | 29.5 |
| 13 | 15.57640 | 0.15000 | | |
| 14 | 11.74080 | 0.50000 | 1.90366 | 31.3 |
| 15 | 6.88610 | 4.43060 | 1.50670 | 70.5 |
| 16* | 106.20310 | 2.20090 | | |
| 17* | 33.35770 | 2.91440 | 1.58700 | 59.6 |
| 18 | −10.92610 | 0.50000 | 1.80610 | 33.3 |
| 19 | −18.90500 | Variable | | |
| 20 | 889.57670 | 0.60000 | 1.80450 | 39.6 |
| 21 | 11.78120 | Variable | | |
| 22 | 54.33660 | 4.01320 | 1.50670 | 70.5 |
| 23* | −40.48590 | (BF) | | |
| Image surface | ∞ | | | |

TABLE 18

(Aspherical data)

Surface No. 4

K = 0.00000E+00, A4 = 1.57162E−06, A6 = 0.00000E+00

Surface No. 16

K = 0.00000E+00, A4 = 1.51023E−04, A6 = 0.00000E+00

Surface No. 17

K = 0.00000E+00, A4 = −2.18820E−05, A6 = −9.64599E−08

Surface No. 23

K = 0.00000E+00, A4 = −2.16478E−05, A6 = −1.16380E−07

TABLE 19

(Various data in an infinity in-focus condition)

Zooming ratio 4.70869

| | Wide-angle limit | Middle position | Telephoto limit |
|---|---|---|---|
| Focal length | 14.4199 | 31.2913 | 67.8989 |
| F-number | 3.60500 | 5.15031 | 5.76910 |
| View angle | 39.8162 | 19.2720 | 8.8722 |
| Image height | 10.8150 | 10.8150 | 10.8150 |
| Overall length of lens system | 94.0000 | 94.0000 | 94.0000 |
| BF | 14.9500 | 14.9500 | 14.9500 |
| d4 | 1.0000 | 8.8452 | 17.2839 |
| d10 | 29.6722 | 14.1124 | 2.1055 |
| d19 | 3.1000 | 5.2578 | 9.0132 |
| d21 | 6.4926 | 12.0491 | 11.8621 |

Zoom lens unit data

| Lens unit | Initial surface No. | Focal Length |
|---|---|---|
| 1 | 1 | 54.00470 |
| 2 | 5 | −12.15998 |
| 3 | 11 | 15.27888 |
| 4 | 20 | −14.84512 |
| 5 | 22 | 46.44759 |

TABLE 20

(Various data in a close-object in-focus condition)

Zooming ratio 4.39349

|  | Wide-angle limit | Middle position | Telephoto limit |
|---|---|---|---|
| Object distance | 906.0000 | 906.0000 | 906.0000 |
| Focal length | 14.3503 | 30.8088 | 63.0477 |
| F-number | 3.60711 | 5.16130 | 5.80830 |
| View angle | 39.8537 | 19.2581 | 8.7692 |
| Image height | 10.8150 | 10.8150 | 10.8150 |
| Overall length of lens system | 94.0000 | 94.0000 | 94.0000 |
| BF | 14.9500 | 14.9500 | 14.9500 |
| d4 | 1.0000 | 8.8452 | 17.2839 |
| d10 | 29.6722 | 14.1124 | 2.1055 |
| d19 | 3.1566 | 5.4644 | 9.9897 |
| d21 | 6.4360 | 11.8425 | 10.8856 |

Zoom lens unit data

| Lens unit | Initial surface No. | Focal Length |
|---|---|---|
| 1 | 1 | 54.00470 |
| 2 | 5 | −12.15998 |
| 3 | 11 | 15.27888 |
| 4 | 20 | −14.84512 |
| 5 | 22 | 46.44759 |

Numerical Example 6

The zoom lens system of Numerical Example 6 corresponds to Embodiment 6 shown in FIG. 21. Table 21 shows the surface data of the zoom lens system of Numerical Example 6. Table 22 shows the aspherical data. Table 23 shows various data in an infinity in-focus condition. Table 24 shows various data in a close-object in-focus condition.

TABLE 21

(Surface data)

| Surface number | r | d | nd | vd |
|---|---|---|---|---|
| Object surface | ∞ | | | |
| 1 | 33.95820 | 1.30000 | 1.84666 | 23.8 |
| 2 | 22.49620 | 8.72370 | 1.72916 | 54.7 |
| 3 | 363.48770 | 0.17420 | 1.51340 | 52.9 |
| 4* | 672.06020 | Variable | | |
| 5 | 309.51520 | 1.15000 | 1.91082 | 35.2 |
| 6 | 11.79520 | 5.37910 | | |
| 7 | −38.86120 | 0.85000 | 1.69680 | 55.5 |
| 8 | 37.13550 | 0.15000 | | |
| 9 | 21.59010 | 2.41200 | 1.94595 | 18.0 |
| 10 | 74.53860 | Variable | | |
| 11(Diaphragm) | ∞ | 1.50000 | | |
| 12 | 10.06360 | 2.50670 | 1.71736 | 29.5 |
| 13 | 11.65220 | 0.15000 | | |
| 14 | 9.95830 | 0.50000 | 1.90366 | 31.3 |
| 15* | 6.55250 | 3.50460 | 1.50670 | 70.5 |
| 16* | 79.69790 | 2.23320 | | |
| 17* | 40.36770 | 2.63800 | 1.58700 | 59.6 |
| 18 | −12.50750 | 0.50000 | 1.80610 | 33.3 |
| 19 | −20.34300 | Variable | | |
| 20 | 39.98960 | 0.60000 | 1.80450 | 39.6 |
| 21 | 11.10160 | Variable | | |
| 22 | 63.17000 | 3.45580 | 1.50670 | 70.5 |
| 23* | −58.14450 | (BF) | | |
| Image surface | ∞ | | | |

TABLE 22

(Aspherical data)

Surface No. 4

K = 0.00000E+00, A4 = 1.41100E−06, A6 = 0.00000E+00

Surface No. 16

K = 0.00000E+00, A4 = 1.66788E−04, A6 = 0.00000E+00

Surface No. 17

K = 0.00000E+00, A4 = −2.11534E−05, A6 = −1.76564E−07

Surface No. 23

K = 0.00000E+00, A4 = −3.23969E−05, A6 = −1.60747E−07

TABLE 23

(Various data in an infinity in-focus condition)

Zooming ratio 4.70883

|  | Wide-angle limit | Middle position | Telephoto limit |
|---|---|---|---|
| Focal length | 14.4200 | 31.2903 | 67.9014 |
| F-number | 3.60557 | 5.15055 | 5.76932 |
| View angle | 39.6323 | 19.3191 | 8.8705 |
| Image height | 10.8150 | 10.8150 | 10.8150 |
| Overall length of lens system | 94.0000 | 94.0000 | 94.0000 |
| BF | 15.8600 | 15.8600 | 15.8600 |
| d4 | 1.0021 | 8.9196 | 16.8303 |
| d10 | 29.6067 | 14.2141 | 2.1493 |
| d19 | 3.1000 | 5.5162 | 10.2222 |
| d21 | 6.7022 | 11.7609 | 11.2093 |

Zoom lens unit data

| Lens unit | Initial surface No. | Focal Length |
|---|---|---|
| 1 | 1 | 53.75022 |
| 2 | 5 | −12.24040 |
| 3 | 11 | 16.06054 |
| 4 | 20 | −19.28090 |
| 5 | 22 | 60.33091 |

TABLE 24

(Various data in a close-object in-focus condition)

Zooming ratio 4.35610

|  | Wide-angle limit | Middle position | Telephoto limit |
|---|---|---|---|
| Object distance | 906.0000 | 906.0000 | 906.0000 |
| Focal length | 14.3506 | 30.7615 | 62.5126 |
| F-number | 3.60832 | 5.16425 | 5.81211 |
| View angle | 39.6995 | 19.2905 | 8.7304 |
| Image height | 10.8150 | 10.8150 | 10.8150 |
| Overall length of lens system | 94.0000 | 94.0000 | 94.0000 |
| BF | 15.8600 | 15.8600 | 15.8600 |
| d4 | 1.0021 | 8.9196 | 16.8303 |
| d10 | 29.6067 | 14.2141 | 2.1493 |
| d19 | 3.1732 | 5.7899 | 11.5460 |
| d21 | 6.6290 | 11.4871 | 9.8855 |

Zoom lens unit data

| Lens unit | Initial surface No. | Focal Length |
|---|---|---|
| 1 | 1 | 53.75022 |
| 2 | 5 | −12.24040 |
| 3 | 11 | 16.06054 |

TABLE 24-continued (Various data in a close-object in-focus condition)

| 4 | 20 | −19.28090 |
|---|----|-----------|
| 5 | 22 | 60.33091  |

Numerical Example 7

The zoom lens system of Numerical Example 7 corresponds to Embodiment 7 shown in FIG. 25. Table 25 shows the surface data of the zoom lens system of Numerical Example 7. Table 26 shows the aspherical data. Table 27 shows various data in an infinity in-focus condition. Table 28 shows various data in a close-object in-focus condition.

TABLE 25

(Surface data)

| Surface number | r | d | nd | vd |
|---|---|---|---|---|
| Object surface | ∞ | | | |
| 1 | 47.47840 | 1.20000 | 1.84666 | 23.8 |
| 2 | 29.85350 | 8.73470 | 1.72916 | 54.7 |
| 3 | −512.66690 | 0.15580 | 1.51340 | 52.9 |
| 4* | −304.52430 | Variable | | |
| 5 | −397.86130 | 0.95000 | 1.91082 | 35.2 |
| 6 | 12.40010 | 4.07820 | | |
| 7* | −36.83540 | 1.20000 | 1.69400 | 56.3 |
| 8 | 29.82260 | 0.15000 | | |
| 9 | 21.42260 | 2.44530 | 1.94595 | 18.0 |
| 10 | 152.75990 | Variable | | |
| 11 | 13.37860 | 2.97430 | 1.68893 | 31.2 |
| 12 | 93.13070 | 0.15000 | | |
| 13 | 26.71010 | 0.60000 | 1.90366 | 31.3 |
| 14 | 9.76750 | 3.18800 | 1.50670 | 70.5 |
| 15* | 182.20930 | Variable | | |
| 16(Diaphragm) | ∞ | 3.50000 | | |
| 17* | 31.40850 | 3.17590 | 1.58700 | 59.6 |
| 18 | −10.08470 | 0.50000 | 1.84666 | 23.8 |
| 19 | −17.96390 | Variable | | |
| 20 | 84.63860 | 0.60000 | 1.91082 | 35.2 |
| 21 | 13.83100 | 2.22550 | | |
| 22 | −10.49180 | 0.50000 | 1.77250 | 49.6 |
| 23 | −298.94750 | 3.18560 | 1.74950 | 35.0 |
| 24 | −12.12380 | Variable | | |
| 25 | 22.30490 | 5.30830 | 1.50670 | 70.5 |
| 26* | −197.85310 | (BF) | | |
| Image surface | ∞ | | | |

TABLE 26

(Aspherical data)

Surface No. 4

K = 0.00000E+00, A4 = 1.79740E−06, A6 = −7.72513E−10,
A8 = 0.00000E+00 A10 = 0.00000E+00

Surface No. 7

K = 0.00000E+00, A4 = 8.95817E−06, A6 = −1.69053E−07,
A8 = 2.79980E−09 A10 = −1.91853E−11

Surface No. 15

K = 0.00000E+00, A4 = 9.04034E−05, A6 = 2.64355E−07,
A8 = 1.05251E−09 A10 = 1.55268E−11

Surface No. 17

K = 0.00000E+00, A4 = −9.39700E−06, A6 = 3.07229E−07,
A8 = −1.73352E−08 A10 = 3.49429E−10

Surface No. 26

K = 0.00000E+00, A4 = 1.13537E−05, A6 = −4.86506E−08,
A8 = 2.04889E−11 A10 = 3.98788E−13

TABLE 27

(Various data in an infinity in-focus condition)

Zooming ratio 4.70876

| | Wide-angle limit | Middle position | Telephoto limit |
|---|---|---|---|
| Focal length | 16.4801 | 35.7571 | 77.6006 |
| F-number | 3.60547 | 4.94445 | 5.76888 |
| View angle | 36.5829 | 16.3174 | 7.5852 |
| Image height | 10.8150 | 10.8150 | 10.8150 |
| Overall length of lens system | 108.0000 | 108.0000 | 108.0000 |
| BF | 14.9500 | 14.9500 | 14.9500 |
| d4 | 1.0000 | 15.1946 | 27.2215 |
| d10 | 27.1226 | 11.7665 | 1.0011 |
| d15 | 1.6847 | 2.8462 | 1.5847 |
| d19 | 3.1000 | 7.3015 | 12.1185 |
| d24 | 15.3208 | 11.1194 | 6.3028 |

Zoom lens unit data

| Lens unit | Initial surface No. | Focal Length |
|---|---|---|
| 1 | 1 | 62.99726 |
| 2 | 5 | −12.49855 |
| 3 | 11 | 26.75512 |
| 4 | 16 | 25.41272 |
| 5 | 20 | −19.93652 |
| 6 | 25 | 39.88385 |

TABLE 28

(Various data in a close-object in-focus condition)

Zooming ratio 4.43677

| | Wide-angle limit | Middle position | Telephoto limit |
|---|---|---|---|
| Object distance | 892.0000 | 892.0000 | 892.0000 |
| Focal length | 16.4757 | 35.5522 | 73.0989 |
| F-number | 3.61602 | 4.98290 | 5.92672 |
| View angle | 36.5068 | 16.2945 | 7.3816 |
| Image height | 10.8150 | 10.8150 | 10.8150 |
| Overall length of lens system | 108.0000 | 108.0000 | 108.0000 |
| BF | 14.9500 | 14.9500 | 14.9500 |
| d4 | 1.0000 | 15.1946 | 27.2215 |
| d10 | 27.1226 | 11.7665 | 1.0011 |
| d15 | 1.6847 | 2.8462 | 1.5847 |
| d19 | 3.1720 | 7.6739 | 14.1393 |
| d24 | 15.2488 | 10.7470 | 4.2820 |

Zoom lens unit data

| Lens unit | Initial surface No. | Focal Length |
|---|---|---|
| 1 | 1 | 62.99726 |
| 2 | 5 | −12.49855 |
| 3 | 11 | 26.75512 |
| 4 | 16 | 25.41272 |
| 5 | 20 | −19.93652 |
| 6 | 25 | 39.88385 |

Numerical Example 8

The zoom lens system of Numerical Example 8 corresponds to Embodiment 8 shown in FIG. 29. Table 29 shows the surface data of the zoom lens system of Numerical Example 8. Table 30 shows the aspherical data. Table 31 shows various data in an infinity in-focus condition. Table 32 shows various data in a close-object in-focus condition.

TABLE 29

(Surface data)

| Surface number | r | d | nd | vd |
|---|---|---|---|---|
| Object surface | ∞ | | | |
| 1 | 52.46760 | 4.15940 | 1.48749 | 70.4 |
| 2 | −407.64530 | 0.15000 | | |
| 3 | 38.23060 | 1.00000 | 1.85026 | 32.3 |
| 4 | 25.20510 | 5.00000 | 1.49700 | 81.6 |
| 5 | 129.43900 | Variable | | |
| 6 | 2778.04750 | 0.80000 | 1.80610 | 33.3 |
| 7 | 13.08600 | 2.75520 | 1.94595 | 18.0 |
| 8 | 25.68890 | 1.83070 | | |
| 9 | −42.55260 | 0.70000 | 1.80420 | 46.5 |
| 10 | 86.70890 | Variable | | |
| 11* | 17.83120 | 4.46360 | 1.73077 | 40.5 |
| 12* | −576.28030 | 1.50000 | | |
| 13(Diaphragm) | ∞ | 1.81190 | | |
| 14 | 47.08860 | 0.80000 | 1.90366 | 31.3 |
| 15 | 12.29520 | 3.25150 | 1.48749 | 70.4 |
| 16 | 32.66250 | 1.60000 | | |
| 17* | 21.11200 | 4.78080 | 1.58913 | 61.3 |
| 18 | −20.48360 | 0.70000 | 1.76182 | 26.6 |
| 19 | −32.10520 | Variable | | |
| 20 | 41.20810 | 0.70000 | 1.77250 | 49.6 |
| 21 | 15.96640 | Variable | | |
| 22 | −25.70460 | 0.80000 | 1.80420 | 46.5 |
| 23 | 150.29810 | Variable | | |
| 24 | 48.80450 | 3.86020 | 1.84666 | 23.8 |
| 25 | −62.39650 | (BF) | | |
| Image surface | ∞ | | | |

TABLE 30

(Aspherical data)

Surface No. 11

K = 0.00000E+00, A4 = −1.43612E−05, A6 = −3.62480E−08,
A8 = −7.23570E−10 A10 = −1.72076E−11
Surface No. 12

K = 0.00000E+00, A4 = 5.11168E−06, A6 = 6.26978E−08,
A8 = −3.69572E−09 A10 = 3.28797E−12
Surface No. 17

K = 0.00000E+00, A4 = −2.56446E−05, A6 = 1.59804E−07,
A8 = −6.31554E−09 A10 = 6.06385E−11

TABLE 31

(Various data in an infinity in-focus condition)

Zooming ratio 4.12011

| | Wide-angle limit | Middle position | Telephoto limit |
|---|---|---|---|
| Focal length | 41.2009 | 83.6385 | 169.7522 |
| F-number | 4.12045 | 4.94434 | 5.76880 |
| View angle | 15.0713 | 7.2766 | 3.5687 |
| Image height | 10.8150 | 10.8150 | 10.8150 |
| Overall length of lens system | 113.0000 | 113.0000 | 113.0000 |
| BF | 15.0500 | 15.0500 | 15.0500 |
| d5 | 1.2771 | 16.2363 | 29.2344 |
| d10 | 29.0966 | 14.1374 | 1.1393 |
| d19 | 2.5752 | 6.5702 | 2.6025 |
| d21 | 22.8367 | 16.3131 | 15.6434 |
| d23 | 1.5000 | 4.0286 | 8.6660 |

TABLE 31-continued (Various data in an infinity in-focus condition)

Zoom lens unit data

| Lens unit | Initial surface No. | Focal Length |
|---|---|---|
| 1 | 1 | 65.48877 |
| 2 | 6 | −18.35962 |
| 3 | 11 | 21.32502 |
| 4 | 20 | −34.15493 |
| 5 | 22 | −27.23969 |
| 6 | 24 | 32.86762 |

TABLE 32

(Various data in a close-object in-focus condition)

Zooming ratio 3.66685

| | Wide-angle limit | Middle position | Telephoto limit |
|---|---|---|---|
| Object distance | 1887.0000 | 1887.0000 | 1887.0000 |
| Focal length | 40.6194 | 79.4194 | 148.9454 |
| F-number | 4.13204 | 4.96668 | 5.89124 |
| View angle | 15.0383 | 7.2473 | 3.4900 |
| Image height | 10.8150 | 10.8150 | 10.8150 |
| Overall length of lens system | 113.0000 | 113.0000 | 113.0000 |
| BF | 15.0500 | 15.0500 | 15.0500 |
| d5 | 1.2771 | 16.2363 | 29.2344 |
| d10 | 29.0966 | 14.1374 | 1.1393 |
| d19 | 2.7678 | 7.4915 | 6.0330 |
| d21 | 22.6441 | 15.3918 | 12.2129 |
| d23 | 1.5000 | 4.0286 | 8.6660 |

Zoom lens unit data

| Lens unit | Initial surface No. | Focal Length |
|---|---|---|
| 1 | 1 | 65.48877 |
| 2 | 6 | −18.35962 |
| 3 | 11 | 21.32502 |
| 4 | 20 | −34.15493 |
| 5 | 22 | −27.23969 |
| 6 | 24 | 32.86762 |

Numerical Example 9

The zoom lens system of Numerical Example 9 corresponds to Embodiment 9 shown in FIG. 33. Table 33 shows the surface data of the zoom lens system of Numerical Example 9. Table 34 shows the aspherical data. Table 35 shows various data in an infinity in-focus condition. Table 36 shows various data in a close-object in-focus condition.

TABLE 33

(Surface data)

| Surface number | r | d | nd | vd |
|---|---|---|---|---|
| Object surface | ∞ | | | |
| 1 | 33.10760 | 1.30000 | 1.84666 | 23.8 |
| 2 | 21.71450 | 7.42020 | 1.72916 | 54.7 |
| 3 | 540.13400 | 0.10000 | 1.51340 | 52.9 |
| 4* | 779.23310 | Variable | | |
| 5 | 382.52640 | 1.15000 | 1.91082 | 35.2 |
| 6 | 11.98360 | 5.09220 | | |
| 7 | −31.60730 | 0.85000 | 1.69680 | 55.5 |
| 8 | 48.01160 | 0.15000 | | |
| 9 | 24.83930 | 2.26180 | 1.94595 | 18.0 |
| 10 | 127.01100 | Variable | | |

TABLE 33-continued (Surface data)

| Surface number | r | d | nd | vd |
|---|---|---|---|---|
| 11(Diaphragm) | ∞ | 1.50000 | | |
| 12 | 10.78700 | 2.31220 | 1.71736 | 29.5 |
| 13 | 16.00090 | 0.15000 | | |
| 14 | 12.20790 | 0.50000 | 1.90366 | 31.3 |
| 15 | 7.18510 | 4.63660 | 1.50670 | 70.5 |
| 16* | 165.55850 | 2.18340 | | |
| 17* | 34.02330 | 3.06450 | 1.58700 | 59.6 |
| 18 | −11.41290 | 0.50000 | 1.80610 | 33.3 |
| 19 | −19.50120 | Variable | | |
| 20 | 489.14700 | 0.60000 | 1.80450 | 39.6 |
| 21 | 11.86430 | Variable | | |
| 22 | 56.97790 | 3.95160 | 1.50670 | 70.5 |
| 23* | −43.44990 | (BF) | | |
| Image surface | ∞ | | | |

TABLE 34

(Aspherical data)

Surface No. 4

K = 0.00000E+00, A4 = 1.69580E−06, A6 = 0.00000E+00

Surface No. 16

K = 0.00000E+00, A4 = 1.42517E−04, A6 = 0.00000E+00

Surface No. 17

K = 0.00000E+00, A4 = −1.94715E−05, A6 = −1.68147E−07

Surface No. 23

K = 0.00000E+00, A4 = −1.97231E−05, A6 = −1.00963E−07

TABLE 35

(Various data in an infinity in-focus condition)

Zooming ratio 4.70875

| | Wide-angle limit | Middle position | Telephoto limit |
|---|---|---|---|
| Focal length | 15.4499 | 33.5264 | 72.7498 |
| F-number | 3.60557 | 5.15100 | 5.76827 |
| View angle | 38.0960 | 18.0306 | 8.2907 |
| Image height | 10.8150 | 10.8150 | 10.8150 |
| Overall length of lens system | 93.9998 | 93.9999 | 93.9999 |
| BF | 14.94990 | 14.95026 | 14.95022 |
| d4 | 1.0000 | 8.9724 | 17.8140 |
| d10 | 29.2061 | 13.8201 | 2.0851 |
| d19 | 3.1000 | 5.2181 | 8.2611 |
| d21 | 8.0213 | 13.3165 | 13.1670 |

Zoom lens unit data

| Lens unit | Initial surface No. | Focal Length |
|---|---|---|
| 1 | 1 | 51.77904 |
| 2 | 5 | −12.37005 |
| 3 | 11 | 15.42451 |
| 4 | 20 | −15.12241 |
| 5 | 22 | 49.30364 |

TABLE 36

(Various data in a close-object in-focus condition)

Zooming ratio 4.36364

| | Wide-angle limit | Middle position | Telephoto limit |
|---|---|---|---|
| Object distance | 906.0000 | 906.0000 | 906.0000 |
| Focal length | 15.3701 | 32.9565 | 67.0696 |
| F-number | 3.60782 | 5.16277 | 5.81322 |
| View angle | 38.0877 | 18.0120 | 8.1908 |
| Image height | 10.8150 | 10.8150 | 10.8150 |
| Overall length of lens system | 94.0001 | 93.9998 | 94.0000 |
| BF | 14.95022 | 14.95025 | 14.95027 |
| d4 | 1.0000 | 8.9724 | 17.8140 |
| d10 | 29.2061 | 13.8201 | 2.0851 |
| d19 | 3.1609 | 5.4437 | 9.3243 |
| d21 | 7.9604 | 13.0909 | 12.1038 |

Zoom lens unit data

| Lens unit | Initial surface No. | Focal Length |
|---|---|---|
| 1 | 1 | 51.77904 |
| 2 | 5 | −12.37005 |
| 3 | 11 | 15.42451 |
| 4 | 20 | −15.12241 |
| 5 | 22 | 49.30364 |

The following Table 37 shows the corresponding values to the individual conditions in the zoom lens systems of each of Numerical Examples.

TABLE 37

(Values corresponding to conditions)

| | Condition | Numerical Example | | | | | | | | |
|---|---|---|---|---|---|---|---|---|---|---|
| | | 1 | 2 | 3 | 4 | 5 | 6 | 7 | 8 | 9 |
| (1) | $f_n/f_W$ | −1.170 | −1.492 | −0.718 | −0.487 | −1.029 | −1.337 | −1.210 | −0.829 | −0.979 |
| (2) | $T_1/f_W$ | 0.538 | 0.565 | 0.222 | 0.218 | 0.675 | 0.707 | 0.612 | 0.250 | 0.571 |
| (3) | $|f_1/f_W|$ | 3.548 | 3.430 | 1.385 | 1.391 | 3.745 | 3.727 | 3.823 | 1.589 | 3.351 |
| (4) | $|f_2/f_W|$ | 0.728 | 0.731 | 0.403 | 0.411 | 0.843 | 0.849 | 0.758 | 0.446 | 0.801 |
| (5) | $(T_1 + T_2)/f_W$ | 1.023 | 1.055 | 0.347 | 0.346 | 1.360 | 1.397 | 1.148 | 0.398 | 1.186 |
| (6) | $(T_1 + T_2)/H$ | 1.657 | 1.707 | 1.489 | 1.485 | 1.813 | 1.862 | 1.749 | 1.516 | 1.694 |

The present disclosure is applicable to a digital still camera, a digital video camera, a camera for a mobile terminal device such as a smart-phone, a camera for a PDA (Personal Digital Assistance), a surveillance camera in a surveillance system, a Web camera, a vehicle-mounted camera or the like. In particular, the present disclosure is applicable to a photographing optical system where high image quality is required like in a digital still camera system or a digital video camera system.

Also, the present disclosure is applicable to, among the interchangeable lens apparatuses according to the present disclosure, an interchangeable lens apparatus having motorized zoom function, i.e., activating function for the zoom lens system by a motor, with which a digital video camera system is provided.

As described above, embodiments have been described as examples of art in the present disclosure. Thus, the attached drawings and detailed description have been provided.

Therefore, in order to illustrate the art, not only essential elements for solving the problems but also elements that are not necessary for solving the problems may be included in elements appearing in the attached drawings or in the detailed description. Therefore, such unnecessary elements should not be immediately determined as necessary elements because of their presence in the attached drawings or in the detailed description.

Further, since the embodiments described above are merely examples of the art in the present disclosure, it is understood that various modifications, replacements, additions, omissions, and the like can be performed in the scope of the claims or in an equivalent scope thereof.

What is claimed is:

1. A zoom lens system having a plurality of lens units, each lens unit being composed of at least one lens element, wherein:
   in zooming from a wide-angle limit to a telephoto limit at the time of image taking, a lens unit located closest to an object side and a lens unit having an aperture diaphragm are fixed with respect to an image surface,
   the lens unit located closest to the object side has positive optical power,
   among lens units located on an image side relative to the aperture diaphragm, a lens unit having negative optical power is a focusing lens unit which moves along an optical axis in at least one zooming position from a wide-angle limit to a telephoto limit, in focusing from an infinity in-focus condition to a close-object in-focus condition, and
   the following conditions (1) and (2) are satisfied:

$$-1.8 < f_n/f_W < -0.3 \tag{1}$$

$$0.1 < T_1/f_W < 1.5 \tag{2}$$

where
   $f_n$ is a focal length of the lens unit having negative optical power, which is a focusing lens unit,
   $T_1$ is an axial thickness of the lens unit located closest to the object side, and
   $f_W$ is a focal length of the zoom lens system at a wide-angle limit.

2. The zoom lens system as claimed in claim 1, comprising an image blur compensating lens unit which moves in a direction perpendicular to the optical axis in order to optically compensate image blur, the image blur compensating lens unit having positive optical power.

3. The zoom lens system as claimed in claim 2, wherein the image blur compensating lens unit and the focusing lens unit are arranged adjacent to each other.

4. The zoom lens system as claimed in claim 2, wherein the image blur compensating lens unit is fixed with respect to the image surface, in zooming from a wide-angle limit to a telephoto limit at the time of image taking.

5. The zoom lens system as claimed in claim 1, wherein a lens unit having positive optical power is provided on each of the object side and the image side of the focusing lens unit.

6. The zoom lens system as claimed in claim 1, wherein a lens unit located closest to the image side is fixed with respect to the image surface, in zooming from a wide-angle limit to a telephoto limit at the time of image taking.

7. The zoom lens system as claimed in claim 1, wherein a lens unit located closest to the image side is composed of one lens element having positive optical power.

8. The zoom lens system as claimed in claim 1, wherein the following condition (3) is satisfied:

$$1.0 < |f_1/f_W| < 4.5 \tag{3}$$

where
   $f_1$ is a focal length of the lens unit located closest to the object side.

9. The zoom lens system as claimed in claim 1, wherein the following condition (4) is satisfied:

$$0.2 < |f_2/f_W| < 1.0 \tag{4}$$

where
   $f_2$ is a focal length of a lens unit which is located having one air space toward the image side from the lens unit located closest to the object side.

10. The zoom lens system as claimed in claim 1, wherein the following condition (5) is satisfied:

$$0.1 < (T_1+T_2)/f_W < 2.5 \tag{5}$$

where
    $T_1$ is an axial thickness of the lens unit located closest to the object side, and
    $T_2$ is an axial thickness of a lens unit which is located having one air space toward the image side from the lens unit located closest to the object side.

11. An interchangeable lens apparatus comprising:
    the zoom lens system as claimed in claim 1; and
    a lens mount section which is connectable to a camera body including an image sensor for receiving an optical image formed by the zoom lens system and converting the optical image into an electric image signal.

12. A camera system comprising:
    an interchangeable lens apparatus including the zoom lens system as claimed in claim 1; and
    a camera body which is detachably connected to the interchangeable lens apparatus via a camera mount section, and includes an image sensor for receiving an optical image formed by the zoom lens system and converting the optical image into an electric image signal.

13. A zoom lens system having a plurality of lens units, each lens unit being composed of at least one lens element, wherein:
    in zooming from a wide-angle limit to a telephoto limit at the time of image taking, a lens unit located closest to an object side and a lens unit located closest to an image side are fixed with respect to an image surface,
    the lens unit located closest to the object side has positive optical power,
    among lens units located on the image side relative to an aperture diaphragm, a lens unit having negative optical power is a focusing lens unit which moves along an optical axis in at least one zooming position from a wide-angle limit to a telephoto limit, in focusing from an infinity in-focus condition to a close-object in-focus condition, and the following conditions (1) and (2) are satisfied:

$$-1.8 < f_n/f_W < -0.3 \quad (1)$$

$$0.1 < T_1/f_W < 1.5 \quad (2)$$

where $f_n$ is a focal length of the lens unit having negative optical power, which is a focusing lens unit, $T_1$ is an axial thickness of the lens unit located closest to the object side, and $f_W$ is a focal length of the zoom lens system at a wide-angle limit.

14. The zoom lens system as claimed in claim 13, comprising an image blur compensating lens unit which moves in a direction perpendicular to the optical axis in order to optically compensate image blur, the image blur compensating lens unit having positive optical power.

15. The zoom lens system as claimed in claim 14, wherein the image blur compensating lens unit and the focusing lens unit are arranged adjacent to each other.

16. The zoom lens system as claimed in claim 14, wherein the image blur compensating lens unit is fixed with respect to the image surface, in zooming from a wide-angle limit to a telephoto limit at the time of image taking.

17. The zoom lens system as claimed in claim 13, wherein a lens unit having positive optical power is provided on each of the object side and the image side of the focusing lens unit.

18. The zoom lens system as claimed in claim 13, wherein the lens unit located closest to the image side is composed of one lens element having positive optical power.

19. The zoom lens system as claimed in claim 13, wherein the following condition (3) is satisfied:

$$1.0 < |f_1|/f_W < 4.5 \quad (3)$$

where $f_1$ is a focal length of the lens unit located closest to the object side.

20. The zoom lens system as claimed in claim 13, wherein the following condition (4) is satisfied:

$$0.2 < |f_2|/f_W < 1.0 \quad (4)$$

where $f_2$ is a focal length of a lens unit which is located having one air space toward the image side from the lens unit located closest to the object side.

21. The zoom lens system as claimed in claim 13, wherein the following condition (5) is satisfied:

$$0.1 < (T_1 + T_2)/f_W < 2.5 \quad (5)$$

where $T_1$ is an axial thickness of the lens unit located closest to the object side, and $T_2$ is an axial thickness of a lens unit which is located having one air space toward the image side from the lens unit located closest to the object side.

22. An interchangeable lens apparatus comprising:

the zoom lens system as claimed in claim 13; and a lens mount section which is connectable to a camera body including an image sensor for receiving an optical image formed by the zoom lens system and converting the optical image into an electric image signal.

23. A camera system comprising:

an interchangeable lens apparatus including the zoom lens system as claimed in claim 13; and a camera body which is detachably connected to the interchangeable lens apparatus via a camera mount section, and includes an image sensor for receiving an optical image formed by the zoom lens system and converting the optical image into an electric image signal.

* * * * *

UNITED STATES PATENT AND TRADEMARK OFFICE
CERTIFICATE OF CORRECTION

PATENT NO. : 8,934,177 B2
APPLICATION NO. : 13/749447
DATED : January 13, 2015
INVENTOR(S) : Takuya Imaoka et al.

It is certified that error appears in the above-identified patent and that said Letters Patent is hereby corrected as shown below:

ON THE TITLE PAGE: Item (73) Assignee should read:

(73) Assignee: Panasonic Intellectual Property Management Co., Ltd. Osaka (JP)

Signed and Sealed this
Seventh Day of April, 2015

Michelle K. Lee
*Director of the United States Patent and Trademark Office*